United States Patent
King et al.

(10) Patent No.: US 7,006,032 B2
(45) Date of Patent: Feb. 28, 2006

(54) INTEGRATED TRAFFIC SURVEILLANCE APPARATUS

(75) Inventors: Larry D. King, Sammamish, WA (US); James B. Jones, Carnation, WA (US)

(73) Assignee: Honeywell International, Inc., Morristown, NJ (US)

(*) Notice: Subject to any disclaimer, the term of this patent is extended or adjusted under 35 U.S.C. 154(b) by 50 days.

(21) Appl. No.: 10/761,931

(22) Filed: Jan. 15, 2004

(65) Prior Publication Data

US 2005/0156777 A1 Jul. 21, 2005

(51) Int. Cl.
G01S 13/93 (2006.01)

(52) U.S. Cl. .......................... 342/29; 342/30; 342/32; 342/37; 342/46

(58) Field of Classification Search ................. 342/29, 342/30, 32, 36–38, 42, 43, 46
See application file for complete search history.

(56) References Cited

U.S. PATENT DOCUMENTS

| | | | |
|---|---|---|---|
| 4,835,537 A * | 5/1989 | Manion | 342/30 |
| 5,077,673 A | 12/1991 | Brodegard et al. | |
| 5,552,788 A | 9/1996 | Ryan et al. | |
| 5,805,111 A | 9/1998 | Brettner, III et al. | |
| 5,841,391 A * | 11/1998 | Lucas, Jr. et al. | 342/34 |
| 5,867,535 A * | 2/1999 | Phillips et al. | 375/295 |
| 6,072,994 A * | 6/2000 | Phillips et al. | 455/84 |
| 6,160,497 A | 12/2000 | Clark et al. | |
| 6,211,808 B1 * | 4/2001 | Rees | 342/29 |
| 6,222,480 B1 | 4/2001 | Knutman et al. | |
| 6,314,366 B1 * | 11/2001 | Farmakis et al. | 701/201 |
| 6,459,411 B1 | 10/2002 | Frazier et al. | |
| 2002/0011950 A1 * | 1/2002 | Frazier et al. | 342/357.08 |
| 2004/0087283 A1 * | 5/2004 | Jones et al. | 455/103 |

FOREIGN PATENT DOCUMENTS

WO WO 02/05454 A2 1/2002
WO WO 02/05454 A3 1/2002

OTHER PUBLICATIONS

"3 kW L band mode S solid state transmitter (STX2000)", Grandgeorge, P.;Eudeline, P.;Radar Conference, 1999. The Record the 1999 IEEE, Apr. 20-22, 1999 pp.:181-186.*

* cited by examiner

Primary Examiner—John B. Sotomayor
(74) Attorney, Agent, or Firm—Charles J. Rupnick

(57) ABSTRACT

An apparatus and method for combining the functionality of multiple airborne traffic surveillance systems that operate in the L-band frequency range. The apparatus and method combine the functionality of both a Traffic Alert Collision Avoidance System (TCAS) and a Mode-Select (Mode-S) transponder in an integrated L-band traffic surveillance apparatus having a single processor that is embodied in a single Line Replaceable Unit.

24 Claims, 18 Drawing Sheets

INTEGRATED TRAFFIC SURVEILLANCE APPARATUS

FIELD OF THE INVENTION

The present invention relates to the field of avionics for Traffic Alert Collision Avoidance System (TCAS) and Mode-Select (Mode-S) Transponder devices and methods for use in aircraft, and in particular to devices and methods that combine the Traffic Alert Collision Avoidance System and Mode-S transponder functionalities in a single airborne device.

BACKGROUND OF THE INVENTION

Aircraft pilots are expected to visually identify collision threats and avoid them. This "see and avoid" technique based on the pilot's visual sense remains the most basic method of aircraft collision avoidance. However, since the 1950's electronic techniques based on radio frequency and optical transmissions have been developed to supplement the pilot's visual sense. The government has developed and implemented a system of ground based and aircraft carried equipment designated the Air Traffic Control Radar Beacon System (ATCRBS). This system includes two different types of ground based radar emitters located at each of a plurality of Air Traffic Control (ATC) stations. One type of radar is referred to as the Primary Surveillance Radar (PSR), or simply as the primary radar. The primary radar operates by sending out microwave energy which is reflected back by the aircraft's metallic surfaces. This reflected signal is received back at the ground radar site and displayed as location information for use by an air traffic controller. The second type of radar is referred to as the Secondary Surveillance Radar (SSR), or simply secondary radar. Unlike the primary radar, the SSR is a cooperative system in that it does not rely on reflected energy from the aircraft. Instead, the ground based SSR antenna transmits a coded 1030 MHz microwave interrogation signal. A transponder, i.e., a transmitter/receiver, carried on the aircraft receives and interprets the interrogation signal and transmits a 1090 MHz microwave reply signal back to the SSR ground site. This receive and reply capability greatly increases the surveillance range of the radar and enables an aircraft identification function, referred to as Mode-A, wherein the aircraft transponder includes an identification code as part of its reply signal. This identification code causes the aircraft's image or blip on the ATC operator's radar screen to stand out from the other targets for a short time, usually about 20 seconds. Thus, Mode-A provides an rudimentary identification function.

In addition to the identification function provided by Mode-A, the aircraft altimeter is typically coupled to the transponder such that a reply signal includes altitude information, referred to as Mode-C.

A ground based SSR sequentially transmits both Made A and Mode-C interrogation signals to aircraft in the area. Accordingly, the interrogation signal transmitted by the SSR contains three pulses. The second pulse is a side-lobe suppression signal transmitted from an omnidirectional antenna co-located with a mechanically rotating antenna which provides a highly directive antenna beam. The first and third pulses are transmitted by the directive antenna at a predetermined frequency and are separated by a predetermined interval. The time interval between the first and third pulses defines what information the interrogator is requesting: eight (8) microseconds for identification and twenty-one (21) microseconds for altitude. The operator of the ground based SSR sets the radar interrogation code to request either Mode-A or Mode-C replies from the aircraft transponder. Typically, the radar is set to request a sequence of two Mode-A replies followed by a single Mode-C reply. This sequence is repeated so that a radar operator continuously receives both the Mode-A identification code and the Mode-C altitude information. Upon receipt of the interrogation signal, the aircraft transponder develops and transmits a reply signal which includes the identification or altitude information. The ground based SSR receives and processes the transponder reply signal, together with time of arrival range information, to develop a measurement of position for each responding aircraft. Under such a system, the air traffic controller uses this information to contact involve the aircraft by radio, usually with voice communication, to maintain or restore safe separations between aircraft. The system is inherently limited because each aircraft needs be dealt with individually which requires a share of the air traffic controller's time and attention. When traffic is heavy, or visibility is low, collision potential increases.

During the 1960's the increases in the number of aircraft, the percentage of aircraft equipped with transponders, and the number of ATCRBS radar installations began to overload the ATCRBS system. This system overload caused a significant amount of interference and garble in the Mode-A and Mode-C transmissions because of replies from many simultaneously interrogated aircraft. Furthermore, the Mode-A and Mode-C systems are unable to relay additional information or messages between the ground based SSR and the interrogated aircraft, other than the aforementioned identification and altitude information. The Mode-Select, or Mode-S, was the response to this overload and other deficiencies in ATCRBS. Mode-S is a combined secondary surveillance radar and a ground-air-ground data link system which provides aircraft surveillance and communication necessary to support automated ATC in the dense air traffic environments of today.

Mode-S incorporates various techniques for substantially reducing transmission interference and provides active transmission of messages or additional information by the ground based SSR. The Mode-S sensor includes all the essential features of ATCRBS, and additionally includes individually timed and addressed interrogations to Mode-S transponders carried by aircraft. Additionally, the ground based rotating directive antenna is of monopulse design which improves position determination of ATCRBS target aircraft while reducing the number of required interrogations and responses, thereby improving the radio frequency (RF) interference environment. Mode-S is capable of common channel interoperation with the ATC beacon system. The Mode-S system uses the same frequencies for interrogations and replies as the ATCRBS. Furthermore, the waveforms, or modulation techniques, used in the Mode-S interrogation signal were chosen such that, with proper demodulation, the information content is detectable in the presence of overlaid ATCRBS signals and the modulation of the downlink or reply transmission from the transponder is pulse position modulation (PPM) which is inherently resistant to ATCRBS random pulses. Thus, the Mode-S system allows full surveillance in an integrated ATCRBS/Mode-S environment.

The Radio Technical Commission for Aeronautics (RTCA) has promulgated a specification for the Mode-S system, RTCA/DO-181A, *MINIMUM OPERATIONAL PERFORMANCE STANDARDS FOR AIR TRAFFIC CONTROL RADAR BEACON SYSTEM/MODE-SELECT (AT-*

CRBS/MODE-S) AIRBORNE EQUIPMENT, issued January 1992, and incorporated herein by reference. According to RTCA specification DO-181A, the airborne portion of the Mode-S system includes in one form or another at least a dedicated transponder, a cockpit mounted control panel, two dedicated antennas and cables interconnecting the other elements. Shadowing is attenuation of the received transponder signals by the airframe blocking the antenna from the SSR ground station transmitter when a single antenna is used. The shadowing problem is overcome by locating a first antenna on a top surface of the aircraft and a second antenna on a bottom surface of the aircraft. As discussed more fully below, each aircraft may be within range of more than one SSR ground station at any time and must respond to interrogation signals broadcast from multiple directions. Therefore, the Mode-S system uses two single element omnidirectional antennas to receive interrogation signals from any quarter and reply in kind.

In operation, a unique 24-bit address code, or identity tag, is assigned to each aircraft in a surveillance area by one of two techniques. One technique is a Mode-S "squitter" preformed by the airborne transponder. Once per second, the Mode-S transponder spontaneously and pseudo-randomly transmits (squits) an unsolicited broadcast, including a specific address code unique to the aircraft carrying the transponder, via first one and then the other of its two dedicated antennas which produce an omnidirectional pattern, discussed below. The transponder's transmit and receive modes are mutually exclusive to avoid damage to the equipment. Whenever the Mode-S transponder is not broadcasting, it is monitoring, or "listening," for transmissions simultaneously on both of its dedicated omnidirectional antennas. According to the second technique, each ground based Mode-S interrogator broadcasts an ATCRBS/Mode-S "All-Call" interrogation signal which has a waveform that can be understood by both ATCRBS and Mode-S transponders. When an aircraft equipped with a standard ATCRBS transponder enters the airspace served by an ATC Mode-S interrogator, the transponder responds to the with a standard ATCRBS reply format, while the transponder of a Mode-S equipped aircraft replies with a Mode-S format that includes a unique 24-bit address code, or identity tag. This address, together with the aircraft's range and azimuth location, is entered into a file, commonly known as putting the aircraft on roll-call, and the aircraft is thereafter discretely addressed. The aircraft is tracked by the ATC interrogator throughout its assigned airspace and, during subsequent interrogations, the Mode-S transponder reports in its replies either its altitude or its ATCRBS 4096 code, depending upon the type of discrete interrogation received. As the Mode-S equipped aircraft moves from the airspace served by one ATC Mode-S interrogator into that airspace served by another Mode-S interrogator, the aircraft's location information and discrete address code are passed on via landlines, else either the ground based SSR station picks up the Mode-S transponder's "squitter" or the Mode-S transponder responds to the All-Call interrogation signal broadcast by the next ATC Mode-S interrogator.

The unique 24-bit address code, or identity tag, assigned to each aircraft is the primary difference between the Mode-S system and ATCRBS. The unique 24-bit address code allows a very large number of aircraft to operate in the air traffic control environment without an occurrence of redundant address codes. Parity check bits overlaid on the address code assure that a message is accepted only by the intended aircraft. Thus, interrogations are directed to a particular aircraft using this unique address code and the replies are unambiguously identified. The unique address coded into each interrogation and reply also permits inclusion of data link messages to and/or from a particular aircraft. To date, these data link messages are limited to coordination messages between TCAS equipped aircraft, as discussed below. In future, these data link messages are expected to include Aircraft Operational Command (AOC) information consisting of two to three pages of text data with flight arrival information, such as gates, passenger lists, meals on board, and similar information, as well as Flight Critical Data (FCD). However, the primary function of Mode-S is surveillance and the primary purpose of surveillance remains collision avoidance.

Collision avoidance systems which depend on aircraft carried transponders are usually divided into two classes: passive and active. The ATCRBS, including Mode-S, described above are passive systems because the transponder reply emissions alone provide the only information for locating and identifying potential threats. While passive systems tend to be simple and low cost when compared to active systems and do not crowd the spectrum with additional RF transmissions, detection of transponder emissions from other aircraft is difficult. A passive collision threat detector is essentially a receiver having sufficient intelligence to first detect and then locate the existence of potential collision threats represented by nearby aircraft. The aircraft's receiver is of necessity operating in close proximity to the host aircraft's ATCRBS transponder. Government regulations require the ATCRBS transponder to emit RF energy at 125–500 watts in response to interrogation signals from a ground based SSR. The transponder aboard any potential collision threat aircraft flying along a radial from the directional SSR antenna, usually about 3 to 4 degrees wide, will respond at about the same time as the host aircraft's transponder. The host aircraft's transponder is so much closer, usually no more than a few feet, to any receiver that the host aircraft's own response to the interrogation signal will swamp the response from any other aircraft in its vicinity. Thus, the host aircraft flies in a "blind" region wherein any potential threat aircraft is not "seen," unless other provisions are made. This blind region expands as the target approaches the host. Furthermore, typically each aircraft is within range of more than one SSR site and a blind region is associated with each SSR site. Because wholly passive systems are generally believed insufficient for reliable collision avoidance, the government and aviation industry have cooperated in developing Operational Performance Standards for a Traffic Alert and Collision Avoidance or TCAS system, separate from the ATCRBS[Mode-S transponder system. The standards are set forth in the RTCA specifications DO-185, *MINIMUM OPERATIONAL PERFORMANCE STANDARDS FOR AIR TRAFFIC ALERT AND COLLISION AVOIDANCE SYSTEM (TCAS) AIRBORNE EQUIPMENT*, issued Sep. 23, 1983, consolidated Sep. 6, 1990, and DO-185A, *MINIMUM OPERATIONAL PERFORMANCE STANDARDS FOR AIR TRAFFIC ALERT AND COLLISION AVOIDANCE SYSTEM II(TCAS II) AIRBORNE EQUIPMENT*, issued December 1997, both of which are incorporated herein by reference.

TCAS is a well-known active collision avoidance system that relies upon reply signals from airborne transponders in response to interrogation signals from an aircraft equipped with a ATCRBS Mode-A/Mode-C or Mode-S transponder. The TCAS antenna is driven to produce an omnidirectional microwave transmission, or radiation, pattern carrying a transponder generated coded interrogation signal at 1030 MHz, the same frequency used by ground based SSR stations to interrogate Mode-S transponders. Whenever the TCAS transponder is not broadcasting, it is "listening" for Mode-S "squitters" and reply transmissions at 1090 MHz, the same frequency used by Mode-S transponders to reply to interrogation signals. Thus, a TCAS equipped aircraft can "see" other aircraft carrying a transponder. Once a transponder equipped target has been "seen," the target is tracked and the threat potential is determined.

A conventional TCAS II equipped aircraft can monitor other aircraft within approximately a 20 mile radius of the TCAS II equipped aircraft. An extended range TCAS is described in U.S. Pat. No. 5,805,111, *METHOD AND APPARATUS FOR ACCOMPLISHING EXTENDED RANGE TCAS*, the complete disclosure of which is incorporated herein by reference. When an intruding aircraft is determined to be a threat, the TCAS II system alerts the pilot to the danger and gives the pilot bearing and distance to the intruding aircraft. If the threat is not resolved and a collision or near miss is probable, then the TCAS II system advises the pilot to take evasive action. Comparison between the altitude information encoded in the reply transmission from the threat aircraft and the host aircraft's altimeter is made in the TCAS processor and the pilot is directed obtain a safe altitude separation to avoid a collision, by descending, ascending or maintaining current altitude. Altitude information is thus essential in determining a target's threat potential.

Collision avoidance is enhanced by including range information during threat determination. The approximate range, or distance between the host aircraft and the target, is based on the strength of the received transponder signal in response to an interrogation signal from the host aircraft. Modern TCAS systems obtain more accurate range information by measuring the time lapse between transmission of the interrogation signal and reception of the reply signal, commonly known as "turn around time." The time to closest approach as determined by the TCAS processor is the primary consideration in threat determination.

Knowledge of the direction, or bearing, of the target aircraft relative to the host aircraft's heading greatly enhances a pilot's ability to visually acquire the threat aircraft and provides a better spatial perspective of the threat aircraft relative to the host aircraft. The TCAS processor can display bearing information if it is available. Bearing information is also used by the TCAS processor to better determine threat potential presented by an intruder aircraft. Directional antennas are used in some TCAS systems for determining angle of arrival data which is converted into relative bearing to a threat aircraft by the TCAS processor. Several methods exist for determining angle of arrival data. One common arrangement uses a phase matched quadrapole antenna array with output signals being combined such that the phase difference between two output ports of the combining circuitry indicates the bearing of a received transponder signal. Another method for determining angle of arrival data include a method based on signal phase, commonly known as phase interferometry. Still another commonly known method is based on signal amplitude. Attenuation of the received transponder signals by the airframe blocking the antenna from the transmitter is often overcome by locating a primary directional antenna on a top surface of the aircraft and a second antenna on a bottom surface of the aircraft. The second or bottom antenna is sometimes omni-directional which reduces cost at the expense of reduced directional coverage. Other TCAS systems provide duplicate directional antennas top and bottom. U.S. Pat. No. 5,552,788, *ANTENNA ARRANGEMENT AND AIRCRAFT COLLISION AVOIDANCE SYSTEM*, issued Sep. 3, 1996, the complete disclosure of which is incorporated herein by reference, teaches an arrangement of four standard monopole antenna elements, for example, ¼ wavelength transponder antennas, arranged on opposing surfaces of one axis of the aircraft at the extremes of two mutually orthogonal axes to avoid shadowing and provide directional information about the received reply signal. For example, two monopole antennas are preferably mounted on a longitudinal axis of the aircraft and two additional monopole antennas are preferably mounted on a lateral axis of the aircraft orthogonal to the longitudinal axis passing through the first two antennas. Directionality is determined by comparing the power levels of the received signals. Additionally, the '788 patent teaches a TCAS system which can transmit transponder interrogation signals directionally using predetermined ones of the monopole antennas, thus eliminating dependence upon ground based radar systems for interrogating threat aircraft transponders.

Other antennas for directionally transmitting TCAS system transponder interrogation signals are also commercially available. For example, one TCAS system-compatible directional antenna is commercially available from Honeywell International, Incorporated of Redmond, Wash., under the part number ANT 81A.

Although the ATCRBS/Mode-S surveillance system and the TCAS collision avoidance system are separate, the TCAS processor accounts for the data provided by the intruder aircraft to determine what evasive maneuver to recommend to the host aircraft's pilot, i.e., whether to recommend that the pilot maintain current altitude, ascend or descend. The TCAS system also uses the inter-aircraft data link provided by the addressable Mode-S transponder to coordinate the recommended evasive maneuver with a TCAS equipped intruder aircraft. Furthermore, a connection between the TCAS and Mode-S transponders and other avionics on an aircraft allows coordination between the TCAS and Mode-S transponders. This intersystem connection is often used to prevent simultaneous transmissions which could interfere with the system's independent functions or cause equipment damage.

As briefly described above and described in detail in the respective RTCA specifications, DO-181A and DO-185A, the ATCRBS/Mode-S surveillance and TCAS collision avoidance systems are separate. The most basic installations require at least a TCAS processor, a Mode-S transponder, and two sets of independent and dedicated antennas. For example, U.S. Pat. No. 5,077,673, *AIRCRAFT TRAFFIC ALERT AND COLLISION AVOIDANCE DEVICE*, issued Dec. 31, 1991, the complete disclosure of which is incorporated herein by reference, describes a host aircraft having both an ATCRBS surveillance device and an aircraft traffic alert and collision avoidance device installed thereon, each of the ATCRBS surveillance device and an aircraft traffic alert and collision avoidance device having an antenna dedicated to supporting the respective independent function. U.S. Pat. No. 5,552,788 suggests using four dedicated monopole antennas to support just the an aircraft traffic alert and collision avoidance device. These redundant antennas are costly and add unnecessary weight to the aircraft. The omnidirectional nature of each of the Mode-S "squitter" and the Mode-S reply transmission require large amounts of transmission power and crowd the spectrum with additional RF transmissions, thereby degrading the RF interference environment. Although RTCA documents have suggested the possibility of a combined TCAS/Mode-S system, to date no enabling disclosure has been made and no product embodying such a combined TCAS/Mode-S system has been either used or offered for sale.

U.S. Pat. No. 6,222,480, *MULTIFUNCTION AIRCRAFT TRANSPONDER*, issued Apr. 24, 2001, the complete disclosure of which is incorporated herein by reference, describes a combined TCAS/Mode-S system wherein both functions share common antennas, including a switch coupling the common antennas to the different TCAS and Mode-S functions. U.S. Pat. No. 6,222,480 teaches a combined TCAS transponder device having two common-use antennas and a switch coupled to each of the two antennas. A transponder receiver is coupled to the switch for receiving and decoding ATCRBS/Mode-S format interrogation signals. A transponder transmitter is coupled to the switch for transmitting an ATCRBS/Mode-S format reply signal in response to the received interrogation signals. A TCAS receiver is coupled to the switch for receiving and decoding both unsolicited squitters and reply signals transmitted in response to an interrogation signal transmitted by a TCAS transmitter coupled to the switch. A transmit and switch control circuit is coupled the TCAS transmitter to drive the transmitter to generate the ATCRBS/Mode-S format interrogation signals. The transmit and switch control circuit is also coupled to the ATCRBS/Mode-S transponder transmitter to drive the transmitter to generate reply signals. The transmit and switch control circuit is further coupled to the switch to drive the switch to relay the generated interrogation and reply signals for transmission by at least one of the two common-use antennas.

Although the TCAS and Mode-S functions may be configured to share common antennas, limitations are inherent in the independent operation of the two systems.

SUMMARY OF THE INVENTION

The present invention overcomes limitations of the prior art by providing a L-band digital signal processor that combines the functionality of the TCAS, Mode Select and Airborne Surveillance And Separation Assurance (ASSA) signal processing into one Line Replaceable Unit (LRU). The L-band processor concept provides higher reliability and lower weight than prior art apparatuses. Additional advantages are obtained by using a integrated unit instead of separate TCAS and Mode-S transponders LRUs. These advantages include reduced aircraft wiring and cabling, reduced space requirements in the aircraft's equipment bay, lower overall weight, lower installation costs, reduced MTL for future Mode-S formats which would allow long range active surveillance between aircraft equipped with the apparatus of the invention, reduced power for tracking at current ranges, growth to military formation and station keeping applications, facilitation of installation of dual TCAS on-board aircraft, and sharing of antennas between the TCAS and Mode-S transponder.

The present invention combines these functions in the same unit, whereby a common transmitter/receiver subsystem, signal processing, and antennas are used to simultaneously process ASSA, TCAS and Mode-S data. The system architecture causes the RF data link, civil TCAS functionality, civil Mode-S functionality, signal and software processing to be contained in a single unit. Additionally, external buses with critical timing requirements, such as formation stability guidance among formation members are eliminated since TCAS/Mode-S coordination is accomplished internally by shared signal and software processing.

For military applications, the RF data link, data link encryption, signal and software processing to perform important functions, e.g., position and station keeping, are independent of the military IFF/Mode-S transponder. Therefore, no change is required to the existing IFF/Mode-S transponder(s) installed on the aircraft.

According to one embodiment of the invention, an integrated traffic surveillance apparatus is provided having a pair of common directional antennas structured for transmitting and receiving L-band radio frequency signals; a common radio frequency transmitter coupled to each of the common antennas for transmitting Mode Select and Traffic Alert Collision Avoidance System (TCAS) signals; a common radio frequency receiver coupled to the common antennas for receiving Mode Select and TCAS signals; a digital signal processor coupled to both the transmitter and the receiver, the signal processor having a different Mode Select and TCAS signal processing circuits and being structured for simultaneously processing the Mode Select and TCAS signals, the digital signal processor including one or more internal data busses coupling the different Mode Select and TCAS signal processing circuits; a switch periodically coupling the common antennas to the different Mode Select and TCAS signal processing circuits; and a memory device coupled to both the different Mode Select and TCAS signal processing circuits, the memory device storing data from both the different Mode Select and TCAS signal processing circuits and being structured such that the stored data is available to both the different Mode Select and TCAS signal processing circuits.

According to another aspect of the invention, the digital signal processor also includes a Airborne Surveillance And Separation Assurance (ASSA) signal processing circuit coupled to each of the different Mode Select and TCAS signal processing circuits. The ASSA signal processing circuit is structured for tracking of position, velocity, and identification data received as radio frequency signals via one or both of the antennas. The ASSA signal processing circuit is further structured for integrating data from the different Mode Select and TCAS signal processing circuits.

According to another aspect of the invention, the digital signal processor also includes a an All Weather Formation Capability (AFC) signal processing circuit coupled to the different Mode Select and TCAS signal processing circuits. According to another aspect of the invention, a cryptoprocessor is coupled to the digital signal processor and structured to operate encryption and decryption algorithms.

Accordingly, an integrated traffic surveillance apparatus is provided as a digital signal processor structured to receive as inputs thereto a plurality of L-band radio frequency signals containing a plurality of traffic data comprising both Mode Select and collision avoidance data; software resident on the processor comprising executable program code for implementing a plurality of traffic surveillance functionalities comprising both Mode Select and collision avoidance functionalities; and wherein the processor is structured for simultaneously operating the software implementing both the Mode Select and collision avoidance functionalities.

According to another aspect of the invention, the digital signal processor includes interconnected first and second signal processing circuits structured for simultaneously operating the software for implementing the respective Mode Select and collision avoidance functionalities.

According to another aspect of the invention, the digital signal processor includes one or more data busses interconnecting the first and second signal processing circuits.

According to another aspect of the invention, the integrated traffic surveillance apparatus includes a radio frequency transmitting and receiving module coupled to the processor and structured to transmit and receive different Mode Select and collision avoidance radio frequency signals.

According to another aspect of the invention, the plurality of traffic surveillance functionalities implemented by the software resident on the processor includes an airborne surveillance and separation assurance functionality for integrating the plurality of traffic data.

According to another aspect of the invention, the plurality of traffic surveillance functionalities includes an All Weather Formation Capability (AFC) traffic surveillance functionality.

According to another aspect of the invention, the processor of the invention is further structured for simultaneously operating the software implementing all the AFC, Mode Select and collision avoidance functionalities.

According to another aspect of the invention, the integrated traffic surveillance apparatus of the invention includes memory storage means coupled to the processor and accessible to both the Mode Select and collision avoidance functionalities for reading and writing data.

More specifically, according to another aspect of the invention, the integrated traffic surveillance apparatus of the invention includes a radio frequency module comprising a L-band radio frequency transmitter and receiver and being structured to interface with a pair of directional antennas for transmitting and receiving Mode Select and collision avoidance interrogation and reply signals; a radio frequency synthesizer and intermediate frequency module comprising a plurality of receiver channels for a collision avoidance radio frequency and one or more dedicated receiver channels for a Mode Select radio frequency, the radio frequency synthesizer and intermediate frequency module being coupled to the radio frequency module for transmitting and receiving Mode Select and collision avoidance interrogation and reply signals; and a digital module coupled to the radio frequency module to control the interrogation and reply signals, the digital module comprising a central processing unit structured for simultaneously operating resident executable programming code for common signal processing of different Mode Select and collision avoidance interrogation and reply signals.

According to another aspect of the invention, the digital module includes different interconnected Mode Select and collision avoidance digital signal processors simultaneously operating resident executable programming code for common signal processing of respective Mode Select and collision avoidance interrogation and reply signals.

According to another aspect of the invention, the integrated traffic surveillance apparatus of the invention includes a front end module coupled to the radio frequency module and having an interface structured to couple the radio frequency module to a pair of directional antennas, and a switch for periodically coupling the different Mode Select and collision avoidance signal processors to the antenna interface.

According to another aspect of the invention, the digital module includes a common memory device storing both Mode Select and collision avoidance traffic surveillance data, the memory being accessible to both the Mode Select and collision avoidance digital signal processors.

According to another aspect of the invention, the digital module includes one or more internal busses communicating between the Mode Select and collision avoidance digital signal processors.

According to another aspect of the invention, the resident executable programming code includes airborne surveillance and separation assurance (ASSA) signal processing code for tracking of position, velocity, and identification data received as radio frequency signals via the radio frequency module.

According to another aspect of the invention, the resident executable programming code includes All Weather Formation Capability (AFC) signal processing code, and optionally includes a digital signal processor coupled to the central processing unit and structured to operate encryption and decryption algorithms.

According to still another embodiment of the invention, an integrated traffic surveillance apparatus is provided having a pair of common directional antennas structured for transmitting and receiving L-band radio frequency signals; a common radio frequency transmitter coupled to each of the common antennas for transmitting Mode Select and Traffic Alert Collision Avoidance System (TCAS) signals; a common radio frequency receiver coupled to the common antennas for receiving Mode Select and TCAS signals, a digital signal processor coupled to both the transmitter and the receiver, the signal processor having a different Mode Select and TCAS signal processing circuits and being structured for simultaneously processing the Mode Select and TCAS signals, the digital signal processor including one or more internal data busses coupling the different Mode Select and TCAS signal processing circuits; a switch periodically coupling the common antennas to the different Mode Select and TCAS signal processing circuits; and a memory device coupled to both the different Mode Select and TCAS signal processing circuits, the memory device storing data from both the different Mode Select and TCAS signal processing circuits and being structured such that the stored data is available to both the different Mode Select and TCAS signal processing circuits.

According to another aspect of the invention, the digital signal processor also includes a Airborne Surveillance And Separation Assurance (ASSA) signal processing circuit coupled to each of the different Mode Select and TCAS signal processing circuits. The ASSA signal processing circuit is structured for tracking of position, velocity, and identification data received as radio frequency signals via one or both of the antennas. The ASSA signal processing circuit is further structured for integrating data from the different Mode Select and TCAS signal processing circuits.

According to another aspect of the invention, the digital signal processor also includes a an All Weather Formation Capability (AFC) signal processing circuit coupled to the different Mode Select and TCAS signal processing circuits. According to another aspect of the invention, a cryptoprocessor is coupled to the digital signal processor and structured to operate encryption and decryption algorithms.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The present invention is an apparatus and method for combining the functionality of all the systems that operate in the 1 giga-Hz range, i.e., the systems that operate in the approximate range of L-band frequency range of 1000 MHz. Accordingly, the apparatus and method of the present invention combine the functionality of both a Traffic Alert Collision Avoidance System (TCAS) and a Mode-Select (Mode-S) transponder in an integrated L-band traffic surveillance apparatus having a single processor that is embodied in a single Line Replaceable Unit or "LRU."

Accordingly, the present invention is a integrated traffic surveillance apparatus embodied in a radio frequency module comprising a L-band radio frequency transmitter and receiver and being structured to interface with a pair of directional antennas for transmitting and receiving Mode Select and collision avoidance interrogation and reply signals; a radio frequency synthesizer and intermediate frequency module comprising a plurality of receiver channels for a collision avoidance radio frequency and one or more dedicated receiver channels for a Mode Select radio frequency, the radio frequency synthesizer and intermediate frequency module being coupled to the radio frequency module for transmitting and receiving Mode Select and collision avoidance interrogation and reply signals; and a digital module coupled to the radio frequency module to control the interrogation and reply signals, the digital module comprising a central processing unit structured for simultaneously operating resident executable programming code for common signal processing of different Mode Select and collision avoidance interrogation and reply signals.

Figure 1:
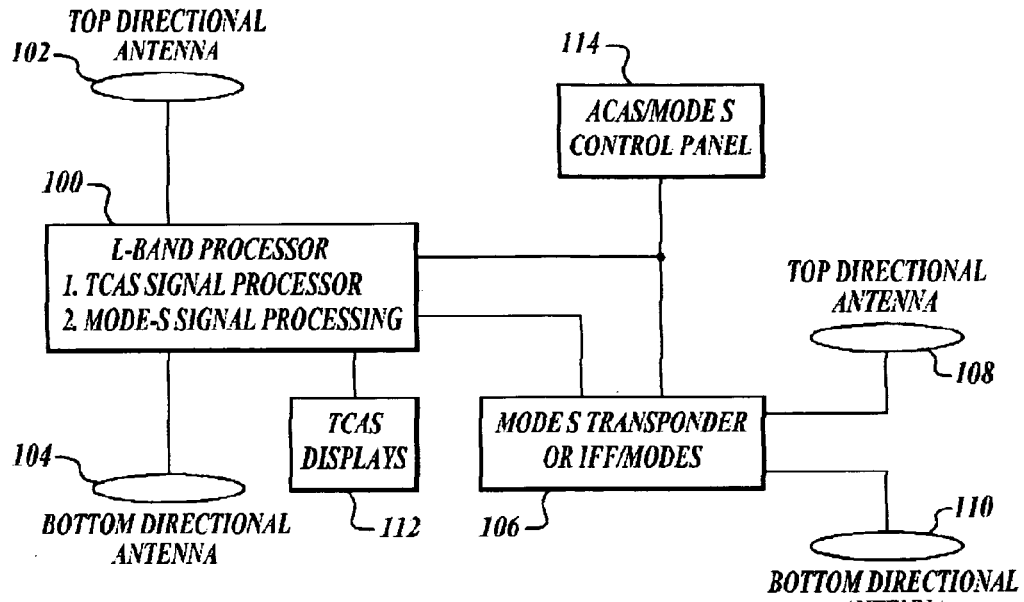
FIG. 1 is a block diagram that illustrates a single unit installation embodiment of the L-band processor of the invention with an external transponder.
Figure 2:
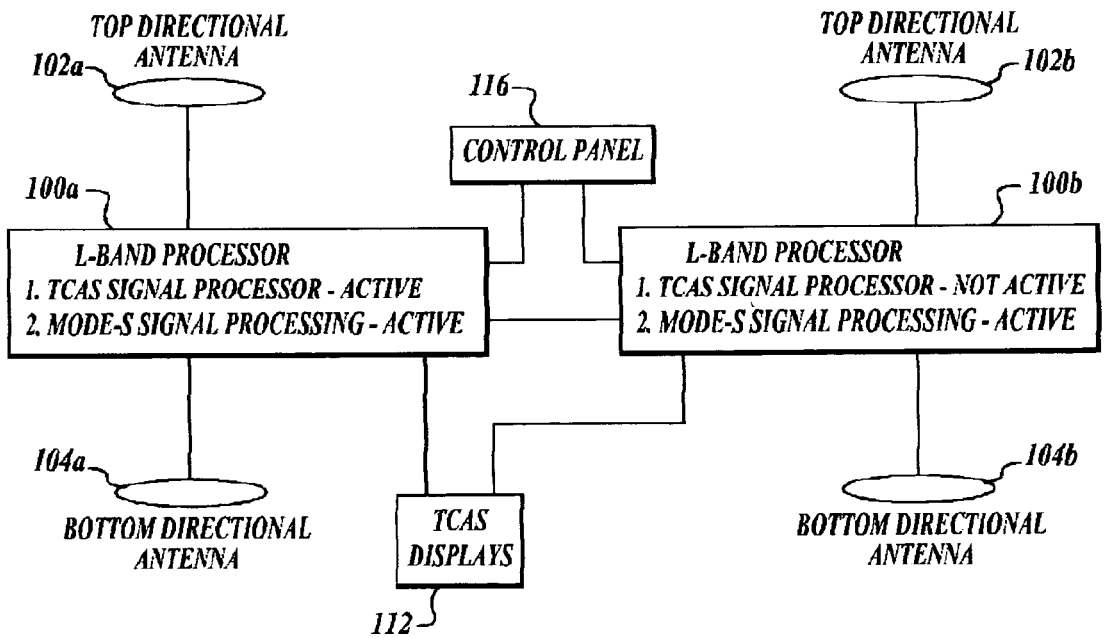
FIG. 2 is a block diagram that illustrates a dual unit installation embodiment of the L-band processor of the invention.

FIG. 1 and FIG. 2 are block diagrams that illustrate different aircraft installations of the integrated L-band apparatus of the invention which is installed in an aircraft either as a single or a dual unit. The single unit installation embodiment of the integrated L-band traffic surveillance apparatus 100 of the invention illustrated in FIG. 1 provides functionality equivalent to a separate TCAS processor in combination with a single Mode-S transponder. The single L-band traffic surveillance apparatus 100 is installed into existing aircraft installations having conventional top and bottom multi-element, multi-directional antennas 102, 104 that are shared in common by the TCAS and Mode-S functions of the unit. Sharing antennas permits elimination of the top and bottom single element omnidirectional monopole output antennas normally used by the transponder for Mode-S functions, which are replaced with the multi-element, multi-directional L-band antennas normally used with TCAS. The design of the reply processing within the integrated L-band apparatus of the invention eliminates the requirement for phase-matched cables that are required per ARINC. The L-band traffic surveillance apparatus 100 of the invention is structured to determine the frequency of transponder replies, as well as determine the phase differences between the cables to the common TCAS/Mode-S transponder antenna at different frequencies. This enables automatic compensation of phase differences that are caused by cable variations. The device includes hardware provisions for generating any standard Mode-S interrogation including UFO cross-link interrogation as defined in RTCA DO-185A. This cross-link interrogation is used to request any one of the 256 Ground Initiated Comm-B (GICB) registers contained in another aircraft's Mode-S address. Information that can be requested includes Flight ID (identification), TCP data, heading, and intent. For example, U.S. Pat. No. 6,222,480, the complete disclosure of which is incorporated herein by reference, describes a integrated TCAS/Mode-S system wherein both functions share common antennas, including a switch coupling common antennas to the different TCAS and Mode-S functions. Alternatively, the L-band traffic surveillance apparatus 100 of the invention utilizes frequency discrimination to permit sharing of the common antennas 102, 104 between the different TCAS and Mode-S functions. The TCAS and Mode-S operate on complementary frequencies: the Mode-S receives at 1030 MHz and transmits at 1090 MHz, while the TCAS transmits at 1030 MHz and receives at 1090 MHz.

The single L-band traffic surveillance apparatus 100 of the invention is practiced having both the TCAS and Mode-S transponder functions active and interfaces with one external Mode-S transponder 106, which is optionally an (identify friend or foe) IFF/Mode-S transponder, having its own dedicated top and bottom L-band antennas 108, 110. Furthermore, the single L-band traffic surveillance apparatus 100 of the invention interfaces with conventional TCAS displays 112 and a conventional ACAS/Mode-S or TCAS/Mode-S control panel 114, where ACAS is Airborne Collision Avoidance System which is similar to the TCAS collision avoidance system as implemented outside the United States.

The dual unit installation embodiment of the integrated L-band traffic surveillance apparatus 100 of the invention illustrated in FIG. 2 provides functionality of three separate LRUs of the prior art, i.e., functionality equivalent to a separate TCAS processor in combination with dual Mode-S transponders of the prior art. The dual integrated L-band traffic surveillance apparatuses 100a, 100b are installed in combination with respective conventional top directional antennas 102a, 102b and bottom directional antennas 104a, 104b that are shared in common by the TCAS and Mode-S transponder functions of the dual traffic surveillance apparatuses 100a, 100b. Each of the dual L-band traffic surveillance apparatuses 100a, 100b includes the dual TCAS and Mode-S transponder functionality, but according to one embodiment of the invention, the TCAS function of only one of the dual L-band traffic surveillance apparatuses 100a, 100b is activated. Each of the dual L-band traffic surveillance apparatuses 100a, 100b interfaces with one another. Furthermore, the dual integrated L-band traffic surveillance apparatuses 100a, 100b of the invention both interface with conventional TCAS displays 112 and a common control panel 116.

The dual installation of FIG. 2 eliminates the external Mode-S transponder 106 shown in FIG. 1 along with its dedicated top and bottom L-band antennas 108, 110, and replaces the ACAS/Mode-S control panel 114 with the control panel 116 shared in common by both the dual integrated L-band traffic surveillance apparatuses 100a, 100b. Furthermore, because the TCAS and Mode-S transponder functions of the dual L-band traffic surveillance apparatuses 100a, 100b share a common TCAS directional L-band antenna, the dual unit installation embodiment of FIG. 2 obtains a saving over prior art installations having separate components of two antennas and two coaxial cable runs between the devices and the antennas. The TCAS/Mode-S transponder portions of the one or more integrated L-band traffic surveillance apparatuses 100 compute TCAS functions using aircraft parameters, the dedicated pair of antennas 102, 104, and data received from the transponder function, at least in accordance with DO-185A and DO-181C, to provide traffic information to captain and first officer navigation displays 112.

The device of the invention optionally includes space provisions for incorporation of a UAT (universal asynchronous transmitter) receiver.

The integrated L-band processor of the invention optionally serves as the traffic server for other aircraft systems that require traffic information. The software operated by the integrated L-band processor of the invention is structured to be updated to provide traffic data upon request over the adaptive flight display transmitter (AFDX) bus.

Figure 3:
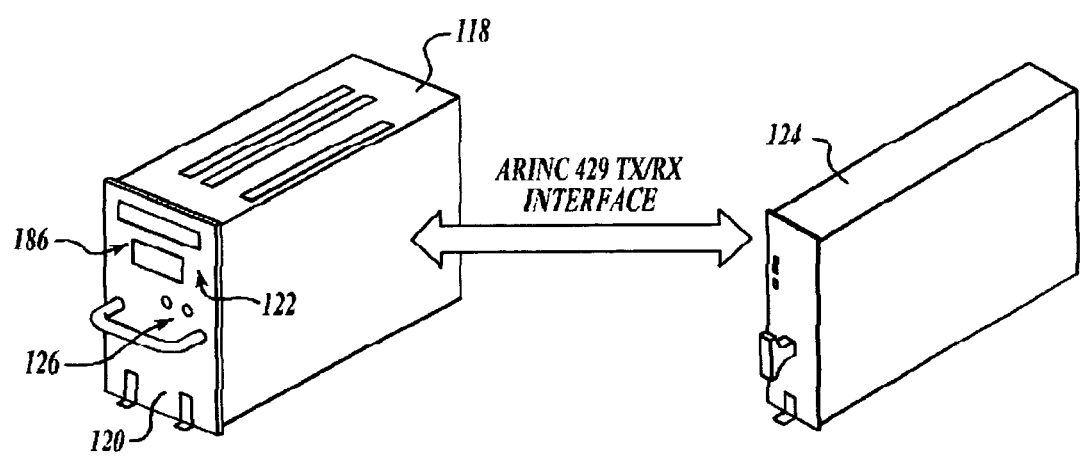
FIG. 3 illustrates the integrated L-band traffic surveillance apparatus of the invention embodied in two separate Line Replaceable Units.

The integrated L-band traffic surveillance apparatus 100 of the invention combines the functionality of a TCAS and a Mode-S transponder in a single device commonly referred to as a Line Replaceable Unit (LRU) 118, as illustrated in FIG. 3. The LRU 118 housing the integrated L-band traffic surveillance apparatus 100 is a modular system with plug-in subassemblies. Each module is restrained with fasteners to a chassis assembly. Any extraction devices or leverage used to remove a module is an integral part of the assembly that is to be removed. The LRU 118 has no interconnect or RF cables. All signal routing is accomplished via a mother board installed behind the front panel and aircraft I/O is routed to each subassembly via the rear interconnect module. RF signal routing is accomplished using blind-mate connectors. The system requires no manual tuning in the factory, all tuning is accomplished automatically using software calibration algorithms. Accordingly, a single device simultaneously performs signal processing for both the TCAS and Mode-S functions, whereby accuracy of data is controlled and data is more effectively controlled and managed than by the separate TCAS and Mode-S processors of the prior art that must exchange data over an interconnecting ARINC 249 bus. For example, time and data transfer delays are shortened by performing simultaneous signal processing for both the TCAS and Mode-S functions on the common L-processor of the invention. Furthermore, all data is more readily and quickly available for use by both the TCAS and Mode-S functions because the L-processor of the invention is common to both the TCAS and Mode-S functions. Accordingly, the integrated L-band processor of the invention provides the following functionality. The TCAS portion of the integrated L-band processor of the invention is compatible with ACAS II devices and provides the functionality of ACAS II Hybrid Surveillance using ADS-B squitters. The Mode-S transponder portion of the present integrated L-band processor provides basic or elementary and enhanced surveillance functionality according to the known requirements for Downlink Aircraft Parameters (DAPs). The Mode-S transponder portion also provides Multisite Acquisition Functionality as listed in the DFS Deutsche Flusgsicherung GmbH (German Air Navigation Services) *AERONAUTICAL INFORMATION CIRCULAR (AIC) for HARMONISATION OF REGULATIONS GOVERNING AIRBORNE SSR EQUIPMENT*, dated Aug. 13, 1998. Additionally, the Mode-S transponder portion of the invention provides extended squitter functionality as a form of Automatic Dependent Surveillance-Broadcast, known as ADS-B; and Level 5 Data Link capability as defined by Amendment No. 71 to the *INTERNATIONAL STANDARDS AND RECOMMENDED PRACTICES, AERONAUTICAL TELECOMMUNICATIONS, VOLUME IV, SURVEILLANCE RADAR AND COLLISION AVOIDANCE SYSTEMS*, First Edition, dated July 1995. The Mode-S transponder provides DataFlash capability as specified by the International Civil Aviation Organization (ICAO) in the *MANUAL ON MODE-S SPECIFIC SERVICES* for extracting information that may not change very often; EUROCAE ED-86 functional equivalency as defined by *EQUIPMENT CHARACTERISTICS FOR MODE S TRANSPONDERS WITH EXTENDED INTERFACE FUNCTIONS (MARK 4 TRANSPONDER)*, dated July 1997. The Mode-S transponder provides external data loading capability by way of one or more input/output (I/O) interfaces and external diagnostic capability. Furthermore, the software and hardware operating both the TCAS functions and the Mode-S transponder function is compliant with appropriate levels of certification.

By combining the functionality of a TCAS and a Mode-S transponder in a single LRU device 118, the integrated L-band processor of the invention provides higher reliability and lower weight than prior art devices. Additional advantages of the integrated L-band processor of the invention over separate TCAS and Mode-S transponders are: reduced aircraft wiring and cabling because the wiring and cabling normally used to access the individual units is eliminated; reduced space is needed to install the integrated L-band processor in the aircraft's equipment bay, and installation costs for a single unit are lower than that for separate TCAS and Mode-S transponders; the integrated L-band processor is lower in overall weight as compared with separate TCAS and Mode-S transponders. The size, weight and wiring savings facilitate installation of dual TCAS units on-board an aircraft. The TCAS and Mode-S transponder functions in the integrated L-band processor of the invention share common antennas, which eliminates the unit cost, weight and installation costs of dedicated antennas for each of the separate TCAS and Mode-S transponder devices.

The integrated L-band processor of the invention also provides a potential for reduced Minimum Trigger Level (MTL) for future Mode-S formats, e.g., DF=19, which permits long range active surveillance between similarly equipped aircraft; reduced power consumption for tracking at current ranges; and growth to military formation and station keeping applications. Because the integrated L-band processor of the invention is intended to provide for implementation of a fully integrated "flight safety" suite on-board an aircraft, the integrated L-band processor of the invention includes provisions to interface with a weather radar unit, external input/output interface units, and a ground proximity warning system, such as the Enhanced Ground Proximity Warning System available from Honeywell International, Incorporated of Redmond, Wash.

The different functions provided by the integrated L-band processor unit of the invention provide a plurality of different capabilities. For each of the different types of ACAS II and Mode-S transponder functions listed, an equivalent level of functionality is provided by the applicable stand-alone unit. Regarding ACAS II functionality, the integrated L-band processor unit of the invention complies with the specification TSO C119b which is the Federal Aviation Administration Technical Standard Order for Traffic Alert and Collision Avoidance System (TCAS) Airborne Equipment, TCAS II, dated Dec. 18, 1998, for ACAS II functionality and with ARINC 735A, the Mark 2 Traffic Alert and Collision Avoidance System (TCAS), dated Dec. 10, 1997, with exceptions for form factor. The integrated L-band processor unit of the invention also provides the functional requirements of an ACAS II system as defined in RTCA DO-185A, *MINIMUM OPERATIONAL PERFORMANCE STANDARDS FOR TCAS AIRBORNE EQUIPMENT*, dated December 1997 with Volume I, Volume II, and Attachment A. The ACAS II capabilities of the integrated L-band processor unit of the invention include: traffic information, collision avoidance, active surveillance, passive surveillance, event information recording, and an interface for communication with an external Mode-S transponder.

Regarding the capability of the traffic information function, the integrated L-band processor of the invention includes an interface for communication with the aircraft display system to provide visual indications of intruder aircraft. Information provided to the display in regards to intruder aircraft includes: intruder type, i.e., Resolution Advisory, Traffic Advisory, proximity, other proximity; intruder aircraft altitude relative to own aircraft, intruder aircraft bearing; intruder aircraft range; intruder Mode A code is optional, as is flight identification, when available; and aircraft intent and velocity vectors are also optional when available.

Regarding the capability of the collision avoidance function, the integrated L-band processor of the invention provides the collision avoidance function required of an ACAS II system. The collision avoidance algorithms are those defined in RTCA DO-185A. The integrated L-band processor of the invention interfaces with the aircraft display system to provide visual annunciations of Traffic Alert (TA) and Resolution Advisory (RA) commands in the vertical plane. The integrated L-band processor of the invention implements the collision avoidance logic as defined by RTCA DO185A. In the integrated L-band processor of the invention, the collision avoidance functionality is adapted to reflect differences in system and aircraft interfaces. In particular, ACS (Active Control System) advisories are provided to a Centralized Alert Management function within the device for prioritization and display. TCAS traffic data is provided to the CDS (Computer Display System) in the form of ARINC 661 widgets. TCAS resolution advisory data is the same information as defined by ARINC label 270 of ARINC 735A. Aural warnings are generated by the integrated L-band processor and provided via one or both of the flight deck speakers and headphones.

The TCAS sub-function of the integrated L-band processor of the invention records information into non-volatile memory during Resolution Advisory (RA) and Traffic Advisory (TA) events. There is provided in connection with the integrated L-band processor of the invention a memory device having sufficient memory to record multiple Traffic Advisory and Resolution Advisory events. According to one embodiment of the invention, the memory is sufficient to record at least 60 Traffic Advisory events and 10 Resolution Advisory events. According to one embodiment of the invention, during a Resolution Advisory, intruder and own-aircraft state information is recorded for each second of the event duration. This state information is available for retrieval via the on-board data load function or via the Ethernet port available on the front panel of the device.

The following Resolution Advisory Information is recorded for RA events only: an altitude crossing threat flag; an active resolution advisory flag; a multiple threat encounter flag; resolution advisory complement data; a resolution advisory indicator flag; an indication of whether aircraft is clear of traffic; a combined control indicator; a vertical control mode indicator; an up-advisory indicator; a down-advisory indicator; and an advisory rate to maintain.

The following own-aircraft state information is recorded for both RA and TA events: own-aircraft tracked altitude and rate; own-aircraft's collision avoidance sensitivity level; an indication of whether own aircraft is near ground and descend resolution advisories are inhibited; an indication of whether increase descent resolution advisory is inhibited; a "climb advisory inhibited" flag; an "increasing climb advisory inhibited" flag; and a radio altitude and its credibility status.

The following intruder aircraft state information is recorded for both RA and TA events: the Mode-S discrete address, which is zero for non-Mode-S-equipped intruders; TCAS equipage; both tracked range and range rate; both relative altitude and altitude rate, firmness and confidence indicators of tracked altitude, range, and bearing; a TCAS sensitivity level; bearing relative to own aircraft, and bearing status; a valid surveillance report indicator; a vertical miss-distance at closest approach; a horizontal miss distance; an indication of resolution advisory cleared, which does not apply for TA events; and time between Traffic Advisory and initial Resolution Advisory.

The TCAS sub-function of the integrated L-band processor of the invention accepts simulations of TCAS intruders and own aircraft data, with capabilities similar to those provided by the known TCAS devices. The integrated L-band processor of the invention accepts this simulation data via Ethernet or AFDX. Such simulation permits testing of the integration of the TCAS function with the displays and other processor and aircraft functions without actual intruders or RF functionality. The simulation is able to generate simulation of traffic so that test Resolution Advisories and Traffic Advisory alerts are generated.

Regarding the capability of the active surveillance function, the integrated L-band processor of the invention utilizes Active Surveillance, as defined in RTCA DO-185A, to track Mode C and Mode-S equipped intruder aircraft. The Active Surveillance is performed as radio frequency interrogation at 1030 MHz to ATC Mode-S transponder-equipped aircraft in the vicinity. The integrated L-band processor uses active surveillance to extract intruder altitude, if available, and, optionally, Mode A code information from intruder aircraft equipped with an ATCRBS-Transponder for Mode-S transponder equipped intruder aircraft, the integrated L-band processor uses active surveillance to extract intruder identification, including Mode-S address, flight identification when available, and optionally, Mode A code information. Other information provided by active surveillance includes intruder range and bearing. In addition, for Mode-S equipped intruder aircraft, the information provided by active surveillance includes the intruder's Mode-S address, an indication of the intruder's air-ground status, and an indication of the intruder's TCAS equipage is also provided. Up to 60 active tracks are maintained by the integrated L-band processor: 15 of these 60 active tracks are reserved to initialize tracks for new intruders that are at closer range than the intruders already being tracked. The integrated L-band processor also supports automatic selection of "Above," "Below," and "Normal" as a function of flight phase according to proprietary automation rules.

Also regarding the capability of the active surveillance functionality, the integrated L-band processor of the invention includes capability for providing enhanced long-range active surveillance that maximizes the range at which active tracks can be maintained using standard TCAS interrogations. In compliance with DO-185A interference limiting criteria, the integrated L-band processor supports long-range active surveillance up to 100 nautical miles at cruise altitude, rather than the standard TCAS range of 20 to 40 nautical miles. The ADS-B surveillance of the integrated L-band processor achieves a 100 nautical mile tracking range. This range is strongly influenced by the presence and rate of ATCRBS FRUIT replies.

The ACAS II function in the integrated L-band processor of the invention also includes a hybrid surveillance function as defined by ICAO Annex 10, Volume 4, regarding which the integrated L-band processor of the invention is compatible with the RTCA SC-186 1090 MOPS, which is Minimal Operational Performance Standards for 1090 MHz Automatic Dependent Surveillance-Broadcast (ADS-B). The integrated L-band processor of the invention is compatible with the ACAS SARPs, Standards and Recommended Practices, which is generally used in reference to ICAO Aeronautical Telecommunications, Annex 10 to the Convention on International Civil Aviation. Volume III, Part I, Amendment No. 71 to the International Standards and Recommended Practices, Aeronautical Telecommunications, Volume IV, Surveillance Radar and Collision Avoidance Systems, First Edition, dated July 1995, together with changes as approved by SICASP/6 in February 1997. The integrated L-band processor of the invention includes the capability to receive and process ADS-B squitters at 1090 MHz. ADS-B capable Mode-S-equipped aircraft transmit these squitters. The minimum information received and processed by the integrated L-band processor of the invention includes intruder identification, i.e., Mode-S address and flight identification; intruder aircraft position and velocity data; and intruder aircraft flight path intent, i.e., trajectory change points/waypoints.

The integrated L-band processor generates an ADS-B report and makes it available to other of the aircraft's systems. The integrated L-band processor is also capable of receiving and processing ADS-B reports from other of the aircraft's systems, such as VHF radio communications, Universal Access Transceiver (UAT), and others, via ARINC 429 input. The optimal reception range for passive surveillance is greater than 100 nautical miles.

The software by which the integrated L-band processor of the invention is implemented preferably additionally supports accessing of a terrain database from a memory storage unit for aid in determining the on-ground/in-air status of other aircraft. For example, the integrated L-band processor of the invention compares an altitude state of an intruder aircraft with ground elevation corresponding to the intruder's position and determines whether the two values coincide sufficiently to indicate an intruder on-ground status, or differ sufficiently to indicate an intruder in-air status. Additionally, software by which the TCAS functionality is implemented by the integrated L-band processor of the invention operates the TCAS cross-link interrogation to acquire Flight ID from aircraft that do not broadcast their Flight ID via ADS-B. This acquisition of Flight ID enables display of Flight ID even before wide spread implementation of ADS-B, especially in light of the 2003 mandate for basic or elementary surveillance which includes the availability of Flight ID.

In addition, space provisions are included to extend the traffic surveillance activity to on-ground, push-back from the gate, taxi to the runway or for re-positioning, runway exit, and taxi up to the gate or parking location.

The ACAS II function in the integrated L-band processor of the invention includes the capability to interface with an external Mode-S transponder. The external Mode-S transponder, or an additional one of the integrated L-band processor of the invention having the combined functionality of a TCAS and a Mode-S transponder in a single integrated device, is installed on the aircraft as a customer option. Bus communication between the integrated L-band processor of the invention and an external Mode-S transponder is as stated in ARINC 735A and RTCA/DO-181C, which is the *MINIMUM OPERATIONAL PERFORMANCE STANDARDS FOR THE AIR TRAFFIC CONTROL RADAR BEACON SYSTEM/MODE SELECT AIRBORNE EQUIPMENT*, dated Jun. 12, 2001. This causes the integrated L-band processor to be compatible with RTCA/DO-185 and RTCA/DO-185A, Change 7.0, Mode-S transponder units.

The transponder function in the integrated L-band processor of the invention performs Mode-A, Mode-C, and Mode-S functionality as defined by RTCA DO-181C, TSO C112, ED-73A, and ED-82. Regarding Mode-S transponder functionality, the integrated L-band processor unit of the invention complies with several specifications for Mode-S transponder functionality, including: TSO C112 which is the Federal Aviation Administration Technical Standard Order for Air Traffic Control Radar Beacon System/Mode Select Airborne Equipment, dated Feb. 5, 1986; J-TSO 2C112 which is the Joint Aviation Authorities Joint Technical Standard Order for Air Traffic Control Radar Beacon System/Mode Select Airborne Equipment, dated Jan. 9, 2000; EUROCAE ED-86 with exceptions for form factor; and RTCA DO-181C. The integrated L-band processor unit of the invention also complies with the functional requirements of a Mark IV Mode-S transponder as defined in the EUROCAE ED-86 specification and ARINC 718A which is the specification Mark 4 Air Traffic Control Transponder (ATCRBS/Mode S), dated Feb. 15, 2002.

The Mode-S transponder capabilities of the integrated L-band processor of the invention include: an ACAS II data link capability that causes the integrated L-band processor to satisfy the ACAS SARPs; elementary and enhanced surveillance capabilities according to EUROCONTROL, which is the Specimen AIC for *HARMONISATION OF REGULATIONS GOVERNING AIRBORNE SSR EQUIPMENT*, dated January 1997; a multisite acquisition capability as listed in the DFS Deutsche Flusgsicherung GmbH (German Air Navigation Services) *AERONAUTICAL INFORMATION CIRCULAR (AIC) FOR HARMONISATION OF REGULATIONS GOVERNING AIRBORNE SSR EQUIPMENT*, dated Aug. 13, 1998; an extended squitter broadcast capability in the ADS-B form of Automatic Dependent Surveillance; a Dataflash capability as specified by the ICAO; and Level 5 category of Mode-S transponder equipment capability.

Regarding the capability of the ACAS II data link function, the integrated L-band processor of the invention includes capability for transmitting three ACAS related Mode-S messages using SARPs formats in order to satisfy the ACAS SARPs. The messages are: resolution advisory (RA) report as an air-to-ground communication, data link capability report as an air-to-ground communication, and coordination reply message as an air-to-air communication.

Regarding the capability of the surveillance functionality, the integrated L-band processor of the invention includes capability for providing the two parts: basic or elementary and enhanced surveillance as defined by the Specimen AIC for *HARMONISATION OF REGULATIONS GOVERNING AIRBORNE SSR EQUIPMENT*, dated January 1997, and which together make up the requirements for Downlink Aircraft Parameters (DAPs). The integrated L-band processor of the invention complies with both sets of functionality. As implemented in the integrated L-band processor of the invention, the elementary and enhanced surveillance capabilities support downlink of elementary and enhanced own-aircraft parameters. Specifically Comm-B Designation Subfield (BDS) registers 2.0, 4.0, 5.0, and 6.0, as defined in ICAO Annex 10, are supported for implementation of enhanced surveillance. Other registers mandated by civil aviation authorities are preferably implemented in the baseline device. Hardware provisions are provided so that all 256 Ground Initiated Comm-B (GICB) registers are optionally filled per requirements of ICAO Annex 10 and future civil aviation authority requirements and mandates.

Accordingly, the transponder provides the following functionality for elementary surveillance: 24 bit aircraft address; automatic reporting of flight identity; transponder capability reports, which includes both data link capability and Common Usage GICB capability; altitude reporting in 25 feet intervals; and flight status reporting of either airborne or on-the-ground. The transponder satisfies the current definition for enhanced surveillance by providing the following functionality: selected altitude; roll angle; track angle rate; true track angle; ground speed; true airspeed; magnetic heading; indicated airspeed; mach number; and vertical rate either as barometric rate of climb/descend or baro-inertial vertical rate.

Further surveillance requirements, as listed in the German AIC, include the multisite acquisition of Mode-S transponders. These multisite acquisition surveillance requirements are carried out by using the Mode-S Only All-Call interrogation. The interrogator code of the interrogating site is contained in the interrogation. Therefore, in accordance with DO-181C, the integrated L-band processor of the invention includes two types of interrogator codes: Interrogator Identifier Code (II Code) is used for multisite surveillance and data link coordination, and Surveillance Identifier Code (SI Code) is used for multisite surveillance only.

The integrated L-band processor of the invention transmits extended squitter broadcast to support the broadcast of own-aircraft derived position, identification, velocity, and state information, as defined by RTCA DO-260, when the appropriate data is provided to the device. The broadcast of this type of information is a form of Automatic Dependent Surveillance known as ADS-B. The format used for the extended squitter is the 112-bit DF=17. Transmission of DF=19 is provided as a growth option for military applications.

Mode-S transponders are categorized in one of five equipment capability levels as defined by ICAO Aeronautical Telecommunications, Annex 10 to the Convention on International Civil Aviation. Volume III, Part I, Amendment No. 71 to the International Standards and Recommended Practices, Aeronautical Telecommunications, Volume IV, Surveillance Radar and Collision Avoidance Systems, First Edition, dated July 1995. The integrated L-band processor of the invention includes hardware to support the requirements of a Level 5 transponder wherein:

Level 1 allows surveillance based on Mode A/C/S operations. With a Mode-S aircraft address it comprises the minimum features for compatible operation with Mode-S interrogators. It has no data link capability and is only able to receive 56 bit messages.

Level 2 has the same capabilities as Level 1. Additionally, Level 2 allows standard length communication messages of 56 bits (Comm-A and Comm-B) from ground-to-air and air-to-ground. Level 2 includes data link capability reporting and aircraft identification reporting.

Level 3 has the same capabilities as Level 2. Additionally, Level 3 allows extended length message (ELM) communications from ground-to-air. A Level 3 unit is capable of receiving 16 linked 80 bit messages segments (each within a 112-bit transmission).

Level 4 has the same capabilities as Level 3. Additionally, Level 4 allows extended length message communications from air-to-ground. A Level 4 unit is capable of transmitting 16 linked 80 bit messages segments (each within a 112-bit transmission).

Level 5 has the same capabilities as Level 4. Additionally, Level 5 allows Comm-B and extended length data link communications with multiple interrogations without requiring the use of multisite reservations.

Dataflash is a contract-based service specified by ICAO in ICAO DOC 9688-AN/952 the Manual on Mode S Specific Services, First Edition, dated 1997. Dataflash relies on the aircraft system announcing, in its Mode-S replies to surveillance interrogations, that a parameter in a contracted Ground Initiated Comm B (GICB) register has changed according to rules agreed in the contract. Because it does not require regular interrogations to check the status of the parameter, Dataflash is an efficient protocol that can be used to extract information that may not change very often. The integrated L-band processor of the invention is software upgradeable to implement Dataflash protocol per the MOPS currently being developed by EUROCAE WG-49 as Minimum Operational Performance Specification for Mode S Specific Service Applications.

The integrated L-band processor of the invention is ARINC 718A and EUROCAE ED-86 compatible and complies with transponder function requirements as set forth in ARINC 718A and ED-86, Section 4.2; extended interface function requirements for the Mode-S Specific Services as set forth in ARINC 718A and ED-86, Section 4.3; and provisions to source transponder default configuration and installation specific configuration from non-volatile random access memory (via Dataload), as set forth in ARINC 718A and ED-86, Section 4.4. Additionally, the transponder is configured to support an Emergency Security Mode that locks the transponder into using a Mode-A code of 7500.

According to one embodiment of the invention, the baseline integrated L-band processor of the invention implements a well-known Airborne Surveillance and Separation Assurance (ASSA) or Traffic Surveillance functionality. Accordingly, the baseline integrated L-band processor of the invention implements the 1090 MHz ADS-B receiver function as defined in RTCA DO-260. Because the 1090 MHz ADS-B receive-function is shared with the TCAS receiver the baseline integrated L-band processor implements a dual minimum trigger level (MTL) receiver that implements a dual adjustable MTL level: one MTL for standard TCAS replies and squitters, the other MTL for ADS-B messages. Additionally, the integrated L-band processor implements a reply processor that is re-triggerable, whereby even with a lower MTL overlapping, stronger replies or squitters are guaranteed to have precedence or priority over weaker signals. The reply processing hardware also includes provisions to monitor 1090 MHz TIS-B data. The integrated L-band processor implements maximized receiver availability of at least 90 percent by disabling the 1090 MHz receivers only during the period of either transponder or TCAS transmissions. Furthermore, the integrated L-band processor implements receiver hardware throughput provisioning to handle peak squitter/TIS-B rates which are predicted to occur when ADS-B implementation becomes widespread.

According to the invention, traffic surveillance is performed using 1090 MHz ADS-B Data. The ASSA function of the integrated L-band processor of the invention maintains tracks of aircraft that report position, velocity, and identification data via 1090 MHz ADS-B reports. The ASSA function includes capacity to handle ADS-B reports from up to 400 different ADS-B equipped aircraft. As a minimum, the following data is maintained for each ADS-B track: latitude/longitude position, direction and magnitude of velocity, flight ID, relative slant range, relative bearing, and barometric altitude.

The integrated L-band processor of the invention provides monitoring and recording in-band CW (continuous wave) interference to aid in determining if required isolation between other potentially interfering L-band systems has been achieved. This data is available via the data loader, or through an Ethernet data recording port in the control panel 114, 116 of the device.

The ASSA function utilizes TCAS and ADS-B data to provide consolidated traffic information (CDTI) to the device display 112. The ASSA function integrates or "fuses" the traffic data such that only one symbol is displayed per intruder when multiple data sources, i.e., 1090 MHz ADS-B and TCAS, for the intruder exist. Baseline fusion and traffic merging criteria are based primarily on the Mode-S address. The rules governing this consolidation function are based on FAA certification of the integrated L-band processor of the invention as well as new regulatory and industry guidance material currently being developed by RTCA SC-186.

The ASSA function maintains tracks of aircraft on the ground when own-aircraft is on-ground, on approach, or below a selected altitude, such as an altitude of 2000 feet AGL (above ground level). The integrated L-band processor of the invention provides a display mode selectable by the crew via a menu selection that displays traffic on the ground.

The software by which the integrated L-band processor of the invention is implemented preferably supports additional functions. For example, the software operated by the integrated L-band processor supports fusion of non-1090 MHz ADS-B data, such as VDL Mode 4. The software operated by the integrated L-band processor is structured to accept non-1090 MHz ADS-B data via the AFDX. These reports are consolidated with the 1090 MHz ADS-B data into a merged and consistent traffic display output provided as part of the consolidated traffic information (CDTI) to the device display 112. Additionally, the consolidated traffic information (CDTI) is structured to permit the pilot to select a traffic symbol on the display 112 and to have additional information on the aircraft displayed, the additional information includes: airspeed, flight path, flight ID, aircraft type, and other useful information regarding the intruder aircraft. The surveillance information to support this functionality is available as part of the device traffic surveillance function.

The software operated by the integrated L-band processor is structured to support tracking, consolidation, and display of 1090 MHz TIS-B data. The software is also structured to support more sophisticated traffic display de-cluttering algorithms based on flight plan as the number of aircraft broadcasting ADS-B is increased.

The ASSA or Traffic Surveillance function of the integrated L-band processor is provisioned to support future separation assurance applications. Government and industry groups are currently defining these applications. Some currently proposed applications include Approach Spacing Tools and Airborne Conflict Detection & Resolution. Implementation of these functions will require the approval of regulatory agencies and considerable more research into areas of HMI (Human Machine Interface) and ATC (Air Traffic Control).

The integrated L-band processor of the invention as embodied in the LRU 118 is provided with a unit outline in accordance with a common 4 MCU (modular concept unit) form factor and has a maximum weight of 12.5 pounds. The integrated L-band processor of the invention includes a universal power supply structured to use either 115 VAC or 28VDC input power with a normal power consumption of about 88 Watts. The integrated L-band processor of the invention is structured to be compatible with ARINC 404/600 forced air cooling; however, installation-provided forced air cooling is optional, not required.

The integrated L-band processor of the invention as embodied in a LRU includes a front panel 120 that contains an LCD display 122 having 16 characters by 4 lines with 2 buttons. The LCD display 122 of the LRU 118 is structured to support a BITE Test Initiation function; a BITE Test Results function; a Fault Memory Access function; a software and hardware configuration function; a program pin and discrete status function; an initiation of Dataload operation from PCMCIA card; and initiation of reports downloaded to data loader or PCMCIA card. The integrated L-band processor of the invention as embodied in a LRU includes a PCMCIA card interface 186 embodied as a card slot available on the front panel 120. The PCMCIA interface 186 includes capabilities that permit it to support a Dataload software function; a download fault memory function; a download Flight Advisory history function; and a store flight data function. The PCMCIA interface 186 is structured to transmit fault memory to a remote maintenance facility using a modem PCMCIA card. The PCMCIA interface 186 also includes a commercial encryption key interface.

The integrated L-band processor of the invention a rear connector according to the TCAS ARINC 600 connector as shown in ARINC 735A. The rear connector is modified to include Right Top Plug (RTP) connector block to allow for additional Transponder interfaces.

The MTBF (Mean Time Between Failures) of the integrated L-band processor of the invention is predicted to be a minimum of 30,000 hours as calculated in accordance with Mil-Hdbk-217E based on an LRU internal ambient temperature of 55 degrees Celsius, operating in an Airborne Inhabited Cargo environment. Furthermore, the integrated L-band processor of the invention is designed to facilitate ease of maintenance and repair. Special tools, test equipment or facilities are not required in order to determine if the system is operational on board the aircraft. With supporting test equipment, the integrated L-band processor is capable of isolating faults down to the component level within a Shop Replaceable Unit (SRU). Reuse of the test equipment used for TCAS and Mode-S transponder units currently available from the manufacturer is maximized.

Full time monitors in the Built In Test Equipment (BITE) of the integrated L-band processor of the invention continuously monitor performance of the LRU 118. This BITE includes a First Level BITE that provides the ground crew with a system self-test capability to quickly identify a faulty LRU, and a Second Level BITE that provides capability for maintenance shops to easily identify the faulty sub-assembly (SRU) within the LRU 118. Faults detected by the BITE are stored in non-volatile memory for future retrieval by maintenance personnel.

The software operated by the integrated L-band processor of the invention is of a modular architecture that facilitates addition or modification of software functions with a minimal impact to re-test and re-certification functions.

The integrated L-band processor of the invention includes system interfaces that support the ACAS II and Mode-S transponder functions. Data received from external sources is shared by the two functions. The integrated L-band processor of the invention supports at least ARINC 429 and Ethernet digital inputs and outputs (I/O). The integrated L-band processor of the invention supports ARINC 429 inputs from the following aircraft systems: Inertial Reference System (dual); radio altimeter (dual); air data computer (dual); Mode-S transponder; TCAS/ATC control panel (dual); global navigation satellite system (dual); Flight Management System (dual); Flight Control Computer (dual); Communications Management Unit/Air Traffic Services Unit/Airborne Data Link Processor (dual); Altitude Alerter/Mode Control Panel (dual); and Central Maintenance Computer. The integrated L-band processor of the invention is also structured to support ARINC 429 inputs from a ground proximity warning system such as the Enhanced Ground Proximity Warning System available from Honeywell International, Incorporated; a weather radar; and a Data Loader such as an ARINC 615 Data Loader for future growth. Some of these inputs are available through the use of program-pin definable General Purpose inputs.

The integrated L-band processor of the invention provides the following ARINC 429 outputs: TA/RA display (dual); RA display (dual); Mode-S transponder; Communications Management Unit/Air Traffic Services Unit (dual); Central Maintenance Computer; and Data Loader such as an ARINC 615 Data Loader. For future growth the integrated L-band processor of the invention is also structured to provides the ARINC 429 outputs to both a weather radar and a ground proximity warning system such as the Enhanced Ground Proximity Warning System.

The integrated L-band processor of the invention provides a Dataload input and a Dataload or display output Ethernet ports.

The integrated L-band processor of the invention supports the following analog inputs: a radio altitude input signal per ARINC standard 552/552A, a synchronic-barometric altitude input signal, and a GPS Differential correction input signal, and provides an 8-ohm speaker analog output and a 600-ohm headphone analog output.

The integrated L-band processor of the invention supports a plurality of discrete inputs and outputs. The discrete inputs supported include: air/ground (dual), landing gear up/down, RA display status (dual), TA display status (dual), ATC transponder standby/on, climb inhibit (four), increase climb inhibit (four), data loader enable, performance limit, advisory inhibit, control panel select, altitude/IRS source select, GPS select, and Gillham altitude (dual). The discrete outputs provided by the integrated L-band processor of the invention include: TCAS status, transponder fail (dual), aural advisory (dual), and TA display enable.

To accommodate operations on military platforms, the integrated L-band processor of the invention includes growth provisions to incorporate IFF transponder functionality, capability to squitter DF=19, capability to receive and process UF=19, Mode-S RF message encryption, and capability to interface with an external 1553 interface unit.

The integrated L-band processor of the invention complies with applicable industry specifications. For example, the software operated by the integrated L-band processor is certified to RTCA/DO-178B, Level B of the Radio Technical Commission For Aeronautics "Software Considerations In Airborne Systems and Equipment Certification", dated Dec. 1, 1992, for all TCAS-related functions. The software operated for transponder functions that are not involved with the coordination of TCAS Resolution Advisories is certified to RTCA/DO-178B, Level C.

The integrated L-band processor of the invention includes environmental certification to RTCA DO-160D of the Radio Technical Commission For Aeronautics "Environmental Conditions and Test Procedures for Airborne Equipment," dated Jul. 29, 1997, including compliance with helicopter and wind milling vibration requirements, High Intensity Radiated Field (HIRF) requirements, German frequency transmission spectrum requirements, Canadian cold soak requirements, and explosive atmosphere requirements.

Figure 4:
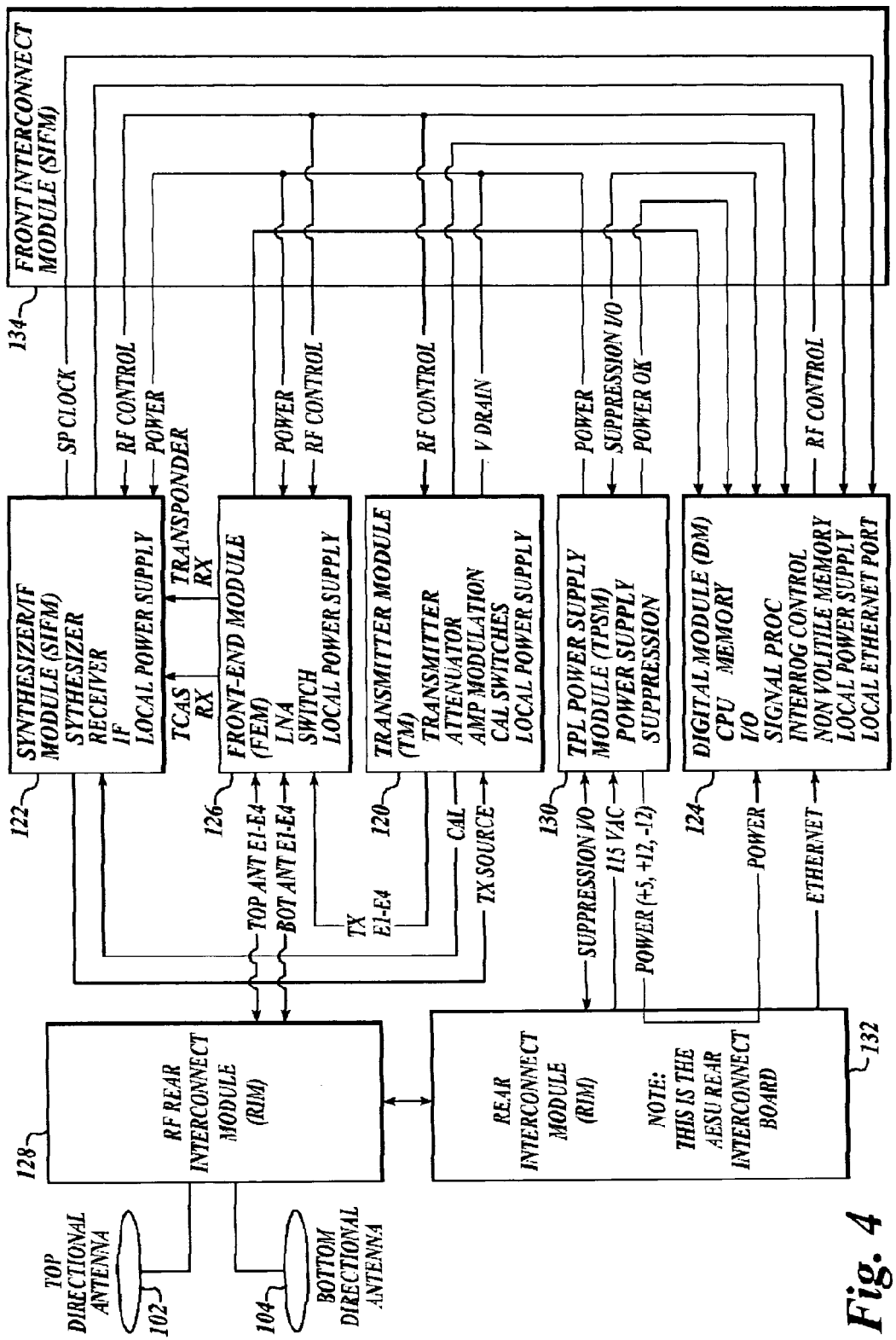
FIG. 4 is a block diagram that illustrates one embodiment of the hardware architecture of the integrated L-band traffic surveillance apparatus of the invention that combines TCAS and Mode-S transponder functionality into a single LRU of the type illustrated in FIG. 3.

FIG. 4 is a block diagram that illustrates one embodiment of the hardware architecture of the integrated L-band traffic surveillance apparatus 100 of the invention that combines TCAS and Mode-S transponder functionality into the single LRU 118 (shown in FIG. 3). As illustrated in FIG. 4, the integrated L-band traffic surveillance apparatus 100 of the invention includes a transmitter module (TM) 120 that provides an RF transmitter, signal attenuator, signal amplitude modulation, calibration switches, and local power supply; and a radio frequency synthesizer/IF (intermediate frequency) module (SIFM) 122 that provides a synthesizer, IF receiver, local power supply, and multiple RF receivers: including multiple receiver channels for the TCAS frequency and one or more dedicated receiver channels for the Mode-S frequency. The transmitter module 120 is a dual frequency transmitter capable of forming the transmission beam for either the 1030 MHz TCAS transmissions, or the 1090 MHz Mode-S transponder transmissions. The transmitter module 120 is controlled by transmission set-up downloads from a digital module (DM) 124. The transmitter module 120 and radio frequency synthesizer/IF module 122 are coupled to a front-end module (FEM) 126 that is coupled to the top and bottom antennas 102, 104 through a RF rear interconnect module (RFIM) 128. The front-end module (FEM) 126 provides a low noise amplifier (LNA), local power supply, and a plurality of switches, including a switch for coupling the top and bottom antennas 102, 104 to the transmitter module 120 and radio frequency synthesizer/IF module 122, and a switch for periodically coupling the different TCAS and Mode-S digital processing circuits to the different antennas 102, 104. The integrated L-band traffic surveillance apparatus 100 of the invention also includes a telecommunications processor L-band (TPL) power supply module (TPSM) 130 coupled through a rear interconnect module (RIM) 132 to the digital module (DM) 124, and a front interconnect module (FIM) 134 that operates as a mother board for routing signals among all of the above, including routing power to at least the transmitter module 120, radio frequency synthesizer/IF module 122, and front-end module (FEM) 126.

The software supporting the different L-band functionalities provided by the integrated L-band traffic surveillance apparatus 100 of the invention is resident digital module 124, which controls all transmitter and receiver signals and provides data sharing between the different resident functionalities. The digital module 124 includes a central processor unit or "CPU" and provides input/output (I/O) ports for receiving aircraft state information and interfacing with the displays 112 and control panels 114, 116; a local Ethernet port, non-volatile memory, and a local power supply. The digital module 124 operatively provides common signal processing for all of the different L-band functionalities, and includes front-end adaptive filtering that eases dynamic range requirements of the receiver. The digital module 124 also provides Mode-S interrogation signal control.

Figure 5:
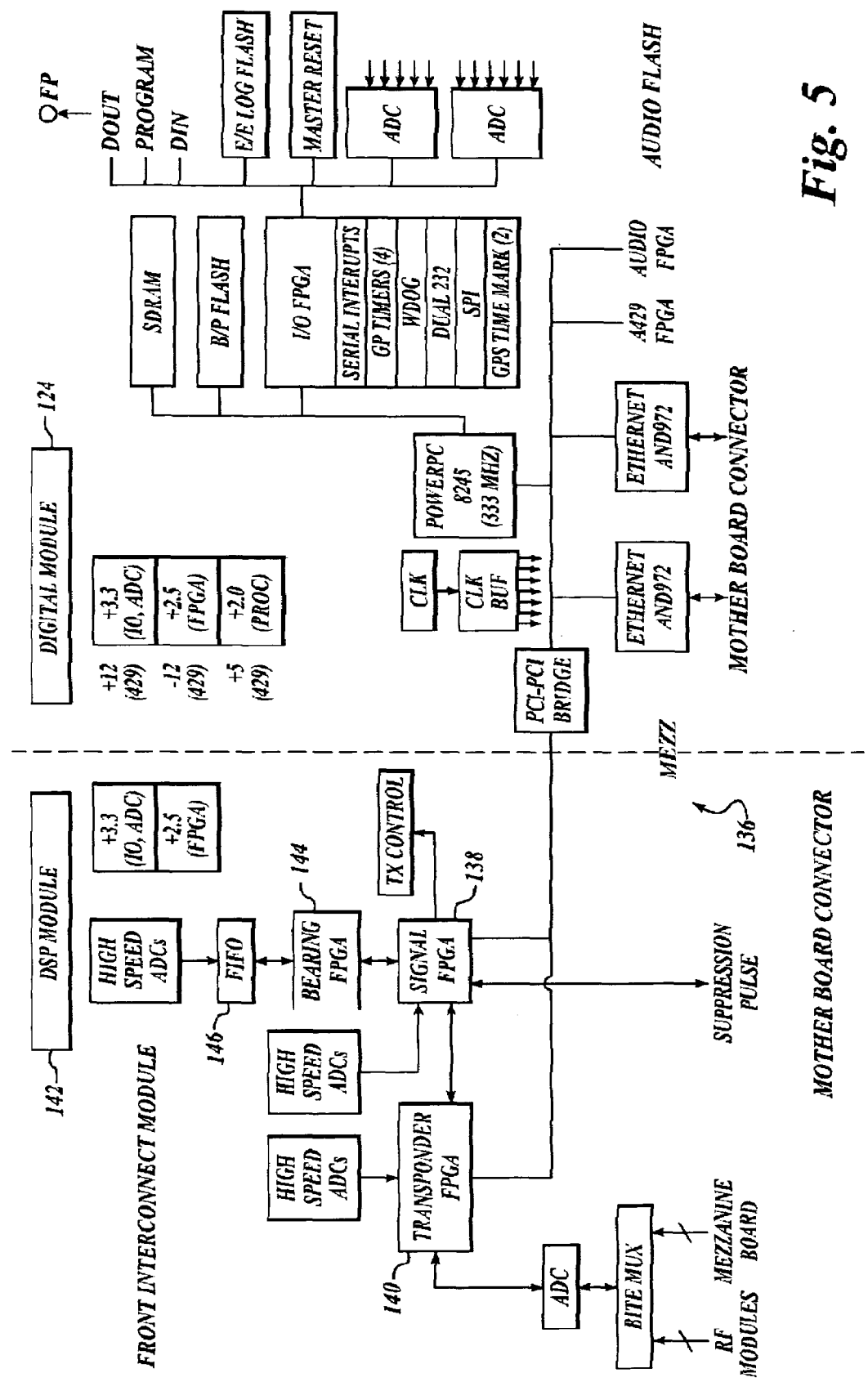
FIG. 5 illustrates one embodiment of the invention wherein a digital module includes a mezzanine board that supports different digital signal processing circuits and that provide the TCAS and Mode-S transponder functionalities.

FIG. 5 illustrates one embodiment of the invention wherein the digital module 124 includes a mezzanine board 136 that supports different digital signal processing circuits 138 and 140 that provide the TCAS and Mode-S transponder functionalities, respectively. For example, the mezzanine board 136 supports a digital signal processing (DSP) module 142 that includes a TCAS signal FPGA 138 that provides the TCAS functions and is coupled to a Mode-S transponder FPGA 140 that provides the Mode-S functions. The TCAS signal FPGA 138 is coupled to receive bearing signals from a bearing FPGA 144 that has an increased sampling rate over conventional TCAS bearing determination circuits. By example and without limitation, the bearing FPGA 144 provides bearing and phase measurements based on 64 pulse data as compared with the 16 pulse data operated on by conventional devices. Such increased sampling reduces noise levels but also requires increased FIFO circuit 146 that clocks in more data to provide the increased samples.

Traffic surveillance is operated by the CPU located in the digital module 124. The traffic surveillance architecture is divided into three sub-functions: traffic alert and collision avoidance functionality (TCAS), airborne surveillance and separation assurance functionality (ASSA), and Mode-S transponder. These sub-functions are partitioned from one another by means of memory management provided by the CPU and the operating system, and time partitioning that is also provided by the operating system. The TCAS functionality is listed separately from the airborne surveillance and separation assurance functionality (ASSA) functions to provide a minimum level of independence between them. The TCAS resolution advisory outputs are generated independently by the TCAS sub-function without reliance on ADS-B data. The ASSA sub-function is the prime source for traffic information and consolidates TCAS and ADS-B based traffic information.

Figure 6:
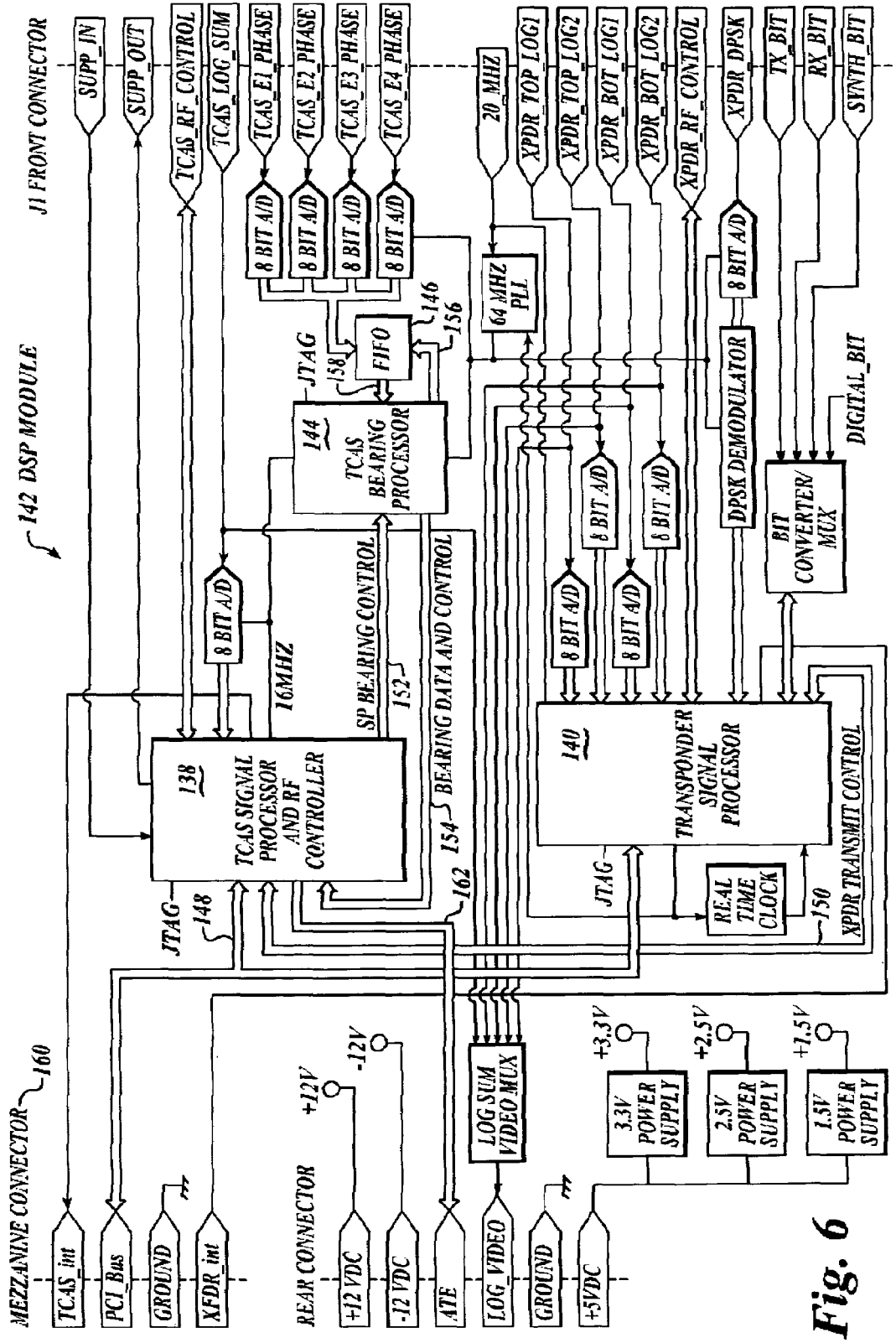
FIG. 6 is a block diagram of the digital signal processing (DSP) module of FIG. 5 showing that the different TCAS and Mode-S digital signal processors communicate via busses.

FIG. 6 is a block diagram of the digital signal processing (DSP) module 142 of FIG. 5 showing that the different TCAS and Mode-S digital signal processors 138, 140 communicate via internal busses, such as 16 or 32 bit wide internal data busses 148, 150. Similarly, other communications within the DSP module 142 are carried on different 16 or 32 bit wide internal data busses. For example, the TCAS digital signal processor 138 communicates with the bearing digital signal processor 144 via internal data busses 152, 154, which in turn communicates with the FIFO circuit 146 via internal data busses 156, 158. Communications between the TCAS and Mode-S digital signal processors 138, 140 and the mezzanine board connector 160 are carried via internal data busses 148, 162.

Figure 7:
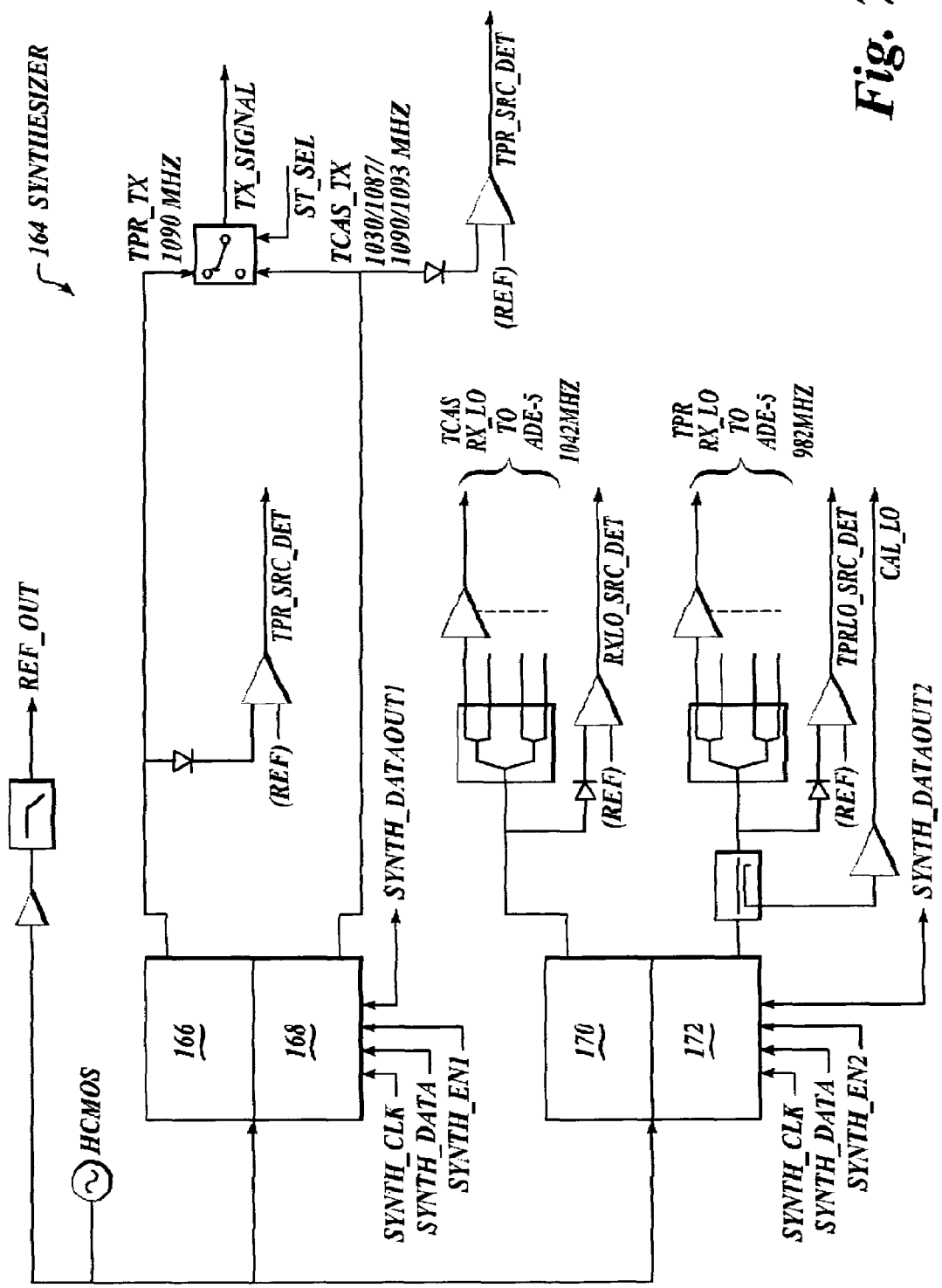
FIG. 7 illustrates a block diagram of the synthesizer circuit of the radio frequency synthesizer/IF module (SIFM) of FIG. 5.

FIG. 7 illustrates a block diagram of the synthesizer 164 circuit of the radio frequency synthesizer/IF module (SIFM) 122 that provides conditioned Mode-S transponder and TCAS transmission signals via respective transponder and TCAS signal conditioning circuits 166, 168, and conditions received Mode-S transponder and TCAS signals respective transponder and TCAS signal conditioning circuits 170, 172.

According to one embodiment of the invention, the integrated L-band traffic surveillance apparatus 100 is embodied as an All Weather Formation Capability (AFC) apparatus for supporting formation operations through use of a FR (formation rendezvous) system. Accordingly, FIG. 8 illustrates how the integrated L-band traffic surveillance apparatus 100 supports formation operations.

Figure 8:
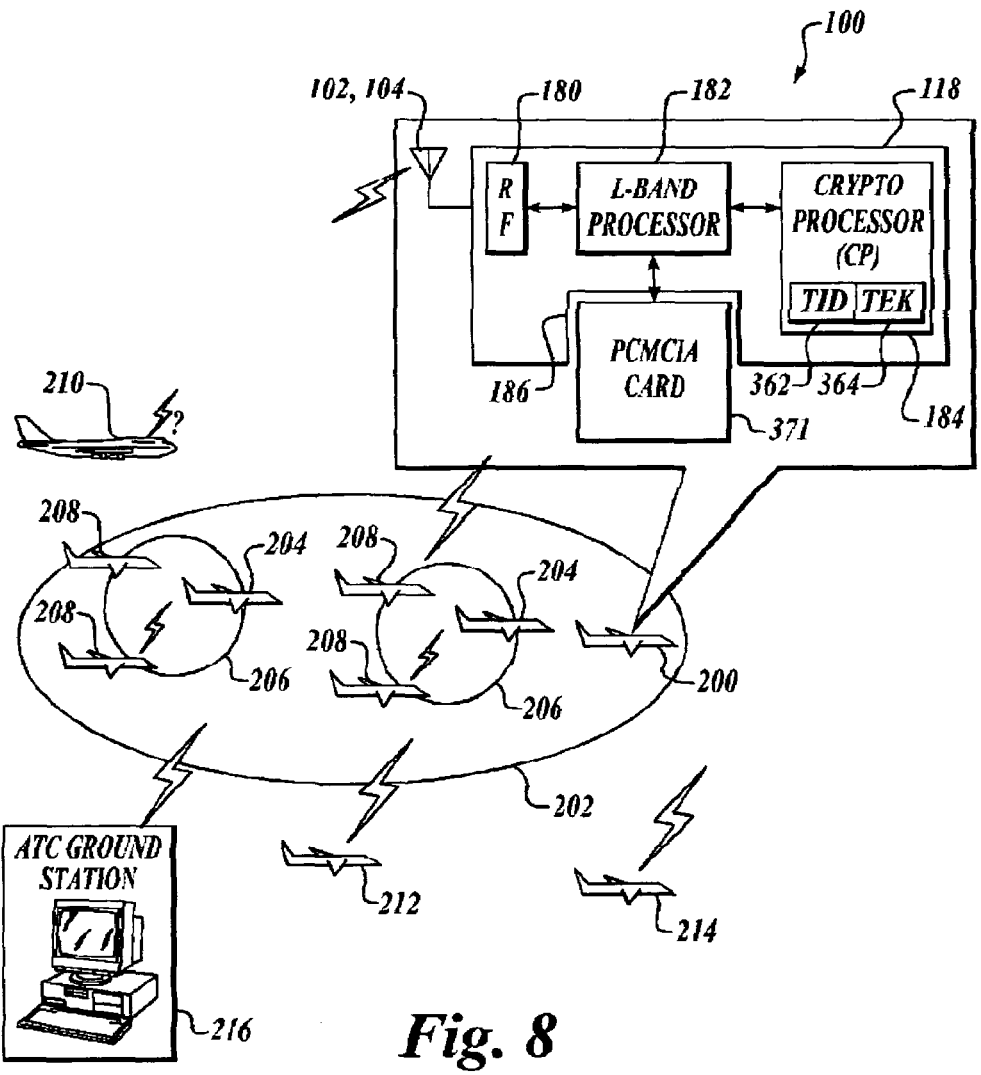
FIG. 8 illustrates how the integrated L-band traffic surveillance apparatus of the invention supports formation operations.

As illustrated in FIG. 8, the integrated traffic surveillance apparatus 100 embodied as an AFC apparatus includes an radio frequency (RF) section 180, formed by the transmitter module 120 and radio frequency synthesizer/IF module 122 coupled to a front-end module (FEM) 126, which is coupled to an L-band digital signal processor 182 containing the digital module 124 which includes a digital signal processing circuit structured for operating the AFC algorithms 266 (shown in FIG. 11 and discussed below) that support the AFC functionality and is coupled to a digital crypto-processor 184, containing encryption/decryption algorithms. The AFC apparatus 100 also includes the accessible front-panel PCMCIA card slot 186 (shown in FIG. 3) for easy software loading, in-flight data recording or flight data retrieval. The integrated traffic surveillance AFC apparatus 100 unit also includes an external LCD which provides unit and system health and configuration status. When embodied as an AFC, the integrated traffic surveillance AFC apparatus 100 provides the ability to conduct the full spectrum of airlift formations in all areas of operation. Its versatility allows the operator to adjust the system's functionality in a manner that addresses a combat mission plan or local civil requirements or both. The integrated traffic surveillance apparatus 100 is structured to either couple directly to the existing SKE controls and displays or to provide more comprehensive and formation friendly features. A potentially more effective solution than the current display and control formats is optionally provided in the form of detailed formation positioning data such as in-track, cross-track, and vertical assignments and deviation.

All Weather Formation Capabilities of the integrated traffic surveillance apparatus 100 system include: 2-to-100 aircraft formation capability enabling the Army's Strategic Brigade Airdrop; 100 nautical mile surveillance range, either with or without GPS data; 0.5 degree rms bearing accuracy with GPS data and 1 degree rms bearing accuracy without GPS data which allows for maintaining precise formation; a Quiet Mode of operations that provides a low probability of detection/intercept; and an encrypted data link for anti-spoofing. When embodied as an AFC apparatus, the integrated traffic surveillance apparatus 100 includes an AFC transmit mode, embodied in the AFC digital signal processing circuit of the L-band processor 182, that permits all similarly equipped aircraft to communicate with all other similarly equipped aircraft. An autopilot integration capability allows the formation or element leader 200 to control an entire formation 202 of aircraft each equipped with the integrated traffic surveillance apparatus 100. By example and without limitation, in all modes of operation the formation leader 200 issues maneuvering commands via encrypted squitters to leaders 204 of other elements or "cell" formations 206. The element leaders 204 in turn use the integrated traffic surveillance apparatus 100 to issue maneuvering commands via encrypted squitters to cell formation members 208 of their respective elements. An AFC Quiet Mode permits the element leaders 204 to communicate with cell formation members 208 and to communicate with all other similarly equipped aircraft. Commercial and other non-AFC equipped aircraft 210 discard the encrypted squitters. A Silent Mode allows one or more formation members 212 to "listen" and passively track AFC equipped aircraft without transmitting RF signals. An Extended Range Mode allows AFC equipped aircraft 214 to be visible to the formation 202 and supports display of other formation members 208. AFC also permits communication with a similarly equipped ATC ground station 216.

Figure 9:
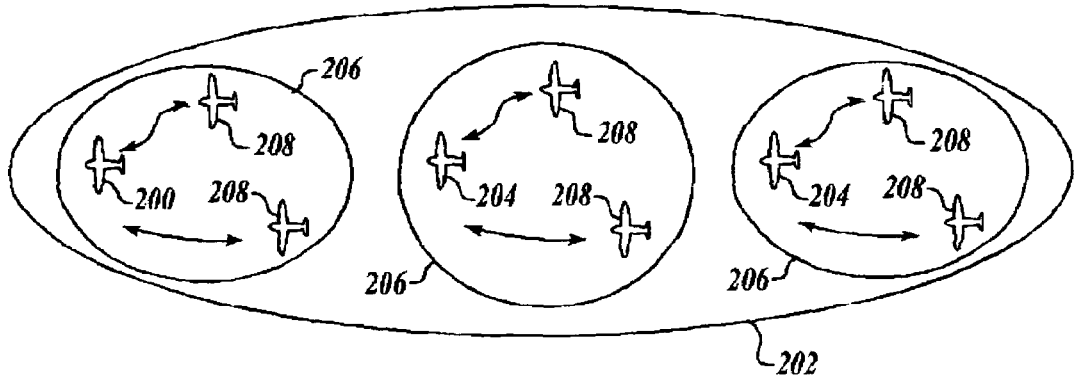
FIG. 9 is a top-down view of a formation of aircraft equipped with the integrated traffic surveillance apparatus of the invention embodied as an All Weather Formation Capability apparatus that supports formations of multiple aircraft.

FIG. 9 is a top-down view of a formation 202 of aircraft equipped with the integrated traffic surveillance apparatus 100 of the invention embodied as an AFC apparatus that supports formations of between 2 and 100 aircraft. The formations 202 can consist of one element or multiple elements, as shown. The formation leader 200 provides flight commands to the entire formation 202. The flight commands are data linked data from the formation leader 200 to its right and left wingmen 208 each element leader 204, then each element leader 204 transfers data to the wingmen 208 in their respective formation cell 206. The deviations from assigned positions in the formation are calculated with respect to the element leaders, which in the case of one-element formations is the same as the formation leader.

Figure 10:
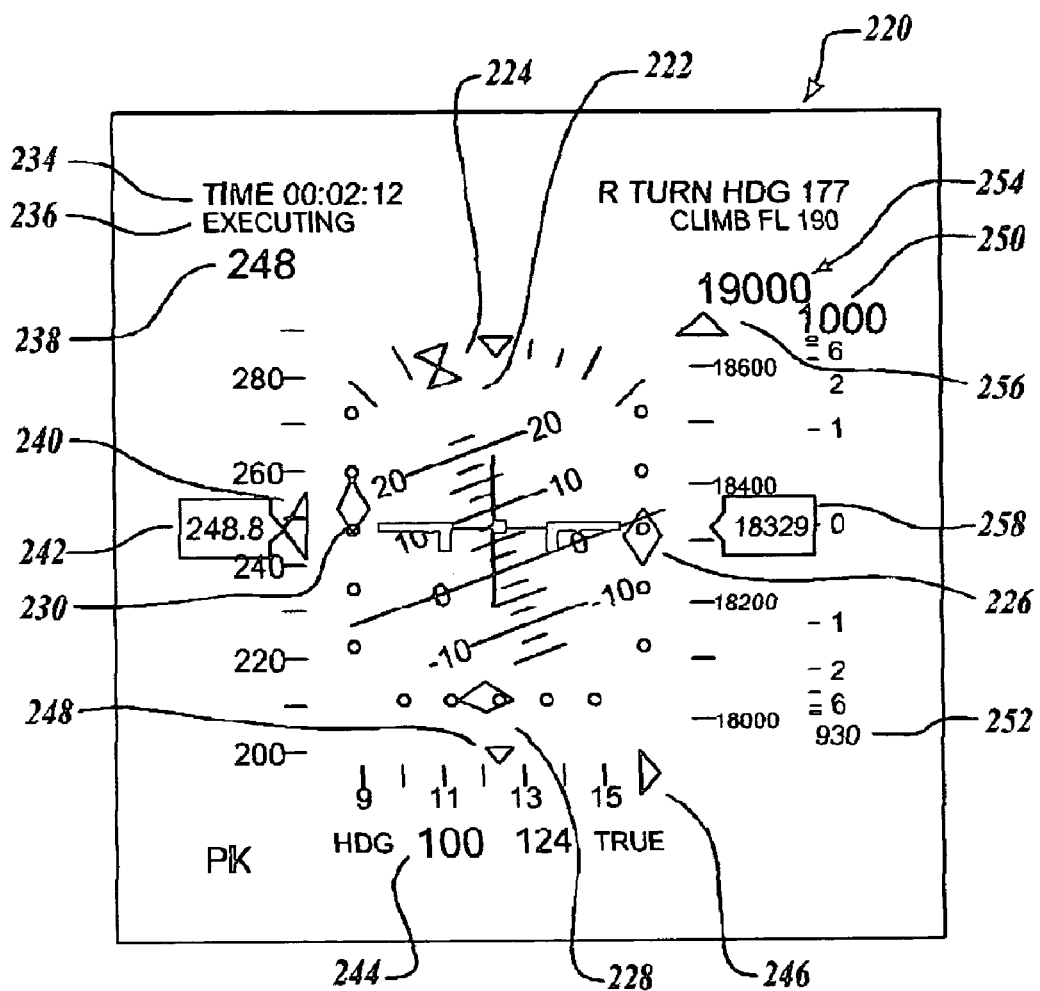
FIG. 10 demonstrates system operation for utilization of the integrated traffic surveillance apparatus of the invention to its fullest extent, whereby a "flight director" display format quickly and easily conveys command data to the aircraft's pilot.

FIG. 10 demonstrates system operation for utilization of the integrated traffic surveillance apparatus 100 to its fullest extent, whereby a "flight director" display format 220 quickly and easily conveys command data to the aircraft's pilot. According to one embodiment, the flight director display format provides an actual and commanded bank angles 222, 224 in degrees; a vertical deviation error indicator 226 shows vertical deviation error in feet or shows zero while tracking to a climb rate during altitude change commands; a cross track deviation error indicator 228 shows cross track deviation error in feet, additionally a red colored diamond shape shifted to one side, left shown, indicates a need to fly the opposite, i.e., right; an along track deviation error indicator 230 indicates an along track deviation error in feet, additionally a red colored diamond is shifted down or up (shown) to indicate need to slow down or speed up (shown); a mission time indicator 234 indicates mission time in hour:minute:second; below the mission time indicator 234 a maneuver indicator 236 indicates maneuver executing status and the maneuver being currently executed such as "R Turn HDG 177, Climb FL 190" (shown); a commanded indicated air speed indicator 238 indicates commanded indicated air speed in knots; a commanded indicated air speed bug 240 indicates commanded indicated air speed on a tape scale, while a text current indicated airspeed indicator 242 shows current indicated airspeed in feet per second; commanded heading indicator and bug 244, 246 together indicate commanded heading, while a current heading indicator 248 indicates current heading in degrees; a commanded climb rate indicator 250 shows commanded climb rate in feet per minute, while a current climb rate indicator 252 indicates actual climb rate; and a commanded altitude indicator 254 shows commanded altitude in text and a commanded altitude bug 256 indicates commanded altitude on a tape scale, while a current altitude indicator 258 indicates current altitude.

The integrated traffic surveillance apparatus 100 embodied as an All Weather Formation Capability system interfaces with the flight crew, displays, mission computer and on-board sensors and offers both sensory and formation positioning capability by utilizing aircraft attitude and flight parameters. For aircraft that have inherent formation maneuvering capability, the integrated traffic surveillance apparatus 100 of the invention is operated as a sensor to provide the required data to a mission computer. However, for other aircraft that do not have inherent formation maneuvering capability, the integrated traffic surveillance apparatus 100 provides that functionality directly to the pilot and/or autopilot.

Operationally, the integrated traffic surveillance apparatus 100 of the invention is extremely versatile in both military operations and as a civil TCAS/Mode-S apparatus. Although three basic formation modes are provided, the system versatility is exemplified by features such as the optional ability to track non-formation, i.e., non-AFC equipped, members. Formations can consist of one element or multiple elements. The integrated traffic surveillance apparatus 100 provides guidance to the entire formation via the designated formation leader 200. The integrated traffic surveillance apparatus 100 calculates formation assignment deviations with respect to the element leaders 204 and provides position adjustment commands to each formation member 208. Some of the key flight control commands include: speed commands, turn commands, altitude change commands, drop commands, and formation spacing change commands.

The integrated traffic surveillance apparatus 100 embodied as an AFC system provides three basic modes of operation which adjust to the mission requirements. One is an AFC Transmit mode that is used when the formation 202 is flying through civil airspace during peacetime operations or in a refueling rendezvous. In this mode, positioning is performed using modified hybrid surveillance. Hybrid surveillance utilizes passive, i.e., listening, tracking to minimize interrogations. Each formation member 208 passively tracks surrounding aircraft out to 100 nautical mile. Active interrogation is performed when a wingman deviates from its assigned position. This interrogation is performed to verify the deviation. The formation 202 is provided with total identification, maneuver capability and encrypted data link.

Another operational mode is an AFC Quiet Transmit mode that is used in a combat environment when low probability of detection and interception are essential. In this mode, the integrated traffic surveillance apparatus 100 outputs very low power, on the order of 1 watt, which automatically adjusts to maintain the formation. As with all modes, the intra-formation link is encrypted and formation proximity alerts are adjusted to satisfy the formation parameters.

A Silent operational mode allows formation members 208 to break away from the formation and not be detected. Since the separated aircraft 212 does not transmit it will be able to track the formation but the formation will not track the separated member 212.

Additionally, the integrated traffic surveillance apparatus 100 provides aural and visual proximity warnings among formation members 208.

The integrated traffic surveillance apparatus 100 embodied as an AFC system uses two sources of surveillance information: GPS/Inertials which is available on each aircraft and datalinked to formation members 208; and if GPS/Inertials are lost or degraded, the integrated traffic surveillance apparatus 100 reverts to active surveillance detection which provides range, bearing and elevation information for each formation member 208. Power output automatically adjusts to satisfy the formation parameters and mission needs.

The integrated traffic surveillance apparatus 100 embodied as an AFC system provides adversarial detection and countermeasures. Although described in detail herein, the capabilities are summarized as: an ability to change military or civil identification in flight, an ability to detect and defeat in frequency jamming, a Quiet Mode of operation, and encrypted closed-loop communication.

In summary, the integrated traffic surveillance apparatus 100 embodied as an AFC system is a stand-alone All Weather Formation Capability (AFC) system that is usable for its sensor and datalinking capabilities or for its full-up formation positioning capability. The versatility of the apparatus adjusts to both individual aircraft and formation parameters and includes growth opportunities to support future AFC enhancements. The integrated traffic surveillance apparatus 100 uses the TCAS antennas 102, 104 that are already on the airplane. When embodied as a AFC system, the integrated traffic surveillance apparatus 100 as the SKE was intended to operate.

The formation lead 200 is able to safely fly the formation 202 through weather with the security that the AFC system is utilizing the best information available to complete the mission. The formation members 208 takes advantage of today's technology to follow the lead. The integrated traffic surveillance apparatus 100 permits the entire formation 202 is optionally flown on autopilot. The integrated traffic surveillance apparatus 100 separates the formation members 208 by both azimuth and range and by elevation. For the war fighter such separation alleviates a great deal of pressure in an already stressful environment. Additionally, the integrated traffic surveillance apparatus 100 is easily be adapted to all aircraft that have inherent maneuver capabilities, by essentially substituting existing LRUs. For aircraft that do not have inherent maneuver capabilities, the integrated traffic surveillance apparatus 100 provides this capability. The integrated traffic surveillance apparatus 100 also provides formation members 208 the ability to identify non-formation aircraft 210. The other non-equipped aircraft 210 only need to have their transponders on for aircraft equipped with the integrated traffic surveillance apparatus 100 to identify and display them.

The integrated traffic surveillance apparatus 100 embodied as an AFC system is based on a 4 MCU processor unit designed for rack mounting in an aircraft equipment bay and is structured to use an ARINC 600 style connector. The integrated traffic surveillance apparatus 100 provides the digital signal processing required to convert RF reply data from similarly equipped aircraft into command and display output data. The integrated traffic surveillance apparatus 100 processor 182 also transmits interrogations via the top and bottom directional antennas 102, 104 to track formation members 208 and perform AFC functions. The integrated traffic surveillance apparatus 100 embodied as an AFC system exceeds the all-weather formation capability while providing the TCAS II and ATC datalink concurrently.

Figure 11:
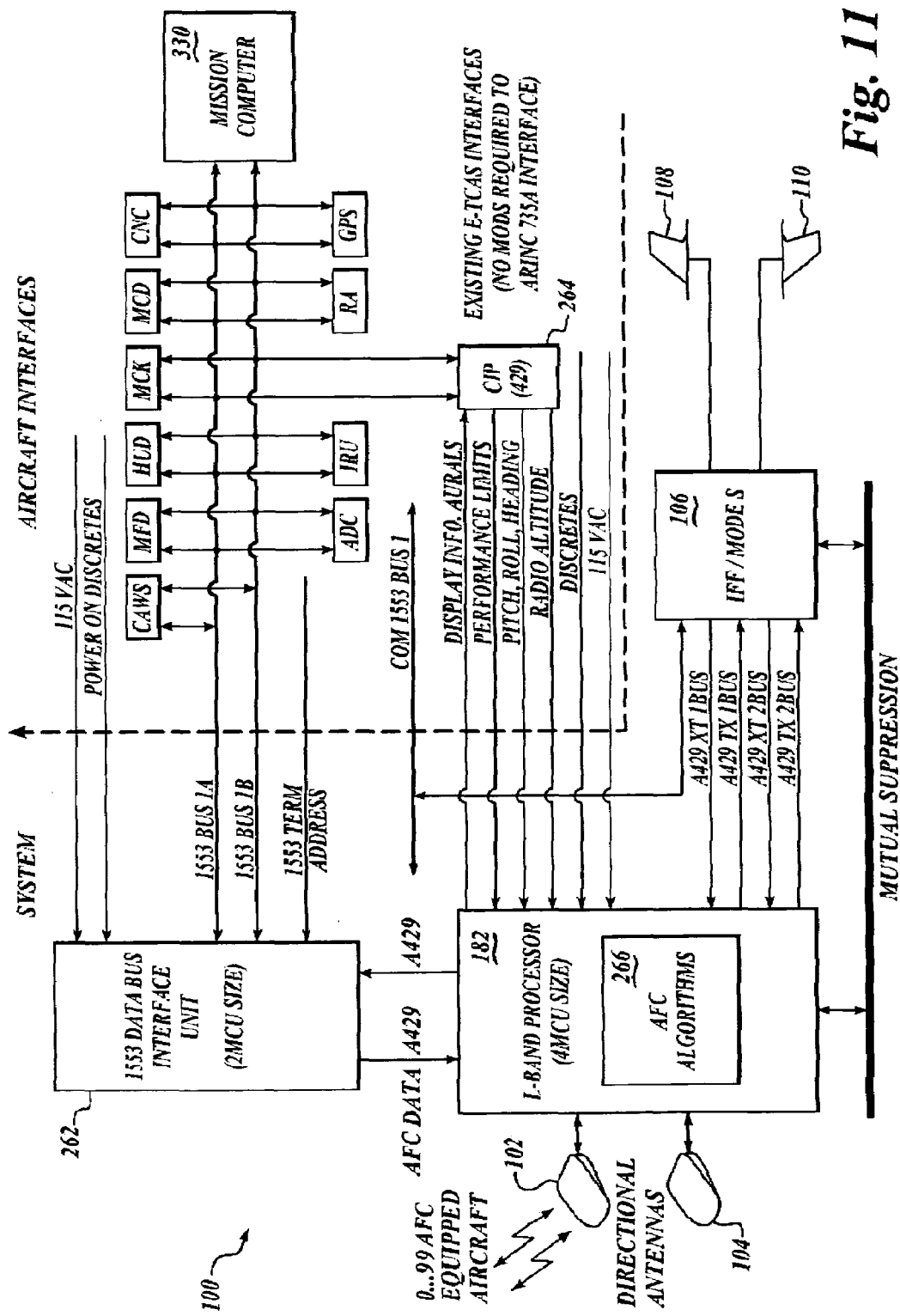
FIG. 11 is a block diagram that illustrates the significant re-use the integrated traffic surveillance apparatus of the invention of existing hardware.

The 4 MCU size L-band processor 182 is modified to support AFC functions in addition to the standard ATC, i.e., TCAS and Mode-S, functionality. Civil functions are developed in accordance with respective domestic and international specifications for those systems. Therefore, one integrated traffic surveillance apparatus 100 unit provides all military AFC requirements, civil collision avoidance and Air Traffic Control (ATC) data link requirements. By combining these functions in the same integrated traffic surveillance apparatus 100, the common transmitter and receiver subsystems, signal processing and antennas simultaneously process AFC, TCAS and Mode-S data. Additionally, external buses with critical timing requirements, such as formation stability guidance among formation members are eliminated since the coordination is done internally by shared signal and software processing. The RF data link, data link encryption, signal and software processing required to perform the AFC functions are independent of the IFF/Mode-S transponder. Therefore, no change is required to existing IFF/Mode-S transponder or dual transponders installed on the aircraft and maximizes re-use and minimizes redesign of the aircraft configuration. The L-band processor 182 replaces the existing processor and reuses existing cables, and other hardware. Minimal new wiring and cabling is required to support the Mode-S interface; however this data is already being sent to the existing Mode-S/IFF transponder located in the same rack as the processor 182 of the integrated traffic surveillance apparatus 100, which is behind the pilot on the left side of aircraft. Currently the Right Top Plug (RTP) of the ARINC 600 connector is not populated on a standard ARINC 735A TCAS installation. The integrated traffic surveillance apparatus 100 uses the RTP connector block to provide the necessary Mode-S aircraft interfaces and the ARINC 429 interfaces required to communicate with the 1553 data bus Interface Unit (IU) 262 or the existing dual Core Integrated Processors (CIPs) 264 as shown in FIG. 11, which is a block diagram that illustrates the significant re-use of existing hardware.

AFC algorithms 266 resident on and operated by the integrated traffic surveillance processor 182 receive and process the flight commands, formation surveillance data and own ship data in order to output the following information: relative position information of all formation members for situational awareness, proximity warning information for situational awareness, deviations from assigned formation positions, and guidance and coupling signals. The AFC algorithms 206 are structured to support a variety of flight commands. Some aircraft may not be equipped to make use of all of the flight command capability, depending on the design and limitations of the flight crew interface. Supported flight control commands, which can be performed singly or in combination include by example and without limitation: speed commands, turn commands, altitude change commands, drop commands, and formation spacing change commands. Speed and turn commands can be specified in air-referenced or ground-referenced coordinates. For example, a turn command can specify a final heading or a final track angle. The capability to specify track angle and ground speed reduces the need for the flight crew to manually adjust for wind effects during airdrops or other times when the mission requires that a ground track be flown. Flight commands can be simultaneous or sequential. In a simultaneous flight command, the entire formation 202 initiates the maneuver at the same time. Simultaneously performed speed commands are the best procedure to keep formation members 208 in position. In a sequential flight command, the formation aircraft 208 perform the maneuver at the same along-track position as the formation leader 200. Simultaneously performed turns are the best procedure to keep the formation members 208 in position.

The integrated traffic surveillance apparatus 100 outputs a variety of data that can be used for situational awareness on the traffic display, as shown in Table 1, including the locations of up to at least 100 formation members, the location of other TCAS equipped aircraft, proximity warnings and other status information. The range and bearing to the drop release point are useful to provide a visual reference on the traffic display of the drop release point.

TABLE 1

| Type of Situation Awareness | Output |
| --- | --- |
| Location of formation aircraft | Range and bearing |
| Location of other TCAS-equipped aircraft | Climb rate<br>Relative altitude |
| Formation information | Formation leader<br>Element leader<br>Operating modes |
| Airdrop information | Range and bearing to drop release point |
| Warnings | Proximity alert for formation aircraft<br>Traffic Advisory for other TCAS-equipped aircraft<br>Resolution Advisory for other TCAS-equipped aircraft |
| General information | Ground speed<br>True air speed<br>Heading<br>Track angle<br>Wind magnitude and direction |

Figure 12:
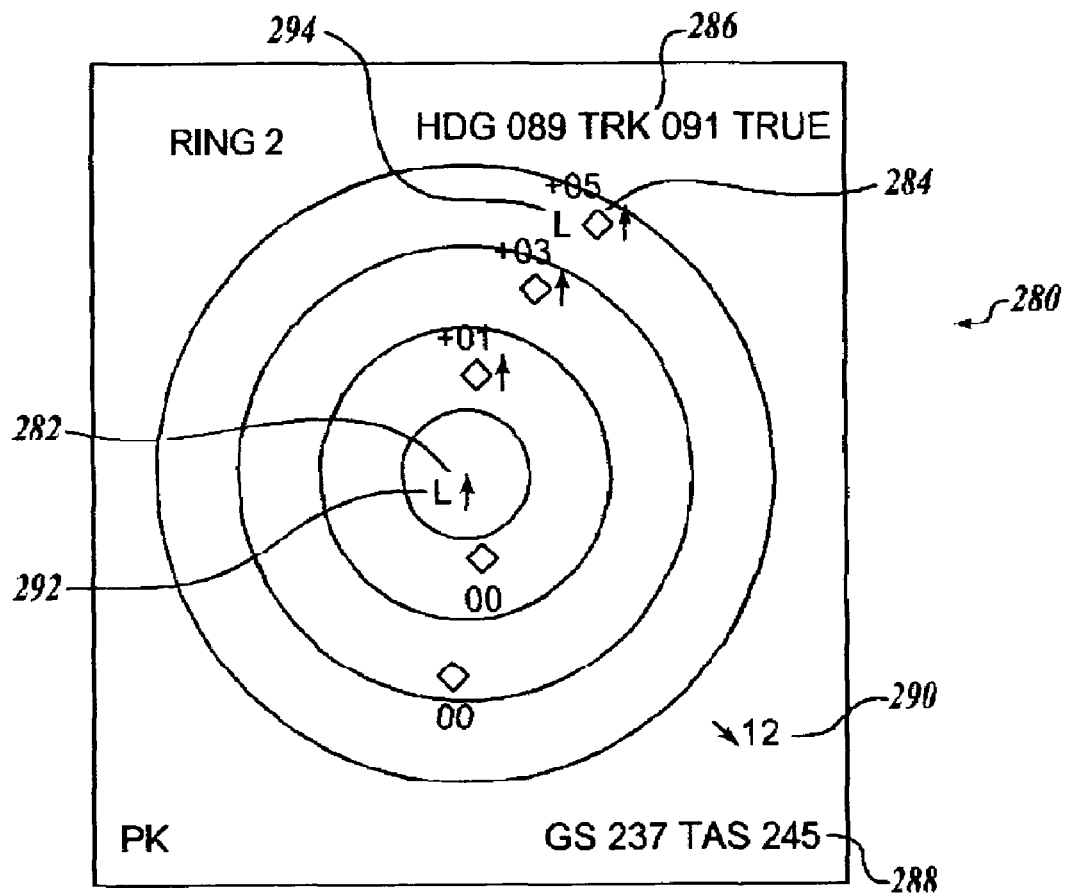
FIG. 12 is an illustration of a sample traffic display that shows use of the traffic display outputs according to one embodiment of the invention.

FIG. 12 is an illustration of a sample traffic display 280 that shows use of the traffic display outputs according to one embodiment of the invention. The standard TCAS symbology and conventions are used in the sample traffic display 280. Own aircraft 282 is at the center of the display 280. Other formation traffic are shown as one or more white diamonds 284. The relative altitude is displayed in hundreds of feet, and climb rates over 500 feet/minute are indicated with up and down arrows. The maximum range displayed is 100 nautical miles. Heading and track angle 286 are shown in degrees at the top of the display; ground speed and true air speed 288 are shown in knots at the bottom of the display; while wind magnitude and direction 290 are shown at the lower right of the display.

A colored character 292, such as a white "L," designates the formation leader 200; while a differently colored character 294, such as a blue "L," designates the ship's cell leader. During drop maneuvers, a green arrow shows the direction of the drop point until the drop point is within display range. The drop point is indicated with a green circle with a cross in it. An aircraft that has violated the user-specified proximity threshold is displayed as a filled white diamond.

Traffic display information is kept current by extrapolating other ship data between surveillance samples before calculating current range and bearing. The traffic display extrapolation includes turn rate for aircraft performing commanded turns. Extrapolation maintains traffic display information during surveillance dropouts, such as aircraft 212 in silent mode that no longer transmits position or other datalink information.

Embodied as a AFC system, the integrated traffic surveillance apparatus 100 also provides proximity warnings among participants. The user selects the proximity warning distance which describes the radius of a protection sphere around the aircraft. The integrated traffic surveillance apparatus 100 also has a default proximity warning time, set for example to 10 seconds, that reports time to closest approach. The proximity warning time is selectable by the flight crew to facilitate training exercises or operational changes.

To fly formation mission successfully, the members of the formation 202 need a concise representation of the flight commands, deviations from assigned formation positions, and other guidance cues to follow the flight commands while maintaining formation position. Table 2 illustrates by example and without limitation different data outputs of the integrated traffic surveillance apparatus 100 that can be used for formation guidance.

TABLE 2

| Type of Guidance | Output |
| --- | --- |
| Along track/speed guidance | Along track deviation error (ft)<br>Adjusted along track deviation error (ft)<br>Commanded speed (kts, indicated air speed)<br>Adjusted commanded speed (kts, indicated air speed)<br>Estimated time to drop release point (sec) |
| Cross track/turn guidance | Cross track deviation error (ft)<br>Cross track distance to drop point (ft)<br>Commanded bank angle (rad)<br>Adjusted commanded bank angle (rad)<br>Commanded heading/track angle (deg)<br>Heading/track angle to drop point (deg) |
| Vertical guidance | Vertical deviation error (ft)<br>Commanded climb rate (ft/minute)<br>Vertical deviation from commanded altitude (ft) |
| Flight command prep phase information | Countdown timer (sec)<br>Prep flight command mode flags<br>Heading to drop release point |
| Flight command execution phase information | Drop release coordinates (degrees:min)<br>Flight command directions<br>Estimated time to drop release point (sec) |

The adjusted command speed and adjusted command bank angle include the adjustments that a formation member 208 must make if flying on the inside or outside of a commanded turn. The adjusted along track deviation error is used for the Automatic Flight Control System when changing the along track spacing in a large formation 202 to prevent stability and tracking problems.

According to one embodiment of the invention, the guidance information provided by the integrated traffic surveillance apparatus 100 is included on a primary flight display for using the glideslope/localizer conventions or attitude cues to fly the aircraft. Every flight command has two phases: a preparation phase, during which the flight crew reviews the flight command and prepares to execute it; and an execution phase, during which the flight crew or autopilot flies the command.

Figure 13:
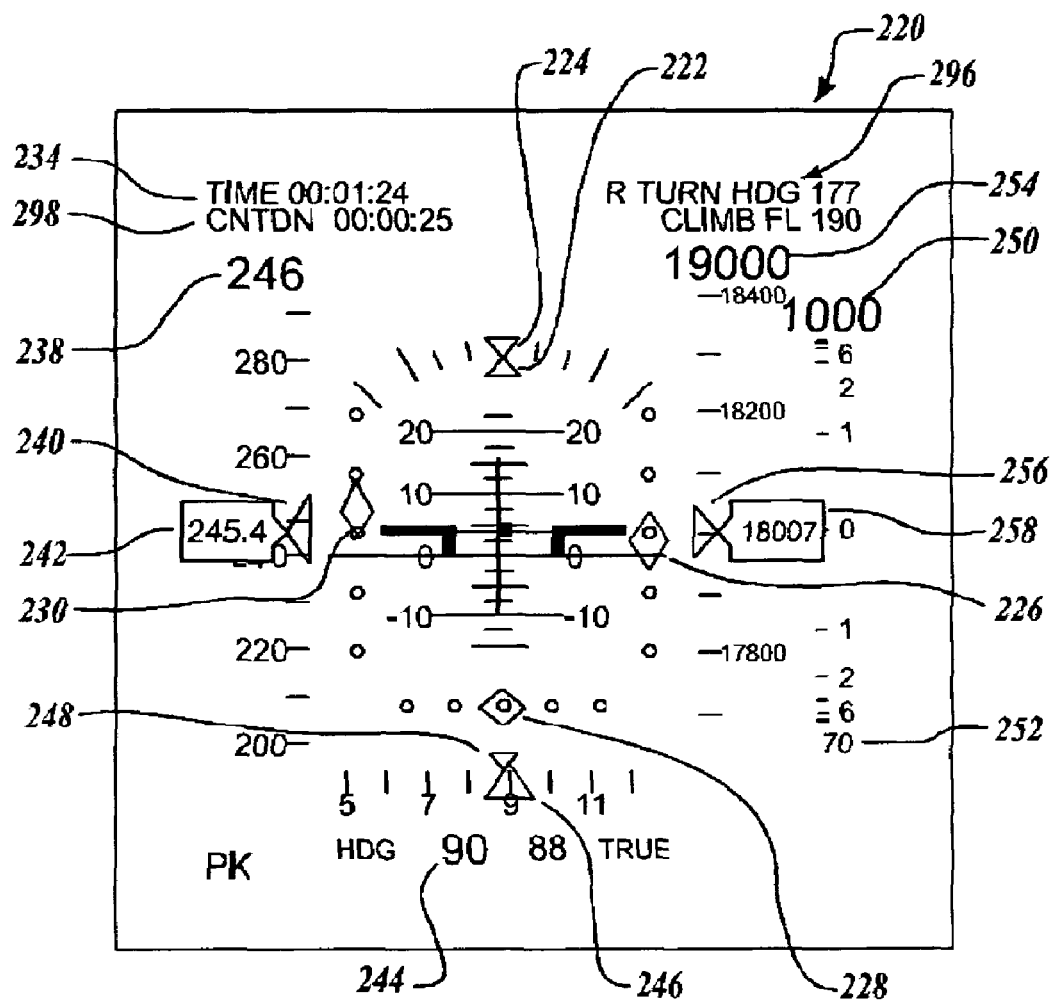
FIG. 13 shows the example guidance display of FIG. 12 for a climbing turn during a maneuver preparation phase.

FIG. 13 shows the example guidance display 220 for a climbing turn during the maneuver preparation phase. The mission time 234 and a countdown to execution time is shown on the upper left hand corner of the display. The new flight command 296 is shown on the upper right hand corner of the display. The new flight commands is a turn to a track angle of 180 degrees and climb to an altitude of 19,000 feet. The equivalent heading command is displayed. Since there is no crosswind, the equivalent heading is also 180 degrees. A countdown timer 298 shows countdown to execute prepared maneuver command in hours:minutes:seconds.

Figure 14:
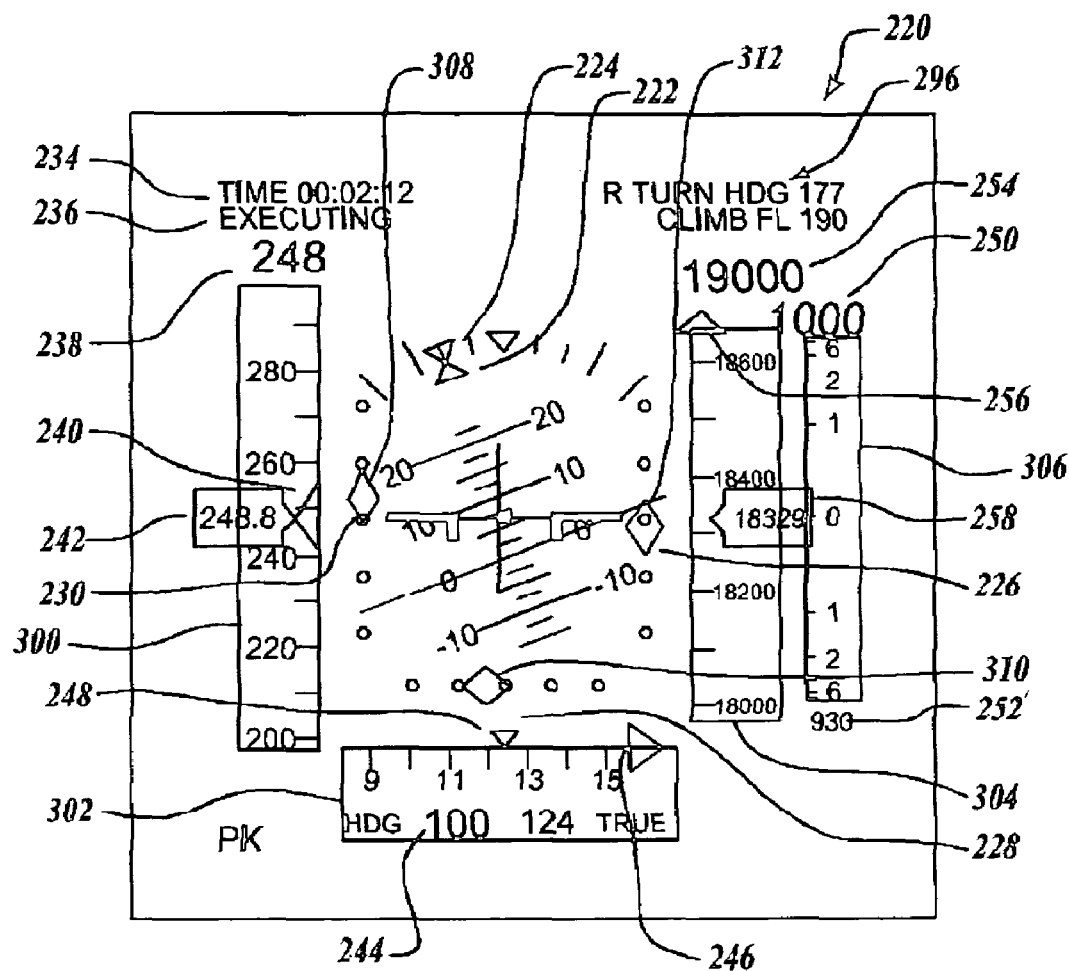
FIG. 14 shows the example guidance display of FIG. 12 for a climbing turn while the climbing turn maneuver is being flown.

FIG. 14 shows an example guidance display 220 for a climbing turn while the climbing turn maneuver is being flown. The aircraft shown is on the outside of the turn. The commanded speed, heading and altitude are displayed in color, for example red, on the tapes 300, 302, 304 on the left, bottom and right, respectively. Red colored triangles 240, 246, 256 are speed, heading and altitude bugs. If a speed command is a ground speed, it is converted to an equivalent airspeed for display. Similarly if a turn to a track angle is commanded, it is converted to an equivalent heading for display. The current speed, heading and altitude are shown in white on the same tapes 300, 302, 304. A far right tape 306 shows the commanded and current climb rate. The commanded bank angle 224 is shown as an inverted red colored triangle towards the top of the display 220.

When aircraft 208 in a formation 202 are offset left or right from the element lead 204, the pilot needs to increase speed if on the outside of the turn and decrease speed if on the inside of the turn to match the turn rate of the element leader 204. The speed bug 240 and speed command 238 include this correction. The required increase (or decrease) in speed for aircraft on the outside (or inside) of the turn is calculated using the bank angle and speed that the element lead will use during the turn. In this example, the element lead 204 is flying at 250 kts and the aircraft 208 must increase speed by 8 kts to fly at the same turn rate as the element lead 204. The deviations from assigned formation positions are indicated with red colored diamonds 230, 228, 226. Along track position error 230 is on the left; cross track position error 228 is on the bottom; while vertical position error 226 is on the right. The convention used is the glideslope/localizer convention, where the pilot flies toward the diamond to eliminate the position error.

Table 3 illustrates AFC formation position deviation and other calculations contain features that guarantee the accuracy and usefulness of the data.

TABLE 3

| Feature | Capability |
| --- | --- |
| Multirate software execution structure | High priority calculations are executed at a higher rate |

TABLE 3-continued

| Feature | Capability |
| --- | --- |
| Data extrapolation | Seamless handling of surveillance dropouts |
| | High-rate guidance outputs available for AFCS coupling independent of datalink rates |
| | Time-synchronization of own ship and other ship data |
| | Increased data accuracy with reduced surveillance rates |
| Position deviations in heading-referenced or track-referenced frame | Eliminates need to manually compensate for wind during airdrop |
| | Reduced flight crew workload |
| Position deviations are calculated relative to where the formation aircraft is supposed to be relative to the element leader | Eliminates guesswork on proper formation position when executing sequential flight commands like turns |
| | Handle sequential (delayed) maneuvers using buffered surveillance data from element leader |
| | Reduces flight crew workload |
| Time-based along track position relative to element leader | Algorithms have the capability to handle along track formation position specified as a time rather than a distance |
| | Increased mission flexibility |

When embodied as an AFC, the integrated traffic surveillance apparatus 100 provides a security solution that employs strong cryptographic encryption techniques that ensure that legitimate formation aircraft 208 reject intentionally incorrect or deceptive squitter messages, i.e., reply signals, sent by an adversary in an attempt to spoof the message recipient(s). In addition, the solution provided by the integrated traffic surveillance apparatus 100 provides an added benefit of augmenting the LPI/LPD (Low-probability of Detection/Intercept) mechanisms, as discussed herein because encryption further protects the message field content of legitimate aircraft squitters from unauthorized disclosure to adversaries who may monitor RF transmissions in an attempt to track formation aircraft.

The security solution employs mature security technology based a known proprietary fielded and operational flight information broadcast system and re-uses many of the approaches and system elements. For example, the base flight information broadcast system avionics uses an integrated crypto processor executing an encryption algorithm approved by the National Institute of Standards and Technology (NIST). Similarly, the key management approach is virtually identical to the key management system of the base flight information broadcast system, which generates and distributes keys to the avionics equipment using a common MEK database and PCMCIA-based distribution approach.

The security solution features a NIST-approved Advanced Encryption Standard (AES) crypto-algorithm with 128-bit keys to encrypt the 56-bit message field of the 112-bit Mode-S squitter. The security solution features an AES full-block cipher feedback (CFB) mode of operation that is used to encrypt the message field without data expansion, i.e., the encrypted message output is also 56 bits, therefore the transmitted squitter is still 112 bits. The existing 24-bit parity is computed prior to encryption and after decryption because AES CFB passes any transmission bit errors through to the same bit locations in the unencrypted message, which permits the 24-bit parity code to detect the errors. The security solution also implements the 112 bit Mode S Error Detection and Correction (EDAC) logic defined in DO-185A. Message decoding is treated as a three-stage process: error detection, error pattern location, and error correction.

The currently installed AFC systems are known to consist of a 6 MCU size enhanced TCAS (ETCAS) processor and two directional antennas mounted on the top and bottom of the aircraft. Because the integrated traffic surveillance apparatus 100 of the invention uses the same TCAS antenna system, integration is simple and there is no impact to the aircraft's mold-line or antenna farm. Therefore, during the aircraft integration phase of the program the only Group/Category A assets to consider are mounting racks and connectors for the processor 182 embodied in the 4 MCU size LRU 118 (shown in FIG. 3) and Interface Unit (IU) 262 embodied in a separate 2 MCU size LRU 124 shown in FIG. 3.

Table 4 illustrates the installation and integration impact of the integrated traffic surveillance apparatus 100 of the invention integrated traffic surveillance apparatus 100 of the invention.

TABLE 4

| Leading Particular | Integration/Impact |
| --- | --- |
| Weight | Combined weight of the processor LRU 118 and IU LRU 124 is less than 22 pounds, 3 pounds lighter than the currently installed ETCAS processor. SKE components eliminated (roughly 50 lbs plus SKE cabling, etc eliminated). |
| Volume | Combined ARINC 600 volume of the 4 MCU processor 182 and 2 MCU IU 262 is exactly the same as the currently installed 6 MCU ETCAS processor. |
| Power | ETCAS nominal power consumption is 110 watts. Combined power consumption of the processor 182 and IU 262 is less than 100 watts. |
| Cooling | Although recommended to improve reliability, neither the processor 182 nor the IU 262 requires forced air cooling. The currently installed ETCAS processor requires forced air cooling. Combined heat dissipation of the AFC apparatus 100 is 20 watts less than the currently installed ETCAS processor. |
| Integration | Significantly reduced installation/integration labor/cost. No change to existing Group/Category A antennas. |
| Reliability & Maintainability | The SKE system is assumed to be demonstrating <1000 hrs MTBF; the AFC apparatus 100 is 16,000 hours. SKE components & ETCAS processor eliminated and replaced with the AFC apparatus 100 provides an increase of at least 15,000 hours between failures compared to the current system. Increased mission availability. |

Figure 15:
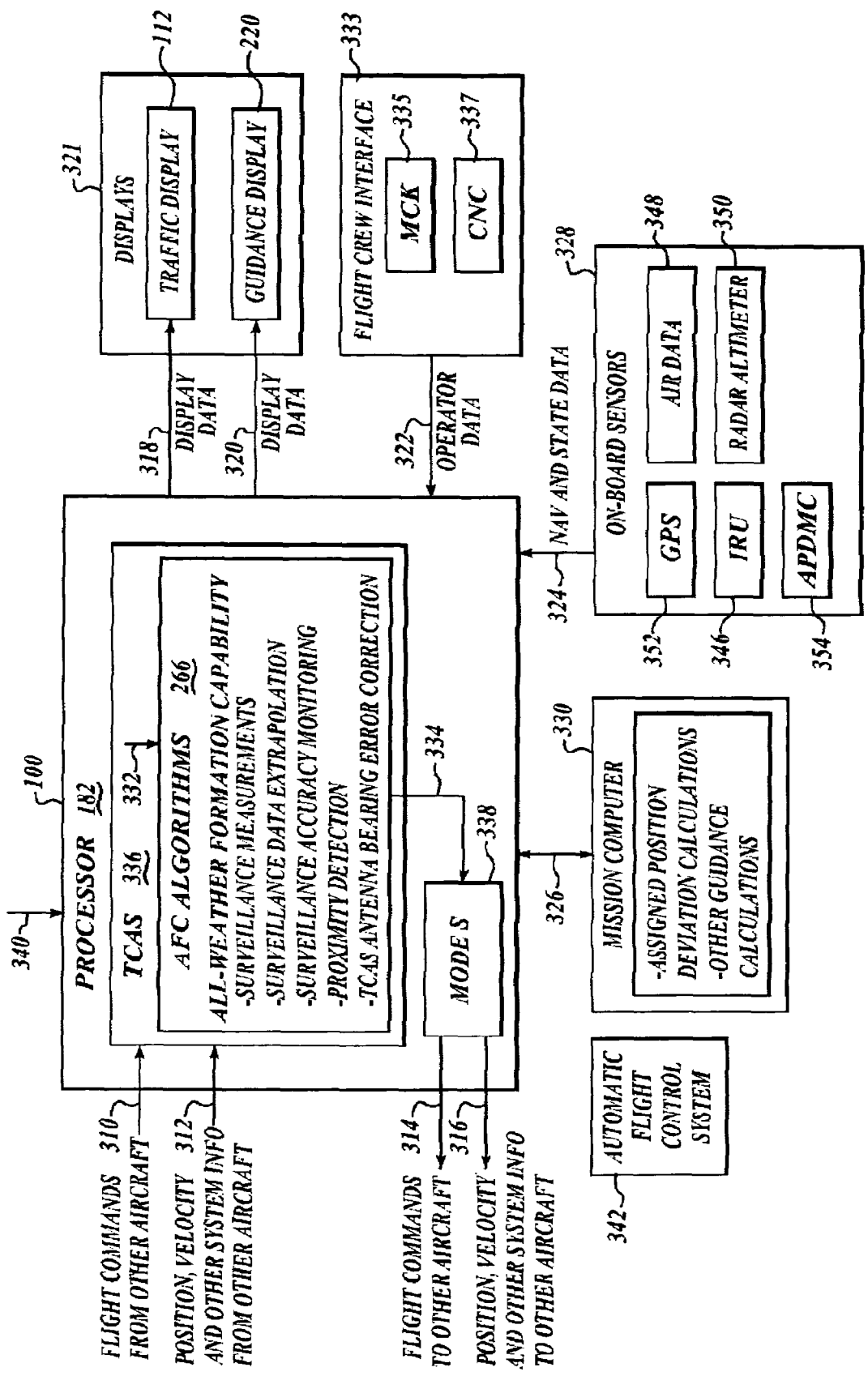
FIG. 15 illustrates the integrated traffic surveillance apparatus of the invention embodied as an All Weather Formation Capability apparatus that interfaces with the flight crew, displays, mission computer and on-board sensors in addition to a datalink with other aircraft equipped with the integrated traffic surveillance apparatus of the invention.

FIG. 15 illustrates the integrated traffic surveillance apparatus 100 of the invention embodied as an AFC apparatus that interfaces with the flight crew, displays, mission computer and on-board sensors in addition to a datalink with other similarly-equipped aircraft. Interface 310 represents the flight command and surveillance data that is received from other formation aircraft, and interface 312 represents the aircraft state information from other formation aircraft: position, velocity, and other system information. Interface 314 represents the flight command and surveillance data that is transmitted to other formation aircraft, and interface 316 represents the own aircraft state information transmitted to other formation aircraft: position, velocity, and other system information. Interfaces 318, 320 represent the 1553 bus data that is sent to a mission computer display (MCD) 321 having the displays 112, 220. Interface 322 represents the 1553 bus data that is received from the flight crew 333 via a mission computer keyboard (MCK) 335 and a communications/navigation control (CNC) panel 337 via the 1553 data bus 262 (shown in FIG. 11). Interfaces 324 represents the 1553 bus data that is received from own on-board sensor systems 328 such as GPS position data, air data, inertial reference unit data, and radar altimeter data, and interface 326 represents data that is exchanged with a mission computer 330 such as assigned position deviation calculations and other guidance calculations. Interface 332 and interface 334 are internal to the integrated traffic surveillance apparatus 100 and handle data exchange between the TCAS 336 and Mode-S transponder 338 and the AFC algorithms 266. Interface 340 represents a capability to input aircraft-specific or configuration-specific parameters at installation.

The integrated traffic surveillance apparatus 100 embodied as an AFC apparatus contains the Mode-S transponder functionality 338, military TCAS functionality 336, and All Weather Formation Capability (AFC) processing 266. The AFC processing 266 includes: receiving datalinked information from sensors on-board the other formation aircraft; receiving TCAS measurement of range, bearing and elevation to other formation aircraft; continuous monitoring of the surveillance accuracy to select the best surveillance source; extrapolation and time synchronization of surveillance data to provide the best estimate of the location and relative location of formation aircraft; proximity detection alerting; output of formation aircraft position in a relative frame having range, bearing and elevation information; or an absolute frame having North-East-Down or heading-referenced information; and TCAS antenna bearing correction algorithms that take advantage of GPS data when available.

According to one embodiment of the invention, the integrated traffic surveillance apparatus 100 embodied as an AFC apparatus does not interface directly with aircraft's Automatic Flight Control System (AFCS) 342. Instead, the mission computer 330 is responsible for taking the surveillance information that is output from integrated traffic surveillance apparatus 100 and calculating the deviations from the assigned formation position and other guidance information for the traffic and guidance displays 112, 220 and the AFCS 342.

Figure 16:
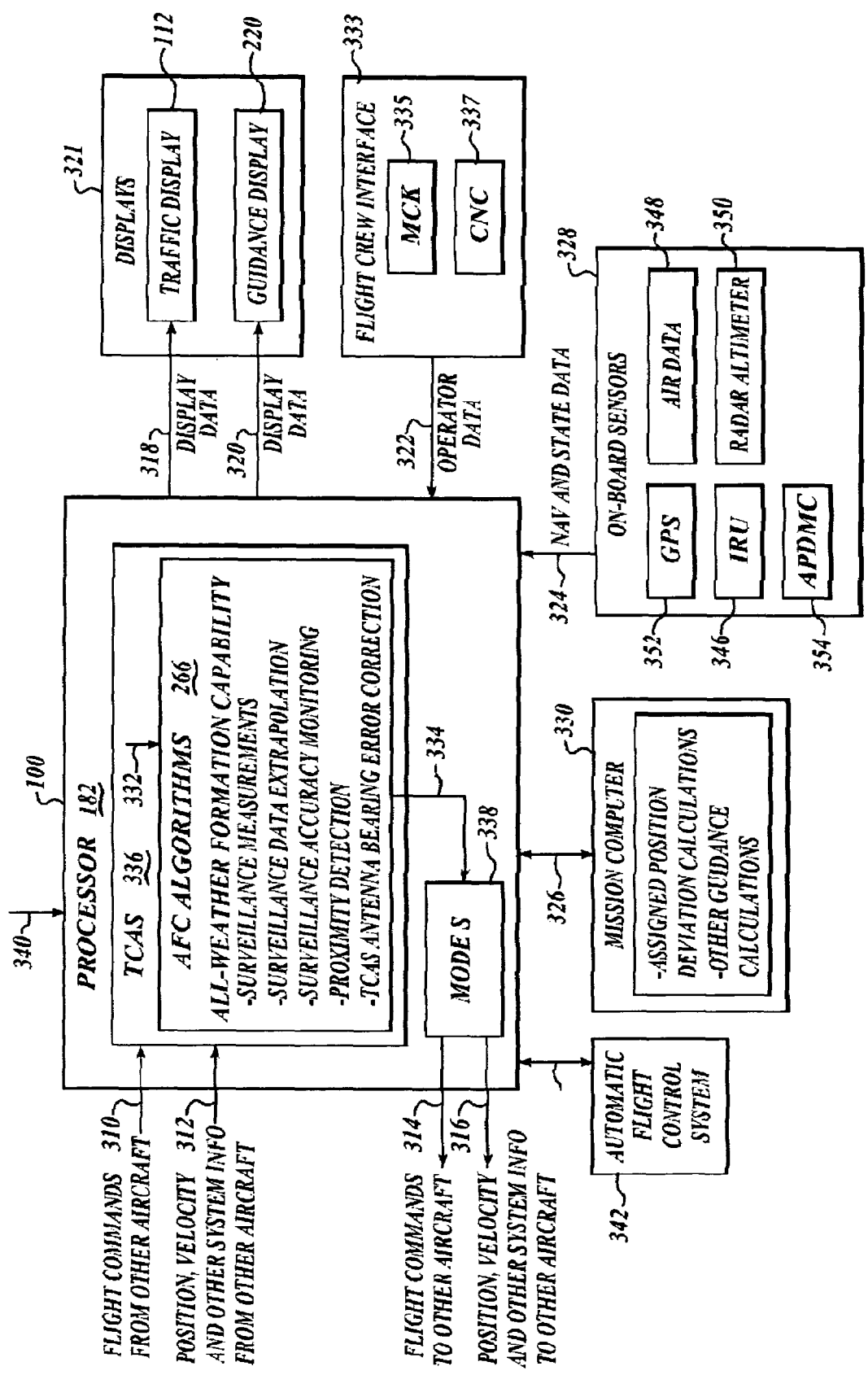
FIG. 16 illustrates the integrated traffic surveillance apparatus of the invention having additional outputs available for guidance.

FIG. 16 illustrates the integrated traffic surveillance apparatus 100 having additional outputs available for guidance. Some of the functionality that currently exists in the mission computer 330 is included in the AFC 266, such as: assigned position deviation calculations; calculation of modified bank angle and speed flight commands for turning aircraft that have a cross track offset from the element leader; and calculation of flight control modes that can drive guidance display information. This information is output to the 1553 data bus 262 and fed to the mission computer 330 for additional processing or provided directly to the guidance display 220 and AFCS 342 via additional interface 344.

The integrated traffic surveillance apparatus 100 processor 182 also receives direct inputs from aircraft systems via ARINC 429, discrete and analog inputs. The integrated traffic surveillance apparatus 100 is connected to a top and bottom directional TCAS antennas 102, 104 using a set of four coaxial cables for each antenna. The processor 182 transmits mode and status information to either the IU 262 or CIPs 264 (shown in FIG. 11), which converts it as appropriate for output as digital information on the 1553 data buses.

The integrated traffic surveillance apparatus 100 processor 182 is the 4 MCU LRU 118 (shown in FIG. 3) designed for rack mounting in the equipment bay. It uses an ARINC 600 style connector. The processor 182 provides the digital signal processing required to convert RF reply data from transponders into command and display output. The processor 182 also transmits interrogations via the top and bottom directional antennas 102, 104 to track aircraft to perform TCAS or AFC functions. The IU Interface Unit 262 (shown in FIG. 11) provides communication between the integrated traffic surveillance apparatus 100 and other similarly equipped aircraft systems via a MIL-STD-1553 data bus. The IU 262 is embodied in the separate LRU 124 (shown in FIG. 3) which conforms to a 2-MCU ARINC 600 form-factor, designed for rack mounting in the equipment bay. The IU 262 accepts, but does not require, forced-air cooling per ARINC 600. Functionally, the IU 262 accepts data, such as range, mode and BIT status, from the processor 182 via a high speed ARINC 429 bus for output on one of two bi-directional MIL-STD-1553 buses.

The hardware partitioning and technologies allocated to each major circuit card assembly (CCA) of the IU 262 housed in the LRU 124 are a Communications Processor Module (Comm CCA) and a IU power supply module. The Comm CCA includes a PowerPC microprocessor, FLASH memories, SDRAM memories and various I/O peripherals. MIL-STD-1553 communications are processed using a commercial-off-the-shelf integrated circuit. As illustrated in FIG. 3, interface of the IU LRU 124 to the separate processor LRU 118 is achieved with a high-speed ARINC 429 TX/RX interface. The IU power supply is contained on a separate CCA, similar in form to both the Comm processor CCA. The power supply module contains an inrush current limiter and a high-efficiency switching power supply, and converts the 115 Volts AC, 400 Hertz input to +5 and +/−15 Volts DC for distribution on the other CCAs.

The integrated traffic surveillance apparatus 100 communicates with the mission computer (MC) 330 on a dual channel MIL-STD-1553 multiplex data bus. Specifically, the processor 182 interfaces to MC 330 via existing CIPs 264, or to the Interface Unit (IU) 262 interfaces to the MC 330 via the 1553 data bus. The IU 262 receives and transfers aircraft, AFC control and selection data from the MC 330 and to the processor 182 via a dedicated high speed ARINC 429 interface. The IU 262 receives AFC data from the processor 182 via a dedicated high speed ARINC 429 interface and outputs AFC data to the MC 330 via the 1553 data bus. The processor 182 is interwired to the IU 262 to provide the required Mode-S input data. Installation and connector pin definition are based on ARINC 718A requirements. If the option to use the CIP 264 is selected instead of the IU 262, the number of 429 interfaces between the CIP 264 and the processor 182 is reduced to a single set of TX/RX buses by "packing" all of the required AFC functions and Mode-S onto a single bus. The integrated traffic surveillance apparatus 100 provides Built-In Test Interface fault information via the 1553 data bus.

The processor 182 and IU 262 provide data uploading and downloading capability using the ARINC 615-3 protocol. The processor 182 also provides data uploading and downloading capability via the LRU's front panel PCMCIA card interface 186 (shown in FIG. 8).

The integrated traffic surveillance apparatus 100 accepts sensor data via the 1553 data bus from the on-board sensors 328, including an Inertial Reference Unit (IRU) 346, air data computer (ADC) 348, radar altimeter (RA) 350, global positioning system (GPS) 352 and air propulsion and data management computer (APDMC) 354.

The integrated traffic surveillance apparatus 100 interfaces with the mission computer display (MCD) 321, mission computer keyboard (MCK) 335 and the communications/navigation control (CNC) panel 337 via the 1553 data bus. The integrated traffic surveillance apparatus 100 accepts mode control data from the Mission Computer Display (MCD) 321 via the 1553 data bus. The integrated traffic surveillance apparatus 100 accepts user selection alphanumeric inputs from the mission computer keyboard (MCK) 335 via the 1553 data bus. The integrated traffic surveillance apparatus 100 accepts course and mode select via the communication/navigation control panel 337 via the 1553 data bus. The integrated traffic surveillance apparatus 100 accepts operates on fixed transmit frequencies (TCAS/ACAS operates at 1030 MHz, Mode-S operates at 1090 MHz) and does not require selection of frequency or channel mode.

Characteristics of the integrated traffic surveillance apparatus 100

As discussed herein, the integrated traffic surveillance apparatus 100 embodied as an AFC apparatus supports four (4) major AFC modes of operation: AFC transmit mode, AFC Quiet transmit mode, AFC Silent mode, and AFC Extended Range mode. The integrated traffic surveillance apparatus 100 also provides Off, Standby and Maintenance modes in addition to a mode which supports known standard commercial ACAS II functionality. The functions and features provided by each major AFC mode are shown in Table 5 and Table 6.

TABLE 5

| AFC Operating Mode | Functions and Features | | | | | |
|---|---|---|---|---|---|---|
| | Transmit | Mode-S Power Programming | Anti-Jamming | Encrypted Position (selectable) | INS/Degraded GPS Back-up | Autopilot Interface |
| AFC Transmit | X | X | | | X | X |
| AFC Quiet Transmit | X | X | X | X | X | X |
| AFC Silent | | | X | X | X | X |
| Extended Range | X | | | | X | |

TABLE 6

| AFC Operating Mode | Functions and Features | | | | |
|---|---|---|---|---|---|
| | Hybrid Surveillance | Mode A "Tags" | Refueling Support | Minimal Active Inter-rogations | Compatible w/Civil Airspace (ICAO approved) |
| AFC Transmit | X | X | X | X | X |
| AFC Quiet Transmit | | X | X | X | For Military Mission |
| AFC Silent | | | | None | For Military Mission |
| Extended Range | X | X | X | | X |

The integrated traffic surveillance apparatus 100 is in OFF Mode when power is first applied to the aircraft, and remains in OFF Mode until commanded to Standby mode via a DC Power Control discrete connected to the IU 262. The apparatus 100 actively responds to 1553 data bus messages in Standby mode. The apparatus 100 does not transmit while in Standby mode. The apparatus 100 transmits position, identification and data links information when in Transmit mode. Range and bearing measurements are derived by actively interrogating aircraft when in Transmit Mode. The following modes/sub-modes will transmit: ACAS II mode, Extended range mode, Hybrid surveillance mode and Quiet mode.

The apparatus 100 operates in Maintenance/Development Mode when a Maintenance PC is connected to a dedicated maintenance bus or via the PCMCIA card interface 186.

When operating in AFC Silent Mode, the integrated traffic surveillance apparatus 100 passively tracks other formation aircraft by receiving extended squitter position, identification and data link information. Own-aircraft position, identification and data link information are not transmitted when operating in Silent mode.

When operating in AFC Quiet Transmit Mode, the integrated traffic surveillance apparatus 100 provides a Quiet mode of operation to minimize the probability of detection or intercept in a combat environment. In Quiet Mode, the output power is automatically incremented from a minimum of 1 watt (30 dBm) up to a power level required to maintain communications. Quiet Mode operation is manually selected by the formation leader 200 and data linked to the rest of the formation 202. Each formation member 208 is able to manually override Quiet Mode. In Quiet operation, the processor 182 manages both MILACAS (TCAS) and Mode-S transmit output power. Transmit power of the processor 182 is programmed in a plurality of steps, for example, 23 steps, 1 dB per step, ranging from 30 dBm (I watt) to full power. The algorithm for programmable power is based, for example, on Section 2.2.16.3.2 of document RTCA/DO-185A. Targets with ranges greater than 20 nautical miles are interrogated at full normal power. Targets with ranges less than 20 miles are interrogated with reduced power calculated as a function of their range and any level of interference detected.

When operating in Extended Range Mode, the integrated traffic surveillance apparatus 100 extends the active interrogation surveillance range. In this mode the active interrogation range for the apparatus 100 is extended to 40 nautical miles in all directions which allows the side and aft quadrant interrogation range to match the forward quadrant interrogation range. Additionally, the apparatus 100 extends the active surveillance range from 80 to 100 nautical miles in the forward quadrant. The top antenna ATCRBS whisper-shout interrogation sequences are modified to implement extended search in all four quadrants. This is accomplished by transmitting the known six-step moderate density Mode C-only interrogation pattern from each of the four beams on the top antenna 102. If de-garbling is needed, the known 24-step high density interrogation pattern is used. The maximum power for each quadrant is, by example and without limitation, 53 dBm Effective Radiated Power (ERP) from the top MILACAS antenna 102. There are no changes to the Mode C-only interrogations from the bottom antenna 104. Mode-S power transmitted is the same for the Extended range mode and ACAS II mode.

In addition to the extended range capability, a Mode A-only whisper-shout interrogation sequence from the top antenna 102 provides Mode A identification tracking. In each quadrant, the Mode A surveillance beam uses the same density interrogation pattern that the Mode C surveillance is using. However, the Mode A surveillance cycle is performed by transmitting only one whisper-shout sequence each second for a four second period instead of once every second. The four second Mode A-Only interrogation cycle is followed by sixteen seconds in which no Mode A-Only interrogations are transmitted. The twenty second cycle is repeated cyclically.

DO-185A interference limiting algorithms are used to minimize the effects of TCAS surveillance on victim transponders in both standard ACAS II and Extended range mode.

ACAS II Mode

As is well-known, ACAS II is a collision avoidance system similar to TCAS II as operated outside the United States. While operating in ACAS II mode, the integrated traffic surveillance apparatus 100 operates as described in the RTCA DO-185A MOPS. Regarding inputs and outputs, the processor 182 was structured in accordance with the ARINC 735A standard such that the integrated traffic surveillance apparatus 100 is a direct replacement for the existing Enhanced TCAS processor. The additional aircraft interfaces required to satisfy the Mode-S installation requirements are defined in ARINC 718A and are added to the existing Enhanced TCAS ARINC 600 connector currently installed. These interfaces are added to the Right Top Plug (RTP) of the ARINC 600 connector. The AFC digital input and output requirements are handled using dedicated high speed ARINC 429 buses.

One embodiment of the integrated traffic surveillance apparatus 100, shown in FIG. 11, uses a processor 182 and a separate Interface Unit (IU) 262 to provide aircraft communication via the dual channel 1553 data bus.

Figure 17:
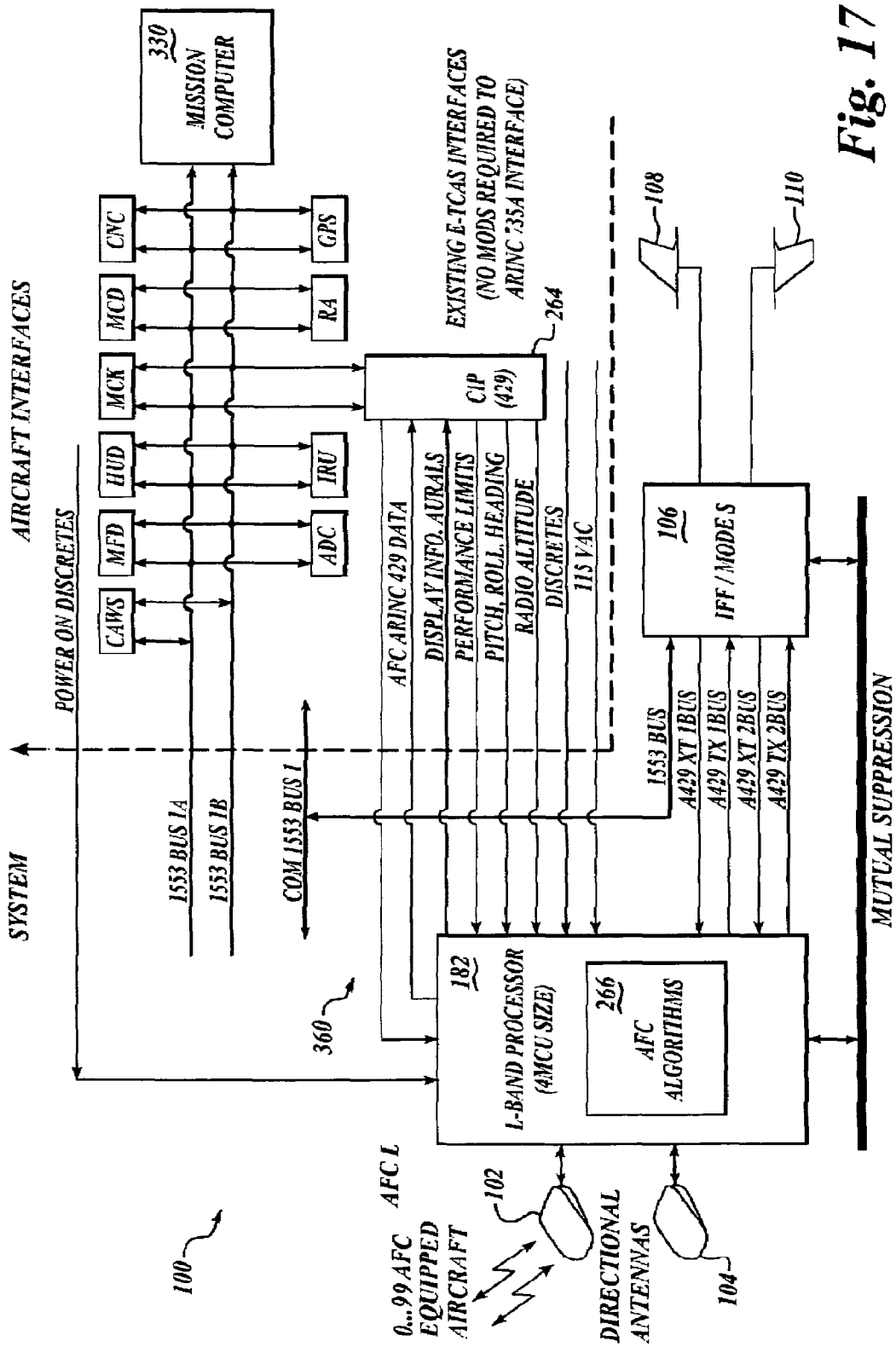
FIG. 17 illustrates an embodiment of the invention lacking a 1553 bus Interface Unit, whereby the integrated traffic surveillance apparatus of the invention requires changes to existing Core Integrated Processors (CIPs), as shown in FIG. 11, installed on the aircraft to convert dual channel 1553 I/O from a mission computer to ARINC 429 format data.

FIG. 17 illustrates an embodiment without the IU 262 that requires changes to the existing CIPs 264 installed on the aircraft to convert the dual channel 1553 I/O from the mission computer 330 to ARINC 429 format data. The apparatus 100 accepts all mode selection commands over the high speed ARINC 429 interface via the 1553 data bus, except for Off mode. This ARINC 429 format data is transmitted or received from a dedicated high speed ARINC 429 bus 360. This embodiment is appropriate because the existing Enhanced TCAS processor receives some of the aircraft data required for the integrated traffic surveillance apparatus 100, e.g., attitude, heading, radio altitude, GPS position. This embodiment requires a slight aircraft modification to add one high speed ARINC 429 receive bus and one transmit bus. This embodiment also reduces aircraft integration risk because the Enhanced TCAS is currently installed and operating, this embodiment thus eliminates the need to install another LRU to provide the 1553 to ARINC 429 conversion.

Discrete Interfaces

The integrated traffic surveillance apparatus 100 includes a Power-on Enable Discrete, whereby the apparatus 100 provides a discrete input that causes the apparatus 100 to transition from Off to Standby mode per the standard ARINC discrete electrical characteristics. The IU 262 provides remote address configuration pins as specified in MIL-STD-1553. Additionally, the apparatus 100 provides spare discrete I/O should additional interfaces become useful or necessary.

The integrated traffic surveillance apparatus 100 provides a PC based software support tool known as MONTPA that is loadable onto a commercially available PC/Laptop. This support tool interfaces with the maintenance/development bus via a dedicated Ethernet bus on the ARINC 600 connector or an Ethernet Adapter Card plugged in the PCMCIA slot 186 on the front of the LRU 118 (shown in FIG. 3). This mode is inhibited when the laptop is not connected. Additionally, the LCD display 122 on the front panel 120 of the LRU 118 allows maintenance personnel access to the processor 182 to determine the status of any aircraft interface, view fault data and verify LRU and software part numbers. Access to the LCD display 122 does not require any external support equipment and can be accessed any time the LRU 118 is powered up.

Anti-jamming

The integrated traffic surveillance apparatus 100 provides the capability to detect in-band interference. The apparatus 100 incrementally increases transmit power and receiver minimum trigger level (MTL) based on the detected CW interference/jamming level.

Anti-spoofing

Figure 18:
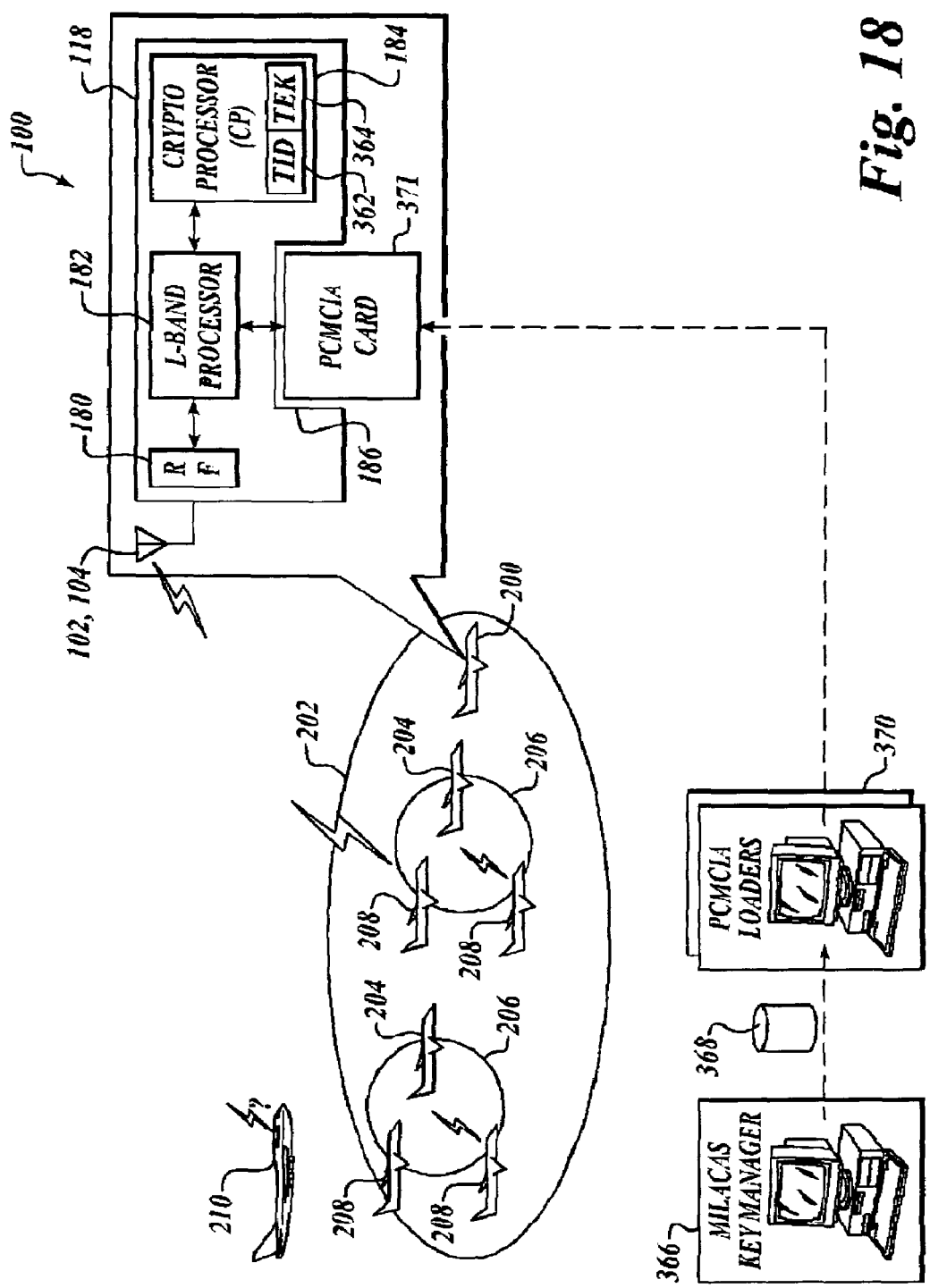
FIG. 18 illustrates the security/encryption capability provided by the integrated traffic surveillance apparatus of the invention embodied as an All Weather Formation Capability apparatus.

FIG. 18 illustrates the security/encryption capability provided by the integrated traffic surveillance apparatus 100 embodied as an AFC apparatus. The security solution embodied in the integrated traffic surveillance apparatus 100 employs strong cryptographic encryption techniques to ensure that legitimate formation aircraft reject intentionally incorrect or deceptive squitter messages sent by an adversary in an attempt to spoof the message recipient(s). In addition, the security solution augments the LPI/LPD (Low-probability of Detection/Intercept) mechanisms since encryption further protects the message field content of legitimate aircraft squitters from unauthorized disclosure to adversaries who may monitor RF transmissions in an attempt to track formation aircraft 208.

The security solution employs the NIST-approved Advanced Encryption Standard (AES) crypto-algorithm with 128-bit keys to encrypt the 56-bit Message Field of the 112-bit Mode-S squitter. The AES full-block Cipher Feedback (CFB) mode of operation is used to encrypt the message field without data expansion, i.e., the encrypted message output is also 56 bits, therefore the transmitted squitter is still 112 bits. The existing 24-bit parity is computed prior to encryption and after decryption since AES CFB passes any transmission bit errors through to the same bit locations in the unencrypted message, which permits the 24-bit parity code to detect the errors. The security solution also implements the 112 bit Mode-S Error Detection and Correction (EDAC) logic as defined in DO-185A. Message decoding is treated as a three-stage process: error detection, error pattern location and error correction.

The crypto-processor (CP) 184, containing encryption/decryption algorithms, is a tamper-resistant processor with a unique Terminal Identification (TID) 362 and a Terminal Encryption Key (TEK) 364. A key manager 366 is used to initially personalize the crypto-processor 184 with the unique Terminal Identification (TID) 362 and Terminal Encryption Key (TEK) 364, and generates encrypted database 368 of monthly encryption keys (MEK). Distributed PCMCIA card loader stations 370 load and distribute the PCMCIA cards 371 to platforms via the PCMCIA interface 186. The unique Terminal Identification (TID) 362 and a Terminal Encryption Key (TEK) 364 are used to retrieve the encrypted monthly MEK stored on the PCMCIA card 371. Thereafter, all equipped aircraft in the formation 202 receive, decrypt and processes encrypted squitters, e.g., commands from the formation leader 200 or element leaders 204. Equipped aircraft may join or depart the formation 202 and send and receive encrypted squitters without any additional communication overhead. However, commercial and other non-equipped aircraft 210 that receive the encrypted squitter interpret it as "garbled" and discard it.

Figure 19:
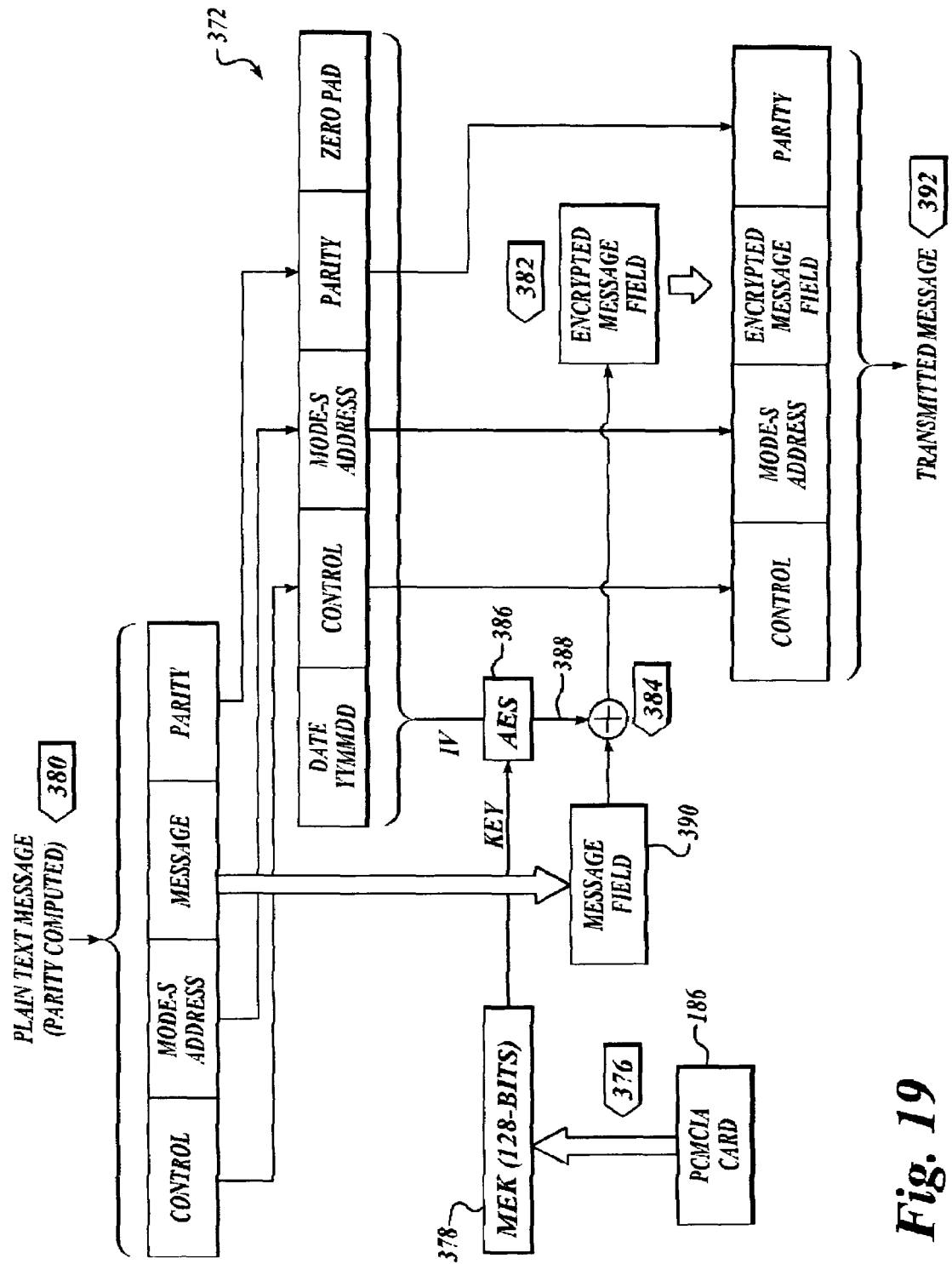
FIG. 19 illustrates the encryption process employed by the integrated traffic surveillance apparatus of the invention during squitter transmission.
Figure 20:
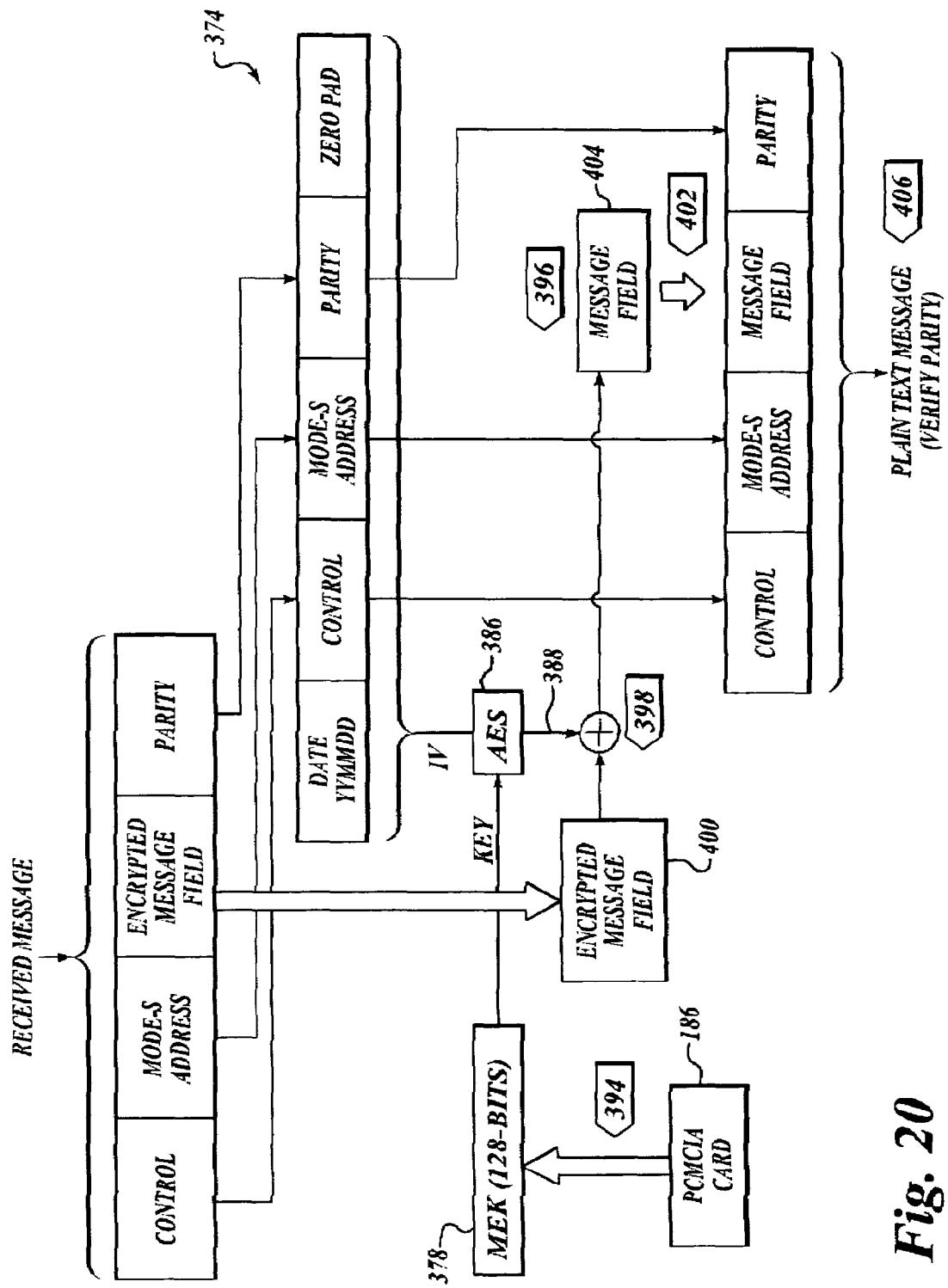
FIG. 20 illustrates decryption process employed by the integrated traffic surveillance apparatus of the invention during squitter reception.

FIG. 19 illustrates the encryption process 372 and FIG. 20 illustrates decryption process 374 employed during squitter transmission and reception, and Table 7 summarizes the encryption and decryption process steps identified in FIGS. 18 and 19.

TABLE 7

Encryption and Decryption Process Steps

| Step | Description |
| --- | --- |
| FIG. 19: Encryption Process 372 | |
| 376 | The current date (year and month) is used to select the appropriate Monthly Encryption Key (MEK) 378 |
| 380 | The 24-bit parity is computed over the 8-bit Control Field, 24-bit Mode-S Address, and the 56-bit Message Field prior to encryption. |
| 382 | The Control Field, Mode-S address, Parity, and date information (year, month, day) are used to generate a per-message Initialization Vector (IV) |
| 384 | With the selected MEK 378 and computed IV as inputs, an AES algorithm 386 generates a key stream 388 used to encrypt the 56-bit Message Field 390 and produce an encrypted 56-bit result. |

TABLE 7-continued

Encryption and Decryption Process Steps

| Step | Description |
| --- | --- |
| 392 | The message is re-assembled and transmitted with the encrypted 56-bit Message Field in place of the original plaintext. |
| | FIG. 20: Decryption Process 374 |
| 394 | The current date (year and month) is used to select the appropriate Monthly Encryption Key (MEK) 378 |
| 396 | The Control Field, Mode-S address, Parity, and date information (year, month, day) are used to generate a per-message Initialization Vector (IV) |
| 398 | With the selected MEK 378 and computed IV as inputs, the AES algorithm 386 generates the key stream 388 used to decrypt the 56-bit Encrypted Message Field 400 and produce an unencrypted 56-bit result. |
| 402 | The message is re-assembled the unencrypted 56-bit Message Field 404 in place of the received encrypted field 400. |
| 406 | The 24-bit parity is computed over the 8-bit Control Field, 24-bit Mode-S Address, and the 56-bit Message Field, and parity is verified. |

An avionics subsystem contains an integrated traffic surveillance apparatus 100 crypto-processor (CP) 184, which implements the AES encryption algorithm 386 and associated key management functions. The integrated traffic surveillance apparatus 100 thus takes advantage of readily available commercial off-the-shelf smart-card processors, which incorporate protection mechanisms to prevent external access to, alteration of, or extraction of cryptographic algorithms and key management functions once the processor is programmed. The CP 184 interfaces with the main processor 182 via a dedicated data interface port and communicates via a well-defined command/status protocol. The CP 184 application software executes a finite state machine with fully defined states and state transitions such that unencrypted keys cannot be extracted or accessed via the data interface in response to received commands and associated state transitions.

The integrated traffic surveillance apparatus 100 employs the following key management approach: as described herein, the AES algorithm 386 encrypts messages using an MEK 378, which is generated by a centralized Key Management System (KMS) 366 (shown in FIG. 18) and pre-loaded into the avionics. The KMS 366 is a commercial off-the-shelf workstation and key management software application that securely creates a database of MEK 378 specific to the integrated traffic surveillance apparatus 100, the quantity of which is based on customer-driven mission needs, e.g., twelve monthly MEK to accommodate a full year of operations. The KMS 366 distributes the database 368 to one or more de-centralized facilities outfitted with a standard commercial off-the-shelf workstation that loads the database 368 onto PCMCIA memory cards 371. In turn, these facilities distribute a PCMCIA card 371 to each platform on which the integrated traffic surveillance apparatus 100 avionics is installed. The MEK 378 in the database are encrypted prior to distribution to prevent key compromise in the event that a loaded PCMCIA card 371 is lost or stolen.

Each CP 184 integrated in the MILACAS avionics is factory programmed with a unique Terminal Identifier (TID) 362 and a unique Terminal Encryption Key (TEK) 364, which are used to access and decrypt the monthly MEK 378 stored on the PCMCIA memory card 371. When the KMS 366 creates the database 368, it includes a unique key management record for every CP 184 manufactured and fielded. Creating and distributing a common database 368 eliminates customization and distribution of the PCMCIA cards 371 by aircraft, i.e., the PCMCIA load is common for all MILACAS avionics. When the database 368 is configured with twelve monthly MEK 378, a single 40-kbyte database 368 loaded on each PCMCIA card 371 is all that is required to provide a fleet of 1,000 MILACAS-equipped aircraft with enough keys 378 for a full year of operation.

Inter-Aircraft Data Link

The integrated traffic surveillance apparatus 100 transmits and receives data between formation aircraft 208. As described in Table 8, the apparatus 100 transmits and receives position, velocity, flight commands and other formation information. Range and bearing measurements are derived by actively interrogating aircraft. Each transmission includes the Mode-S address as the aircraft identifier and is time-tagged within 10 milli-seconds of the time of measurement.

The integrated traffic surveillance apparatus 100 accepts mission computer 330 or other data from the 1553 bus on one aircraft, transmits this data using the Mode-S transponder, receives the data with the TCAS on a cooperating aircraft, and makes the data available to the mission computer 330 or other systems on the 1553 data bus of the cooperating aircraft. The bus interface for the apparatus 100 is ARINC 429. The conversion to or from 1553 data is done via the III 262 or the core interface processor 264 (shown in FIG. 11 and FIG. 17).

TABLE 8

Inter-aircraft Data

| Type of Data | Description |
| --- | --- |
| Identifier | Mode S address (all transmissions) |
| Flight commands | Speed commands |
| | Turn commands |
| | Altitude commands |
| | Airdrop commands |
| Surveillance data | CPR-encoded latitude and longitude |
| | Altitude and altitude type |
| | Position type code (accuracy measure) |
| | North and East velocity |
| | Velocity type code (accuracy measure) |
| | Altitude rate |
| | Turn status |
| | Range (active interrogation) |
| | Bearing (active interrogation) |
| | Elevation (active interrogation) |
| Other formation information | New barometric altimeter setting |
| | Formation spacing changes |

The AFC apparatus 100 is capable of data linking from one aircraft to a single aircraft or broadcasting to multiple aircraft at a data link data rate of 2,000 bits at 4 Hz for aircraft within 10 nautical miles. Data rates outside of 10 nautical miles are also achievable.

The AFC apparatus 100 has a peak data link data rate capability of 300 bits at 4 Hz, assuming any aircraft may be required to transmit data to all of the surrounding formation aircraft 208 within 10 nautical miles. These rates assume the closest "drop zone" spacing of 2,000 feet which results in twenty wingmen 208 and ten element leaders 204 within 10 nautical miles. The AFC apparatus 100 data links data from the formation leader 200 to each element leader 204, then each element leader 204 transfers data to the wingmen 208 in their formation cell 206. Therefore, the AFC apparatus 100 has a peak data link data rate capability of 900 bits at 4 Hz. Both data rate calculations assume transmitting about 300 UF-19's per second using all 112 bits of the message.

Simulation modeling and analysis shows that 2 Hz data link data rate is sufficient for formation flight. For selected aircraft, the 2 Hz transmission rate is increasable to satisfy surveillance accuracy requirements. The transmission rate is increased, for example, if the TCAS does not receive a reply to an active interrogation. A 2 Hz data link data rate results in a capability of 1,840 bits per second. Internally, the AFC apparatus 100 uses the datalinked North-East-Down velocity components and turn status to extrapolate the position measurements for the formation aircraft. The extrapolated position is output to the 1553 bus between surveillance measurements. The data link time applicability is the time difference between when the AFC apparatus 100 receives a 1553 data package and when the cooperating the AFC apparatus 100 outputs this data package to the 1553 bus. The data link time applicability for the AFC apparatus 100 may be up to 450 milli-seconds in the past.

The AFC apparatus 100 includes strong cryptographic encryption techniques to ensure that legitimate formation aircraft reject intentionally incorrect or deceptive squitter messages, as discussed herein. The AFC apparatus 100 also includes an ability to detect in-band interference and increment the transmitter power and receiver minimum trigger level to overcome the interference, as is also discussed herein. The AFC apparatus 100 also implements the 112 bit error correction and detection algorithm defined in RTCA DO-185A for decoding extended squitters. The error correction and detection algorithm does not impact the data link rates. Error correction and detection is performed on all received replies. The first step is to verify the Mode-S address. The Mode-S address has specific bit characteristics that are checked to verify that the address is valid. Message decoding is treated as a three-stage process: error detection, error pattern location, and error correction. The message decoder uses the bit decision sequence, confidence bit sequence, reply length indicator bit and executed address, The first check in message decoding is a parity check on the bit decision sequence. If errors are detected, the confidence bit sequence is used to attempt to locate a burst error pattern that would correct the message. If the message can not be corrected, it is rejected and the AFC apparatus 100 re-interrogates the aircraft if its Mode-S address is known. As discussed herein, the AFC apparatus 100 uses a 112-bit error correction and detection algorithm that, in conjunction with the encryption and anti-jamming features, prevents any corrupted messages from being processed.

GPS Independence

The surveillance accuracy capabilities of the integrated traffic surveillance apparatus 100 embodied as the All-Weather Formation Capability system satisfies the following: range bias error of no more than the larger of 40 feet or 0.2 percent of the range for formation aircraft within 25 nautical miles; range rms error no more than 40 feet rms for formation aircraft within 25 nautical miles; range with a 50 percent Circular Error Probable (CEP) with a radius within the larger of 200 feet or 1 percent range for formation aircraft between 25 nautical miles and 100 nautical miles; bearing bias error no more than ±0.5 degrees for aircraft within 25 nautical miles; bearing noise within 0.5 degree rms for aircraft within 25 nautical miles; bearing with a 50 percent Circular Error Probable (CEP) with a radius within the larger of 200 feet or 1 percent range for aircraft between 25 nautical miles and 100 nautical miles; relative elevation accuracy less than 40 feet for all aircraft within 4000 feet; and relative elevation accuracy of less than 1 percent of range for formation aircraft outside 4000 feet. Most accuracy requirements are satisfied whether or not GPS is available.

The integrated traffic surveillance apparatus 100 uses two sources of surveillance information. The passive, which is also primary, surveillance source is the GPS/IRU navigation data, which is available on each aircraft and datalinked to formation aircraft. The second surveillance source is the TCAS range, bearing and elevation. When GPS is available, the system uses the datalinked navigation data for primary surveillance. If the navigation solution degrades due to the loss of GPS or any other problem, the system switches to a secondary active surveillance source where the TCAS range, bearing and elevation are used to augment or replace the datalinked navigation data.

When GPS data is valid, the AFC apparatus 100 calculates the relative position of the formation aircraft by differencing the position from own aircraft's navigation system with the datalinked position from the other formation aircraft navigation systems. When GPS data is degraded or not valid, the AFC apparatus 100 augments the navigation system with the TCAS range, bearing and elevation measurements to calculate the relative position. The position accuracy that is output by the navigation system is used to ensure that the surveillance information satisfies the surveillance accuracy requirements.

The surveillance accuracies are summarized in Table 9, where R95 is the 95 percent circular error probability. CEP50 is the 50 percent circular error probability. The GPS/IRU accuracies are derived assuming that the system uses a military P code receiver. Military P code GPS receivers have space, control and user error sources that combine for an expected range error R95 of 42.6 feet. Two GPS error cases are included. For aircraft flying in close proximity, it is assumed that most of the GPS errors are common and will cancel when calculating a differenced position. For the common GPS error case in Table 9, it is assumed that GPS receiver noise is filtered by blending the GPS and IRU information and all of the errors except multi-path, i.e., 7.87 feet, and a small part of the tropospheric error, i.e., 3.28 feet, remain. For the no common GPS errors case in Table 9, the errors for each receiver are root-sum-squared assuming no common errors and no filtering of the GPS receiver noise.

The surveillance accuracies are within limits for both the primary passive and secondary active surveillance sources with two exceptions. The bearing rms error is 1 degree, rather than the 0.5 degree specified. In addition, for aircraft closer than 800 feet, the bearing rms error could exceed 0.5 degree for the passive surveillance source.

TABLE 9

Expected Surveillance Accuracy

| Position Error Measure | Passive Surveillance Source (GPS/IRU with P Code Receiver) | | Active Surveillance Source (TCAS) |
|---|---|---|---|
| | Common GPS Errors | No Common GPS Errors | |
| R95 (ft) | 12.1 feet | 60.3 feet | — |
| Single-axis one sigma horizontal (ft) | 4.9 feet | 24.6 feet | — |
| One sigma vertical | 9.8 feet | 49.2 feet | — |
| Range bias (ft) | 0 feet | 0 feet | ±40 feet |
| Range rms (ft) | 6.9 feet | 34.8 feet | 40 feet |
| Bearing bias (deg) | 0 feet | 0 feet | ±1.0 deg |
| Bearing rms (deg) | arc tan (6.9/range in feet) | arc tan (34.8/range in feet) | 1.0 deg |
| CEP50 | 5.8 feet | 29.0 feet | <0.01 *range |
| Elevation rms (ft) | 9.8 feet | 49.2 feet | <40 feet |

Horizontal protection level (HPL) and the 95 percent containment radius R95 are two common measures of position accuracy. HPL is provided by the GPS/IRU to the 1553 bus and is available for MILACAS-FR to determine the accuracy of the own aircraft navigation solution. An encoded form of R95 is included on the datalinked position measurements. Horizontal protection level is related to the 95 percent containment radius R95 according to: HPL=2.5*R95.

The conditions to select which surveillance source to use are evaluated on an aircraft by aircraft basis and are summarized in Table 10. The conditions depend on an estimate of the R95 error for the relative position calculation. For situations where the R95 for both own aircraft and the other aircraft are close to the expected P code receiver R95 values, the R95 relative calculation assumes that that 80 percent of the errors are common, $R95_{relative}=0.20(R95_{ownship}+R95_{othership})^{0.5}$, if max $(R95_{othership}, R95_{othership})<20$ m.

Otherwise, the $R95_{relative}$ calculation assumes that none of the errors are common $R95_{relative}=(R95_{ownship}+R95_{othership})^{0.5}$, if max $((R95_{ownship}, R95_{othership})>20$ m.

TABLE 10

Estimating Surveillance Accuracy for the Passive Surveillance Source (GPS/IRU)

| Position Error Measure | Estimated Error | Error Threshold | Applicable Surveillance Range |
|---|---|---|---|
| Range bias | 0 feet (See note 1) | <=max(40 feet, 0.02 *range) | Within 25 nm |
| Range rms | 0.577* $R95_{relative}$ | <=40 feet rms | Within 25 nm |
| Bearing bias | 0 feet (See note 1) | <=±1.5 deg | Within 25 nm |
| Bearing rms | arc tan(0.577* $R95_{relative}$/range | <=1.0 deg rms | Within 25 nm |
| CEP50 | 0.48* $R95_{relative}$ | <=max(200 feet, 0.01 *range) | 25 nm to 100 nm |
| Elevation rms | 0.82* $R95_{relative}$ | <max (40 ft, 0.01 *(relative elevation)) | Within 100 nm |

Note 1:
Range and bearing bias errors are zero for a GPS/IRU system due to the characteristics of the GPS errors.

Range

When using the passive surveillance source, the range is measured by differencing the GPS/IRU positions for own aircraft and the other aircraft. When using the active surveillance source, the slant range is measured directly in the TCAS antenna frame. The integrated traffic surveillance apparatus 100 outputs range for up to 100 aircraft located between 100 feet and 100 nautical miles. Range is measured in transmit, quiet transmit and silent modes when using the passive surveillance source and in transmit and quiet transmit mode when using the active surveillance source. Range and range accuracy is output to the ARINC 429 bus with a time tag that is a maximum of 250 milli-seconds in the past. All surveillance measurements are time-tagged on the receiving side within 10 milli-seconds of receipt.

For the primary passive surveillance source, the range accuracy is a function of the GPS/IRU position accuracy on the own aircraft and the other aircraft and the range between the aircraft. The position accuracy for the other aircraft is embedded in the datalinked position squitter, while the position accuracy for the own aircraft is available on the 1553 data bus. The integrated traffic surveillance apparatus 100 calculates the range accuracy as described in Table 10 and switches to the secondary active surveillance source for that aircraft if the range accuracy requirements are not satisfied.

For the secondary active surveillance source, range accuracy is a function of the TCAS antenna characteristics and signal processing. The commercial TCAS range accuracy is 125 feet. The integrated traffic surveillance apparatus 100 reduces this error by: doubling the clock speed to halve the error due to the clock rate; modifying the signal processing; and more accurately controlling the pulse rise time. If these changes are not sufficient to satisfy the 40 feet range accuracy requirement for formation members within 10 nautical miles, the AFC apparatus 100 includes an on-line correction algorithm similar to the algorithm developed to correct the antenna bearing error. When GPS is available, navigation data is used in a least squares estimation algorithm to reduce the residual range error within the specifications.

The integrated traffic surveillance apparatus 100 satisfies the range accuracy requirements with one exception. When the aircraft operates in silent mode, it relies on the datalinked GPS/IRU information for range, since using obtaining TCAS surveillance data requires transmission to initiate transponder response. Should GPS be unavailable for one or both aircraft for an extended period, the range error will slowly drift and may drift outside of the accuracy requirements. Since the range accuracy is output with the range measurements, the aircraft systems will be aware that the range accuracy requirements are not satisfied. The pilot can choose to switch to the quiet transmit mode of operation to get the TCAS range and bearing squitters to retain the required accuracy.

Bearing

When using the passive surveillance source, the bearing is calculated by differencing the GPS/IRU positions for own aircraft and the other aircraft, transforming the differenced position to a local level reference frame aligned with the nose of the aircraft, and taking the arctangent of the cross track and along track relative position. When using the active surveillance source, the bearing is measured directly in the TCAS antenna frame and transformed to a local level reference frame aligned with the nose of the aircraft. Bearing is measured for up to 100 formation aircraft for bearing angles between 0 and 360 degrees.

Bearing is measured in transmit, quiet transmit and silent modes for the passive surveillance source and in transmit and quiet transmit mode for active surveillance source. Bearing and bearing accuracy are provided to the ARINC 429 bus with a time tag that is a maximum of 250 milli-seconds in the past. All surveillance measurements are time-tagged on the receiving side within 10 milli-seconds of receipt. When using the passive surveillance source, the bearing accuracy is a function of the GPS/IRU position accuracy on own aircraft and the other aircraft and the range between the aircraft. The integrated traffic surveillance apparatus 100 calculates the bearing accuracy as described in Table 10 and switches to the active surveillance source for that aircraft if the bearing accuracy requirements are not satisfied.

When using the active surveillance source, the bearing accuracy is a function of the TCAS antenna characteristics. One well-known commercial TCAS antenna has a bearing measurement error that is within 2.0 degrees rms after laboratory calibration. To decrease this error within 1 degree rms, the AFC apparatus 100 uses a proprietary correction algorithm that uses the GPS/IRU surveillance information, when available, to reduce the fixed component of the bearing measurement error. The correction algorithm is based on a recursive least squares algorithm that estimates a set of coefficients for the piecewise linear correction model.

The integrated traffic surveillance apparatus 100 could exceed the 1 degree rms bearing error accuracy limit in silent mode. When the aircraft operates in silent mode, it relies on the datalinked GPS/IRU information for bearing, because obtaining TCAS surveillance data requires transmission to initiate transponder response. Should GPS be unavailable for one or both aircraft for an extended period, the bearing error will slowly drift and may drift outside of the accuracy limits. Because the bearing accuracy is output with the bearing measurements, the aircraft systems are aware if the bearing accuracy requirements are not satisfied. The pilot can choose to switch to the quiet mode of operation to get the TCAS range and bearing squitters to retain the required accuracy.

Relative elevation

When using the passive surveillance source, the relative elevation is measured by differencing the GPS/IRU vertical positions for own aircraft and the other aircraft. When using the active surveillance source, the relative elevation is measured by differencing the barometric altitude from the Mode-S squitter with the barometric altitude on own aircraft. For the passive surveillance source, the relative elevation accuracy is a function of the GPS/IRU position accuracy on the own aircraft and the other aircraft. The integrated traffic surveillance apparatus 100 calculates the elevation accuracy as described in Table 10 and switches to the active surveillance source for that aircraft if the relative elevation accuracy requirements are not satisfied.

For the active surveillance source, the relative elevation accuracy depends on the accuracy of the differenced barometric altitude readings. Typical accuracies for air data are: +/−15 feet from −1000 feet to sea level; +/−20 feet at 10,000 feet; +/−40 feet at 30,000 feet; and +/−80 feet at 50,000 feet.

The quantization error on the Mode-S altitude squitter is 25 feet. When the installation aircraft has multiple air data computers and typical operates at 30,000 feet or below, the AFC apparatus 100 satisfies the 40 feet relative elevation error requirement when differencing the barometric altitude measurements for most operational scenarios.

RF Coverage

The integrated traffic surveillance apparatus 100 uses the standard 4-element TCAS antenna currently installed on military aircraft. This antenna is an electrically steered directional antenna that provides 360 degrees of azimuth coverage. Elevation angles of 70 to 90 degrees degrade performance when valid GPS data is not available. Based on extensive TCAS experience, active surveillance algorithms have been developed to minimize drop outs as aircraft transition through this small area directly above or below own aircraft.

Number of Aircraft

The integrated traffic surveillance apparatus 100 provides the capability to track between 2 and 100 similarly equipped aircraft to perform AFC related functions, assuming that this requirement applies to AFC operations that do not require TCAS. This requirement is expected to be compromised in high density airspace where output power of TCAS is controlled by interference limiting per RTCA DO-185A. Additionally, the AFC apparatus 100 has the capability to track a mix of up to 60 Mode A, 3A/C and S equipped aircraft operating in either standard TCAS II or MILACAS extended range modes.

System Annunciations

The integrated traffic surveillance apparatus 100 provides a user-selectable proximity warning distance. When a proximity condition exists, the AFC apparatus 100 continuously outputs a proximity warning via the output data bus, while another participating AFC equipped aircraft is within the user-selectable proximity distance from the own aircraft. If multiple aircraft enter the proximity warning area, the AFC apparatus 100 identifies each aircraft separately and outputs the information to the mission computer 330 until the proximity condition no longer exists. The proximity warning algorithms are executed at 4 Hz to satisfy the 320 milli-seconds latency requirement.

The AFC apparatus 100 outputs a system failure annunciation via the output data bus when Built-In Test (BIT) detects a critical sub-system fault.

Proximity warning

The integrated traffic surveillance apparatus 100 provides proximity warnings among participants. The user selects the proximity warning distance, which is available on the 1553 data bus. The proximity warning distance describes the radius of a protection sphere around the own aircraft. The AFC apparatus 100 also provides a selectable proximity warning time, nominally set at 10 seconds, that describes how far forward in time to check for a potential conflict.

The proximity warning is calculated as follows in each AFC apparatus 100 system. The term own aircraft refers to the aircraft running the proximity detection algorithms. The term other aircraft refers to the other formation aircraft when using the passive surveillance source, i.e., GPS/IRU data. Accordingly: The position of the other aircraft is extrapolated forward for the warning time using the velocity information provided over the datalink. If the other aircraft is performing a commanded turn, the commanded turn rate is used in the forward extrapolation; otherwise the extrapolation is based on velocity only.

The position of own aircraft is extrapolated forward for the warning time using the velocity and acceleration information available from the GPS and IRU. Acceleration information is included in the extrapolation since it is available and can detect potentially dangerous situations, such as a formation aircraft initiating a turn into an aircraft that is passing to the left or right as it changes position in the formation.

The position of the own aircraft and other aircraft are differenced for a sequence of identical time points and checked to see if the protection sphere is violated at any point between the current time and current time plus the warning time. If it is, a proximity warning is issued and output.

If a warning is detected, the icon for the offending aircraft on the traffic display 220 changes to a filled white diamond, and an aural "Traffic, traffic" alert sounds. The icon and aural alert are consistent with the conventions for a traffic warning in a TCAS system. When operating in the active surveillance mode, the range and range rate from the TCAS system are used for proximity detection. The algorithms check if the current range is within the protection sphere; if it is, a proximity warning is issued. The range is divided by the range rate to estimate the time to impact; if it is less than the warning time, a proximity warning is issued. The algorithms include some features that aid in reducing false alarms rates while still ensuring safety. These algorithms include a larger protection sphere to turn off a proximity warning. This hysteresis prevents a toggling on and off of a proximity alert for an aircraft that is just at the protection distance. These algorithms also include the same sophisticated alpha-beta filters for range and range rate that are used in the certified TCAS collision avoidance algorithms when using the active surveillance source. These algorithms also include prioritization of aircraft to reduce computational complexity. The closest aircraft are checked first, while aircraft that are outside of a selectable 5 nautical mile radius are not checked further, since they can not be a threat within a selectable 10 second period. Furthermore, the proximity warning algorithms are executed at 4 Hz with high priority to ensure that the proximity warning latency is less than 320 milli-seconds.

The integrated traffic surveillance apparatus 100 stores mission history data by mission or flight leg. Periodic Built-In-Testing (BIT) monitors integrity of system components such as RAM, program ROM, and signal data used for normal operation. This periodic BIT is preformed on a non-interference basis in the background of other operational functions. LRU BIT Status is available for maintenance personnel via the LCD on the front panel of the processor 182 and the IU 262 to determine the faulty LRU. Maintenance BIT is activated when commanded by the flight crew via the 1553 data bus, or from the self-test pushbutton 126 (shown in FIG. 3) on the front of the LRU 118 when the aircraft of on the ground. Fault History storage within each LRU will contain a record of detected faults that survive over power interruption. BIT history and LRU/SRU system status for one or more previous missions, e.g., the last 64 missions, is stored in non-volatile memory (NVM). Additionally event driven data, e.g., cautions and warnings, are stored in NVM. The AFC apparatus 100 provides 100 operational hour storage as a function of the amount of data required for storage. Each event stored is time and temperature stamped. Faults are segregated between ground and air faults. When all 64 mission storage areas have been used, the oldest is reused. Depending on the length of the mission the total number of mission storage areas is optionally modified to potentially provide 500 operational hour storage. The AFC apparatus 100 is able to download mission history data via the maintenance bus or to a PCMCIA memory card 371 for later retrieval by the PC based maintenance computer.

The AFC apparatus 100 is able to detect critical and non-critical faults. Failure causes and effects that would result in incorrect system operation or result in presenting false of misleading information or data to the flight crew will be identified on Failure Mode and Effects Capture and Analysis (FMECA) worksheets. Optionally, only critical faults are captured in the FMECA, while remaining faults are categorized as non-critical and recorded and reported for the purposes of fault isolation.

The AFC apparatus 100 includes the PC based support tool called MONTPA that permits maintenance personnel to retrieve and monitor mission data in real time. Cautions, warnings, aircraft state data, e.g., weight on wheels, aircraft attitude, heading, and other aircraft state data, is retrievable and recordable in real time using MONTPA via a dedicated Ethernet bus or an Ethernet Adapter Card plugged in the PCMCIA interface slot 186 on the front of the LRU 118. The AFC apparatus 100 uses MONTPA to record flight test data to validate system performance. The amount of data recorded is only limited by the size of the PC hard drive/ storage device. By example and without limitation, over 20 hours of data is recorded. Data can also be recorded using a PCMCIA card inserted into the interface 186 of the processor 182. Each PCMCIA card has 512 megabytes of storage capacity.

The AFC apparatus 100 includes the capability to load software via two different methods: via the ARINC 615-3 protocol using a 3.5 inch diskette, or using a PCMCIA memory card 371 inserted into the PCMCIA memory card interface 186 of the LRU 118. The operational flight program is loadable by either method. Additionally, the AFC apparatus 100 optionally includes data loading capability via ARINC 615A using the Ethernet connector on the rear interconnect module 132 (shown in FIG. 4) of the apparatus 100, or with an Ethernet adapter card in the PCMCIA interface slot 186 on the front of the LRU 118.

While the preferred embodiment of the invention has been illustrated and described, it will be appreciated that various changes can be made therein without departing from the spirit and scope of the invention.

What is claimed is:

1. An integrated traffic surveillance apparatus, comprising:
   a digital signal processor structured to receive as inputs thereto a plurality of L-band radio frequency signals containing a plurality of traffic data comprising both Mode Select and collision avoidance data;
   software resident on the processor comprising executable program code for implementing a plurality of traffic surveillance functionalities comprising both Mode Select and collision avoidance functionalities; and
   wherein the processor is structured for simultaneously operating the software implementing both the Mode Select and collision avoidance functionalities.

2. The apparatus of claim 1 wherein the digital signal processor further comprises interconnected first and second signal processing circuits structured for simultaneously operating the software for implementing the respective Mode Select and collision avoidance functionalities.

3. The apparatus of claim 2 wherein the digital signal processor further comprises one or more data busses interconnecting the first and second signal processing circuits.

4. The apparatus of claim 1, further comprising a radio frequency transmitting and receiving module coupled to the processor and structured to transmit and receive different Mode Select and collision avoidance radio frequency signals.

5. The apparatus of claim 1 wherein the plurality of traffic surveillance functionalities implemented by the software resident on the processor further comprises an airborne surveillance and separation assurance functionality for integrating the plurality of traffic data.

6. The apparatus of claim 1 wherein the plurality of traffic surveillance functionalities further comprises an All Weather Formation Capability (AFC) traffic surveillance functionality.

7. The apparatus of claim 1 wherein the processor is further structured for simultaneously operating the software implementing all the AFC, Mode Select and collision avoidance functionalities.

8. The apparatus of claim 1, further comprising memory storage means coupled to the processor and accessible to both the Mode Select and collision avoidance functionalities for reading and writing data.

9. An integrated traffic surveillance apparatus, comprising:
a radio frequency module comprising a L-band radio frequency transmitter and receiver and being structured to interface with a pair of directional antennas for transmitting and receiving Mode Select and collision avoidance interrogation and reply signals;
a radio frequency synthesizer and intermediate frequency module comprising a plurality of receiver channels for a collision avoidance radio frequency and one or more dedicated receiver channels for a Mode Select radio frequency, the radio frequency synthesizer and intermediate frequency module being coupled to the radio frequency module for transmitting and receiving Mode Select and collision avoidance interrogation and reply signals; and
a digital module coupled to the radio frequency module to control the interrogation and reply signals, the digital module comprising a central processing unit structured for simultaneously operating resident executable programming code for common signal processing of different Mode Select and collision avoidance interrogation and reply signals.

10. The apparatus of claim 9 wherein the digital module further comprises different interconnected Mode Select and collision avoidance digital signal processors simultaneously operating resident executable programming code for common signal processing of respective Mode Select and collision avoidance interrogation and reply signals.

11. The apparatus of claim 10, further comprising a front end module coupled to the radio frequency module and comprising:
an interface structured to couple the radio frequency module to a pair of directional antennas, and
a switch for periodically coupling the different Mode Select and collision avoidance signal processors to the antenna interface.

12. The apparatus of claim 10 wherein the digital module further comprises a common memory device storing both Mode Select and collision avoidance traffic surveillance data, the memory being accessible to both the Mode Select and collision avoidance digital signal processors.

13. The apparatus of claim 10 wherein the digital module further comprises one or more internal busses communicating between the Mode Select and collision avoidance digital signal processors.

14. The apparatus of claim 9 wherein the resident executable programming code further comprises airborne surveillance and separation assurance (ASSA) signal processing code for tracking of position, velocity, and identification data received as radio frequency signals via the radio frequency module.

15. The apparatus of claim 9 wherein the resident executable programming code further comprises All Weather Formation Capability (AFC) signal processing code.

16. The apparatus of claim 15, further comprising a digital signal processor coupled to the central processing unit and structured to operate encryption and decryption algorithms.

17. An integrated traffic surveillance apparatus, comprising:
a pair of common directional antennas structured for transmitting and receiving L-band radio frequency signals;
a common radio frequency transmitter coupled to each of the common antennas for transmitting Mode Select and traffic alert collision avoidance system (TCAS) signals;
a common radio frequency receiver coupled to the common antennas for receiving Mode Select and TCAS signals; and
a digital signal processor coupled to both the transmitter and the receiver, the signal processor having a different Mode Select and TCAS signal processing circuits and being structured for simultaneously processing the Mode Select and TCAS signals.

18. The apparatus of claim 17, further comprising a switch periodically coupling the common antennas to the different Mode Select and TCAS signal processing circuits.

19. The apparatus of claim 17, further comprising a memory device coupled to both the different Mode Select and TCAS signal processing circuits, the memory device storing data from both the different Mode Select and TCAS signal processing circuits and being structured such that the stored data is available to both the different Mode Select and TCAS signal processing circuits.

20. The apparatus of claim 17, further comprising one or more internal data busses coupling the different Mode Select and TCAS signal processing circuits.

21. The apparatus of claim 17 wherein the digital signal processor further comprises a airborne surveillance and separation assurance (ASSA) signal processing circuit coupled to each of the different Mode Select and TCAS signal processing circuits, the ASSA signal processing circuit being structured for tracking of position, velocity, and identification data received as radio frequency signals via one or both of the antennas.

22. The apparatus of claim 21 wherein the ASSA signal processor is further structured for integrating data from the different Mode Select and TCAS signal processing circuits.

23. The apparatus of claim 17 wherein the digital signal processor further comprises a an All Weather Formation Capability (AFC) signal processing circuit coupled to the different Mode Select and TCAS signal processing circuits.

24. The apparatus of claim 23, further comprising a crypto-processor coupled to the digital signal processor and structured to operate encryption and decryption algorithms.

* * * * *